US006215757B1

(12) United States Patent
Fujimoto et al.

(10) Patent No.: US 6,215,757 B1
(45) Date of Patent: *Apr. 10, 2001

(54) REPRODUCTION/RECORDING APPARATUS HAVING A DIVISIBLE HOUSING FOR DISC-SHAPED RECORDING CARRIERS AND A REPRODUCTION/RECORDING HEAD MOUNTING RACK

(75) Inventors: Fumihiko Fujimoto; Takeshi Fujii; Tomohisa Koseki, all of Akashi (JP)

(73) Assignee: Fujitsu Ten Limited, Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/430,039

(22) Filed: Oct. 29, 1999

Related U.S. Application Data

(63) Continuation of application No. 08/874,490, filed on Jun. 13, 1997, now Pat. No. 6,052,356.

(30) Foreign Application Priority Data

Jun. 13, 1996 (JP) .................................................. 8-175822
Jun. 13, 1996 (JP) .................................................. 8-175823
Jun. 13, 1996 (JP) .................................................. 8-175824

(51) Int. Cl.⁷ .................................................. G11B 17/04
(52) U.S. Cl. .................................................. 369/192
(58) Field of Search ............................ 369/36, 178, 191, 369/192

(56) References Cited

U.S. PATENT DOCUMENTS

| 4,996,680 | 2/1991 | Staar | 369/37 |
| 5,138,591 | 8/1992 | Ogawa et al. | 369/36 |
| 5,481,512 | 1/1996 | Morioka et al. | 369/36 |
| 5,508,994 | 4/1996 | Nakamichi et al. | 369/192 |
| 5,524,003 | 6/1996 | Tsuchiya | 369/191 |
| 5,541,897 | 7/1996 | Baca et al. | 369/37 |
| 5,544,148 | 8/1996 | Nakamichi | 369/192 |
| 5,548,567 | 8/1996 | Sawai | 369/36 |
| 5,555,239 | 9/1996 | Takai et al. | 369/192 |
| 5,561,657 | 10/1996 | Ogawa | 369/179 |

(List continued on next page.)

FOREIGN PATENT DOCUMENTS

| 43 44 530 | 12/1993 | (DE) . |
| 0 684 610 | 5/1995 | (EP) . |
| 59-231771 | 12/1984 | (JP) . |
| 63-58359 | 4/1988 | (JP) . |
| 2-118957 | 5/1990 | (JP) . |
| 3-235249 | 10/1991 | (JP) . |
| 4-57248 | 2/1992 | (JP) . |
| 4-362563 | 12/1992 | (JP) . |

(List continued on next page.)

Primary Examiner—Brian E. Miller
(74) Attorney, Agent, or Firm—Wenderoth, Lind & Ponack, L.L.P.

(57) ABSTRACT

A divisible stocker capable of housing a plurality of CDs is arranged in an enclosure of an autochanger apparatus. A rack mounting a PU unit, which is a reproduction head of a CD is arranged between the stocker and an opening of the enclosure. Transfer means for transferring the CD between the opening and the stocker is also mounted on the rack. The rack is vertically movable. When reproducing a CD, selecting any of the CDs in the stocker at first, turning a feed screw in a state where a pawl of a dividing sliding member is positioned below any of dividing projections arranged at corresponding position on the both sides of the stocker, causing a PU unit to advance into a space formed by raising the stockers above the selected CD, dividing the same and causing an upward displacement thereof, attaching the CD on a turntable of the PU unit by lowering the divided stocker, and transferring the CD to the turntable by displacement means which causes the PU unit to return to the PLAY position.

17 Claims, 53 Drawing Sheets

U.S. PATENT DOCUMENTS

| | | | |
|---|---|---|---|
| 5,682,364 | 10/1997 | Ogawa | 369/36 |
| 5,687,145 | 11/1997 | Takashima et al. | 369/38 |
| 5,726,967 | 3/1998 | Tanaka et al. | 369/192 |
| 5,862,109 | 1/1999 | Nakamichi et al. | 369/36 |
| 5,986,981 * | 11/1999 | Takemasa et al. | 369/37 |

FOREIGN PATENT DOCUMENTS

| | | |
|---|---|---|
| 5-74034 | 3/1993 | (JP) . |
| 6231526 | 5/1993 | (JP) . |
| 6-20425 | 1/1994 | (JP) . |
| 6-36436 | 2/1994 | (JP) . |
| 6-176472 | 6/1994 | (JP) . |
| 6-243570 | 9/1994 | (JP) . |
| 7-249256 | 9/1995 | (JP) . |
| 7-254207 | 10/1995 | (JP) . |
| 7-272383 | 10/1995 | (JP) . |
| 7-296497 | 11/1995 | (JP) . |
| 8-7447 | 1/1996 | (JP) . |

* cited by examiner

FIG. 53

| STEPS | | b1 | b2 | b3 | b4 | b5 | b6 | b7 | b8 | b9 | b10 | b11 | b12 | b13 |
|---|---|---|---|---|---|---|---|---|---|---|---|---|---|---|
| STAIRS MOTOR | NORMAL / REVERSE | | | | | | | | | | | | | |
| STOCKER MOTOR | NORMAL / REVERSE | | t1 | | | | | | | | t1 | | t1 | |
| INSERTION /EJECTION MOTOR | NORMAL / REVERSE | | | | | t1 | | | | | | | t1 | |
| STAIR UPPER LIMIT SW | H / L | | | | | | | | | | | | | |
| COUNT SENSOR | H / L | | | | | | | | | | | | | |
| STAIR ORIGIN SW | H / L | | | | | | | | | | | | | |
| LOCK POSITION SW | H / L | | | | | | | | | | | | | |
| INSERTION/EJECTION POSITION SW | H / L | | | | | | | | | | | | | |
| STOCKER POSITION SENSOR | | | | | | | | | | | | | (1F)h | |
| CLAMPING POSITION SW | H / L | | | | | | | | | | | | | |
| PLAY POSITION SW | H / L | | | | | | | | | | | | | |
| UNIT ORIGIN SW | H / L | | | | | | | | | | | | | |
| INSERTION DETECTION SW (ALSO SERVE FOR 8/12 DETECTION) | H / L | | | | | | | | | | | | | |
| INSERTION COMPLETION SW | H / L | | | | | | | | | | | | | |
| EJECTION COMPLETION SENSOR | H / L | | | | | | | | | | | | | |
| DISC PRESENCE DETECTION SENSOR (ALSO SERVE FOR 8/12 DETECTION) | H / L | | | | | | | | | | | | | |
| EXTRACTION DETECTION SENSOR | H / L | | | | | | | | | | | | | |

REPRODUCTION/RECORDING APPARATUS HAVING A DIVISIBLE HOUSING FOR DISC-SHAPED RECORDING CARRIERS AND A REPRODUCTION/RECORDING HEAD MOUNTING RACK

This is a Continuation of Ser. No. 08/874,490, filed Jun. 13, 1997 now U.S. Pat. No. 6,052,356.

BACKGROUND OF THE INVENTION

1. Field of the Invention

The present invention relates to a reproduction/recording apparatus for disk-shaped recording carriers, which holds a plurality of disk-shaped recording carriers or media such as compact disks (hereinafter abbreviated as "CDs"), including a disk autochanger permitting selective reproduction of any arbitrary one of such disk-shaped carriers.

2. Description of the Related Art

An audio apparatus or a navigation apparatus having an autochanger function for reading out musical information recorded in a CD or geographic information recorded in a CD-ROM by housing a plurality of CDs in a magazine and housing the magazine containing the CDs in a reproduction/recording apparatus has been widely in use for mounting on an automobile. An auto-mobile-mounting reproduction/recording apparatus cannot house many CDs because of the limited size of an installable equipment for attaching operably within the automobile compartment. The mechanism for housing and replacing CDs is installed at a position far from the compartment such as the trunk room, and it is a common idea to arrange only minimum portions necessary for operation within the compartment. When arranging an autochanger apparatus outside the compartment of automobile, however, it is impossible to conduct any replacement of housed CDs during travel of the vehicle.

Prior art automobile autochanger apparatuses capable of housing a plurality of CDs within the compartment are disclosed, for example in Japanese Unexamined Patent Publications JP-A 3-235249(1991), JP-A 620425(1994), and JP-A 6-231526(1994), an outline of which is illustrated in FIG. 66. FIG. 66(a) is a schematic front sectional view, and FIG. 66(b) is a schematic plan sectional view. CDs can be inserted into and ejected from an enclosure 2 of an autochanger apparatus 1 through an opening provided on the front side of a magazine 3. The magazine 3 is capable of housing a plurality of CDs 4, and optical reproduction of the recorded information is accomplished while rotation-driving one of these CDs 4 by means of a pickup (hereinafter referred to as "PU") unit 5. The PU unit 5 is mounted on a rack 6, and can move forward to, and back from, the position of the CD 4 selected in the magazine 3. The rack 6 is arranged on one side of the enclosure 2 so as not to hinder insertion and ejection of the magazine 3 into and from the front opening of the enclosure 2. In the automotive autochanger apparatus 1, a floating mechanism 7 for instantaneously achieving a floating state is provided so as to prevent transmission of external vibration to the rack 6.

In order to select the CD 4 housed in the magazine 3 to attach the CD 4 to the PU unit 5, there should be provided a space permitting insertion of the PU unit 5 on at least one surface side of the housed CDs. For the selection of the CD 4 to be reproduced by inserting the PU unit 5 in the magazine 3, it is necessary to cause a lifting displacement of the magazine 3 as a whole so as to align the height of the selected CD 4 with that of the PU unit 5. When the space for allowing insertion of the PU unit 5 to any of the plurality of CDs 4 housed in the magazine 3 and the magazine 3 has a limited thickness, the number of CDs 4 capable of being housed is reduced. The magazine 3 can therefore be divided into upper and lower parts, and a space can be formed only on one side of the CD 4 to be reproduced by the PU unit 5. A lifting/dividing mechanism 8 is provided for the purpose of conducting such lifting displacement and division of the magazine 3. The lifting/dividing mechanism 8 is provided on a side of the enclosure 2. An electronic circuit board 9 for processing of the information reproduced by the PU unit 5 and for control of the mechanisms of the autochanger apparatus 1 is arranged behind the enclosure 2.

Japanese Unexamined Patent Publications JP-A 6176472 (1994) and JP-A 7-272383(1995) disclose prior art devices in which a stocker capable of housing a plurality of CDs or the like is provided in an enclosure thereby enabling insertion and ejection of a CD one by one. In Japanese Unexamined Patent Publication JP-A 6-176472 (1994), a drive unit for recording and reproducing optomagnetic disks housed in a cartridge is provided between an inlet and a stocker. In Japanese Unexamined Patent Publication JP-A 7272383(1995), insertion and reproduction are carried out with a CD being placed on a disk-shaped carriage.

In a magazine-type autochanger apparatus 1 as shown in FIG. 66, it is necessary to accomplish insertion into, and ejection from, the enclosure 2 by the use of the magazine 3 which is capable of housing a plurality of CDs 4. Even when only one CD 4 is replaced, therefore, it is necessary to take out the magazine 3 from the autochanger apparatus 1, replace the CD 4 in the magazine 3, and reinsert the magazine 3 into the enclosure 2, thus requiring much labor. Since the magazine 3 is taken out from the enclosure 2, a high stiffness is required in the taken-out or removed state, and in the inserted state into the enclosure 2, the magazine 3 must be divisible at an arbitrary CD housing position. A magazine 3 satisfying these requirements will have a very complicated structure with a large weight. In addition, a mechanism for securely holding a CD 4 housed in the magazine 3 taken out from the enclosure 2 must be incorporated. The gap between CDs 4 to be housed cannot therefore be largely reduced. Furthermore, it is necessary to form a space for inserting the PU unit 5 by causing the lifting/dividing mechanism 8 to move up or down in accordance with the position of the PU unit 5 for selecting the CD 4 and to divide the magazine 3 with the position of the selected CD 4 as the boundary. The magazine 3 should therefore have a height largely reduced as compared with the height of the enclosure 2. As a result, in the automotive autochanger apparatus 1, the magazine 3, which is capable of housing CDs in the enclosure 2, is subject to a height limit due to the necessity of attachment in a console box in the compartment and thus it can house only a small number of CDs 4 on the order of about three.

Japanese Unexamined Patent Publication JP-A 6176472 (1994), which handles disks in a placed state in a case, requires a large space as compared with the case where a disk is handled in the form of a single disk. In Japanese Unexamined Patent Publication JP-A 7-272383(1995), CDs are handled on a carriage, thus requiring a complicated inserting and ejecting operation into and from the stocker.

SUMMARY OF THE INVENTION

An object of the invention is to provide a reproduction/recording apparatus for disk-shaped recording carriers, which permits individual insertion and ejection of disk-shaped recording carriers and is capable of housing a plurality of such carriers in a compact size.

The present invention provides a reproduction/recording apparatus for disk-shaped recording carriers comprising:

an enclosure provided with an opening through which the disk-shaped recording carriers are individually inserted into or ejected from the enclosure;

divisible housing means for housing a plurality of recording carriers;

transfer means for transferring the recording carrier between the opening and the housing means; and reproduction/recording means for performing reproduction/recording of the recording carriers, the reproduction/recording means being capable of advancing into and retreating from a space expandable by dividing the housing means.

According to the invention, the disk-shaped recording carriers are individually inserted and ejected via an opening of an enclosure. The plurality of recording carriers are housed in the housing means. A transfer means transfers the recording carriers between the opening and the housing means. The housing means is divisible and the reproduction/recording means can advance into, or retreat from, the space expandable by the division. Since the space can be expanded for advance/retreat of the reproduction/recording means, the space for only housing the recording carriers can be small in size, thus permitting downsizing of the housing means.

Further, the invention provides a reproduction/recording apparatus for disk-shaped recording carriers comprising:

an enclosure provided with an opening through which the disk-shaped recording carriers are individually inserted into or ejected from the enclosure;

divisible housing means for housing a plurality of recording carriers;

transfer means for transferring the recording carrier between the opening and the housing means; and reproduction/recording means for performing reproduction/recording of the recording carriers, the reproduction/recording means being disposed above or below the transfer means and capable of advancing into and retreating from a space expandable by dividing the housing means.

According to the invention, the disk-shaped recording carriers are individually inserted and ejected via the opening of the enclosure. The plurality of recording carriers are housed in the housing means. The transfer means transfers the recording carriers between the opening and the housing means. The housing means is divisible and the reproduction/recording means can advance into, or retreat from, the space expandable by the division. Since the space can be expanded for advance/retreat of the reproduction/recording means, the space for only housing the recording carriers can be small in size. Because the reproduction/recording means is arranged above or below the transfer means, the inner space of the enclosure can be effectively utilized, thereby permitting further downsizing.

Further, the invention provides a reproduction/recording apparatus for disk-shaped recording carriers, capable of housing a plurality of such disk-shaped recording carriers in an enclosure, the reproduction/recording apparatus comprising:

divisible housing means having a holding section for holding the recording carriers;

reproduction/recording means capable of advancing into and retreating from a space expandable by dividing the housing means;

attaching means provided in the reproduction/recording means, for attaching the recording carriers; and control means for, in the case of reproduction/recording, advancing the reproduction/recording means into the divided space of the housing means to attach the recording carriers to the attaching means, and thereafter retreating the reproduction/recording means to release holding of the recording carriers by a holding section of the housing means, thereby controlling the reproduction or recording of the recording carriers.

According to the invention, the divisible housing means is provided with a holding section to make it possible to hold a plurality of disk-shaped recording carriers. It is possible to cause the reproduction/recording means to advance into, and retreat from, the space expandable by dividing the housing means. In reproduction/recording, the control means performs reproduction or recording of the recording carrier by causing the reproduction/recording means to advance into the space expanded by the division, attaching the recording carriers to the attaching means to release holding by the holding section, and causing the reproduction/recording means to retreat. The space necessary for the move of the housing means and the reproduction/recording means can be reduced, thus permitting downsizing of the apparatus.

Further, the invention provides a reproduction/recording apparatus for disk-shaped recording carriers, permitting individual insertion or ejection of a plurality of disk-shaped recordings, each having a center hole, through an opening of an enclosure housing of the plurality of recording carriers, the reproduction/recording apparatus comprising:

divisible housing means having a holding section for holding the recording carriers;

transfer means for transferring the recording carriers between the opening and the housing means;

reproduction/recording means for performing reproduction or recording of the recording carriers, the reproduction/recording means being capable of advancing into and retreating from a space expandable by dividing the housing means, and including attaching means with which the center hole of the recording carrier is to be engaged; and control means for, in the case of insertion or ejection of the recording carrier, aligning the position of the transfer means with that of the housing means, and for, in the case of reproduction/recording of the recording carrier, aligning the position of the reproduction/recording means with that of the space resulting from the division of the housing means to advance the reproduction/recording means into the space formed by the dividing, and engage the attaching means with the center hole of the recording carrier, and thereafter retreating the reproduction/recording means to release holding by the holding section, thereby controlling to perform reproduction or recording.

According to the invention, the housing means has a holding section capable of holding a plurality of disk-shaped recording carriers, and is divisible. The reproduction/recording means can be caused to advance into, and retreat from, the space expanded by the division of the housing means. In reproduction/recording, the control means causes the reproduction/recording means to advance into the space expanded by the division and engages the center hole of the disk-shaped recording carrier with the attaching means. The reproduction/recording means is caused to retreat to perform reproduction or recording of the recording carrier. The recording carriers individually inserted or ejected through the opening are housed in the housing means by the transfer means aligned by the control means. It is possible to reduce the size of the space necessary for displacement of the housing means, the transfer means and the reproduction/recording means, thus permitting downsizing.

Further, the invention is characterized by comprising first lifting means for moving up and down the housing means.

According to the invention, in which the housing means moves up and down by the first lifting means, it is possible to easily carry out expansion of the space resulting from the division of the housing means and aligning with the opening of the enclosure.

Further, the invention is characterized by comprising second lifting means for moving up and down the reproduction/recording means.

According to the invention, the reproduction/recording means is moved up and down by the second lifting means. It is therefore possible to easily select a recording carrier to be reproduced or recorded from among the plurality of recording carriers housed in the housing means.

The invention is further characterized in that the control means in the case of insertion or ejection controls the housing means to integrally move up or down so as to align the housing position of the recording carrier in the housing means with the position of the opening, and in the case of reproduction or recording, divides the housing means at a specific position corresponding to the housing position to moves the reproduction/recording means up or down to align the position of the divided space of the housing means with the position of advance or retreat of the reproduction/recording means.

According to the invention, in individual insertion or ejection of the recording carrier, the housing means is integrally moved up or down to align the housing position with the position of the opening, thus making it possible to reduce the size of the space necessary for up or down movement of the housing means. In reproduction or recording, the housing means can be divided by the utilization of the space.

Further, the invention is characterized in that the housing means has a holding section for holding an outer periphery of the recording carrier inserted in a predetermined direction, and upon retreat of the reproduction/recording means, the recording carrier is pulled out from the housing means in a direction counter to the insertion direction so as to release the holding.

According to the invention, the holding section of the housing means can hold the outer periphery of the recording carrier by only inserting the recording carrier in a predetermined direction, and holding can be released by only pulling out in a direction counter to the predetermined direction. It is therefore possible to reduce the size of the space necessary for holding of the recording carrier by the holding section, thus allowing a compact housing means to house many recording carriers.

Further, the invention is characterized in that the operation of reproduction/recording of the recording carrier by the reproduction/recording means is accomplished in a state in which at least a part of the recording carrier remains within the housing means.

According to the invention, the operation of reproduction/recording is conducted in a state in which at least a part of the recording carrier remains within the housing means. It is therefore possible to reduce the size of the space necessary for displacement of the reproduction/recording means, thus permitting achievement of downsizing.

Furthermore, the invention is characterized in that the attaching means of the recording carrier elastically supports from inside the center hole formed in the recording carrier by inserting a shaft from one surface side of the recording carrier.

According to the invention, attachment of the recording carrier to the reproduction/recording means can easily be accomplished by elastically supporting through insertion of the shaft into the center hole of the recording carrier from one surface side.

Further, the invention is characterized in that in the case of reproduction or recording of the recording carrier, the control means controls the reproduction/recording means to advance it into the divided space to bring the divided portion of the housing means closer to the reproduction/recording means side to attach the recording carrier at the specified housing position to the attaching means.

According to the invention, it is possible to attach the recording carrier from the housing means to the attaching means by movement of the housing means, and utilize the displacement mechanism for dividing the housing means.

Further, the invention is characterized in that upon completion of the reproduction/recording operation, the control means controls the reproduction/recording means to advance it into the divided space of the housing means, and to expand to the divided portion of the housing means in the direction of division to detach the recording carrier attached to the attaching means of the reproduction/recording means.

According to the invention, the recording carrier can be attached from the reproduction/recording means and housed in the housing means through displacement of the housing means, and the displacement mechanism for the division of the housing means can be utilized.

Furthermore, the invention is characterized in that the housing means comprises a plurality of housing members, and on any one surface side of each of the plurality of housing members, there is formed a holding section of which the leading end extends toward an inner periphery of the recording carrier so as to embrace at least a part of a peripheral edge of the recording carrier, and on the other surface side of the housing member, there is formed a recess or a throughhole into which at least a part of the holding section formed on the other housing member can be inserted.

According to the invention, the recording carrier is held between one surface side of the housing member and the leading end of the holding section. Because the housing member has a recess or a throughhole engageable with a holding section provided on one surface side and the holding section formed on the other surface side, it is possible, when laminating another housing member on then other surface side, to reduce the lamination thickness since the holding section of the other housing member engages with the recess or the throughhole. As a result, it is possible to laminate the housing members holding the recording carriers at narrow intervals and house a number of recording carriers efficiently in a narrow space.

Furthermore, the invention is characterized in that the housing means comprises a plurality of laminated housing members, and a long hole extending in a retreating direction of the reproduction/recording means from a proximity of the center of the recording carrier being held, and is formed in each of the housing members.

According to the invention, a long hole extending in the ejection direction from the proximity of the center is formed in the housing member. When engaging the center shaft with the central hole of the recording carrier held by the housing member, and pulling it out in the ejection direction, the leading end of the center shaft, even when protruding beyond the central hole of the recording carrier, never comes into contact with the housing member. Insertion and ejection of the recording carrier into and from the housing member can be accomplished smoothly while inserting the recording carrier onto the center shaft. It is therefore possible to house many recording carriers efficiently in a narrow space.

The invention is characterized in that the reproduction/recording apparatus further comprises:

displacement means for causing the reproduction/recording means to advance to or retreat from, the expanded space resulting from the dividing;

transfer means driving means for driving the transfer means; and transmission means for transmitting the driving force of the transfer means driving means via a disconnectible route to the displacement means of the reproduction/recording means.

According to the invention, it is possible to transmit the driving force of the transfer means driving means via a disconnectible route to the displacement means of the reproduction/recording means. Since the transmission means is disconnectible, only transfer of the recording carrier can be performed in the disconnected state when transferring the recording carrier. When conducting reproduction or recording of the recording carrier, the displacement means is driven with the driving force from the transfer means driving means. Therefore, the transfer means driving means is shared by the displacement means and the transfer means, thus reducing the space in the enclosure and reducing the size of the enclosure. It is thus possible to effectively utilize a narrow space and efficiently perform transfer of the recording carriers and reproduction and recording of the recording carriers.

The invention is characterized in that the transmission means includes a gear train engaged with a plurality of gears, and the gear train includes displaceable gears.

According to the invention, transmission of the driving force to the displacement means from the transfer means driving means can be disconnected by only releasing the engagement state of the displaceable gears in the gear train.

BRIEF DESCRIPTION OF THE DRAWINGS

Other and further objects, features, and advantages of the invention will be more explicit from the following detailed description taken with reference to the drawings in which:

FIG. 53 is a time chart illustrating the operations of the electric configuration shown in FIG. 50;

DETAILED DESCRIPTION OF THE PREFERRED EMBODIMENTS

Figure 1:
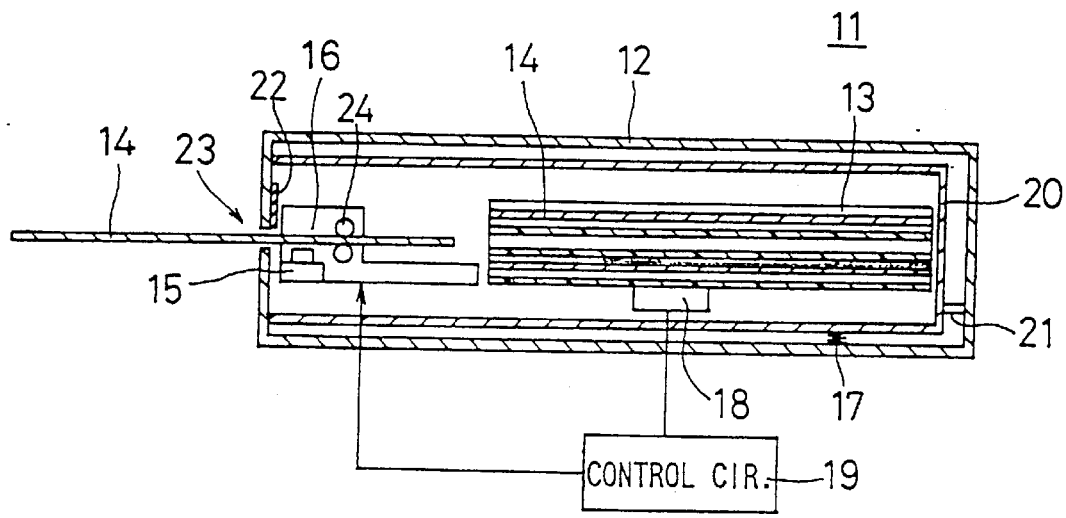
FIG. 1 is a block diagram illustrating an entire configuration of an autochanger apparatus 11 constructed in accordance with an embodiment of the invention.

Now referring to the drawings, preferred embodiments of the invention are described below.

FIG. 1 illustrates a schematic configuration of an automotive autochanger apparatus 11 constructed in accordance with an embodiment of the invention. An enclosure 12 has a certain size, for example known as the 1DIN size, and has substantially a rectangular shape. A stocker 13, which is a housing means, is housed in the enclosure 12 and can house a plurality of, for example six, CDs 14. Each CD 14, which is a disk-shaped recording carrier, can be individually inserted and ejected. The CD 14 housed in the stocker 13 can be individually and optically reproduced by means of a PU unit 15 which is reproduction/recording means. The PU unit 15 has an optical pickup and is attached to a rack 16 which is a displacement means. The enclosure 12 elastically supports internal mechanisms such as the rack 16 and the stocker 13 by means of a floating mechanism 17 which is a floating means for reducing the effects of external vibration. The stocker 13 can move up and down as a whole, and only an upper portion from the housing position of a particular CD 14 can move up and down, by the action of a lifting/dividing mechanism 18 which is a replacement member. Operations of the PU unit, the rack 16 and the lifting/dividing mechanism 18 are controlled by a control circuit 19. The control circuit 19 is arranged on one side of the enclosure 2. The floating mechanism 17 supports a chassis 20, which is a supporting means for supporting the rack 16 and the stocker 13, in floatation relative the enclosure 12. When inserting and discharging one of the CDs 14, a locking pawl 21 which is a locking means secures the chassis 20 to the enclosure 12. A shutter 22 which is an opening/closing means is provided in front of the rack 16 and can open or close an opening 23 provided in the enclosure 12. A transfer roller 24 which is a transfer means is also provided on the rack 16.

Figure 2:
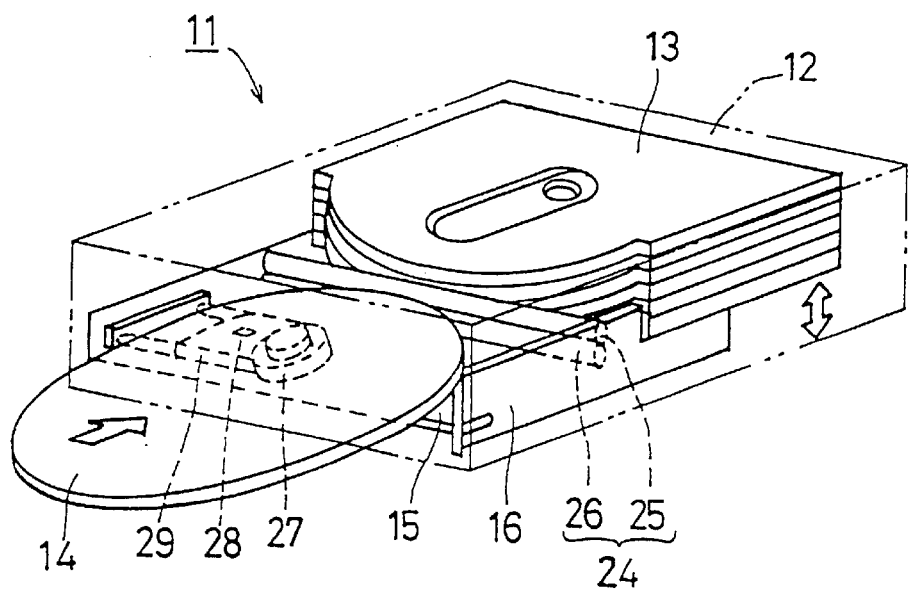
FIG. 2 is a perspective view illustrating a disk loading state of the autochanger apparatus 11 shown in FIG. 1.
Figure 3:
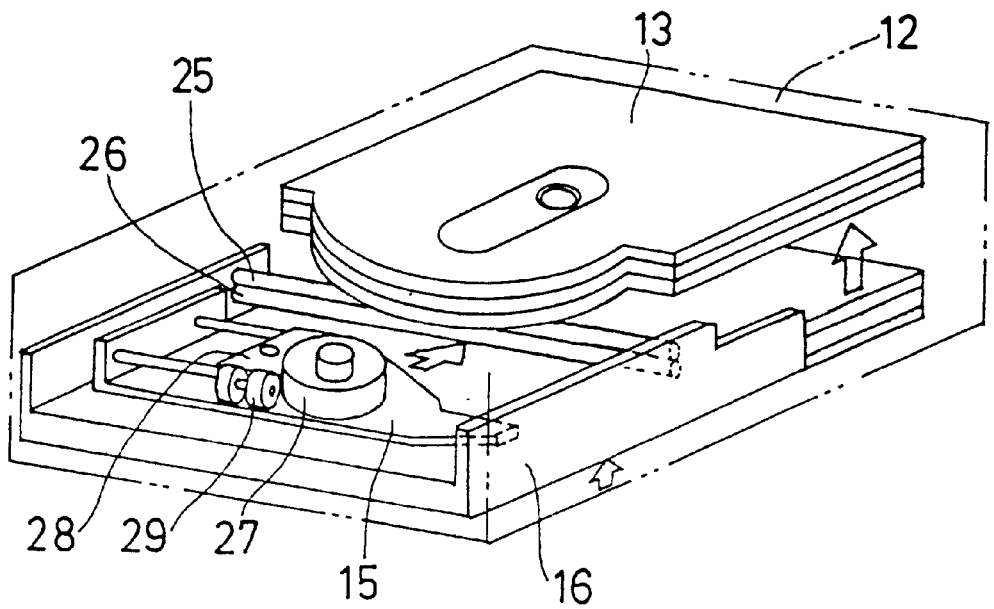
FIG. 3 is a perspective view illustrating a pickup unit loading state of the autochanger apparatus 11 shown in FIG. 1.
Figure 4:
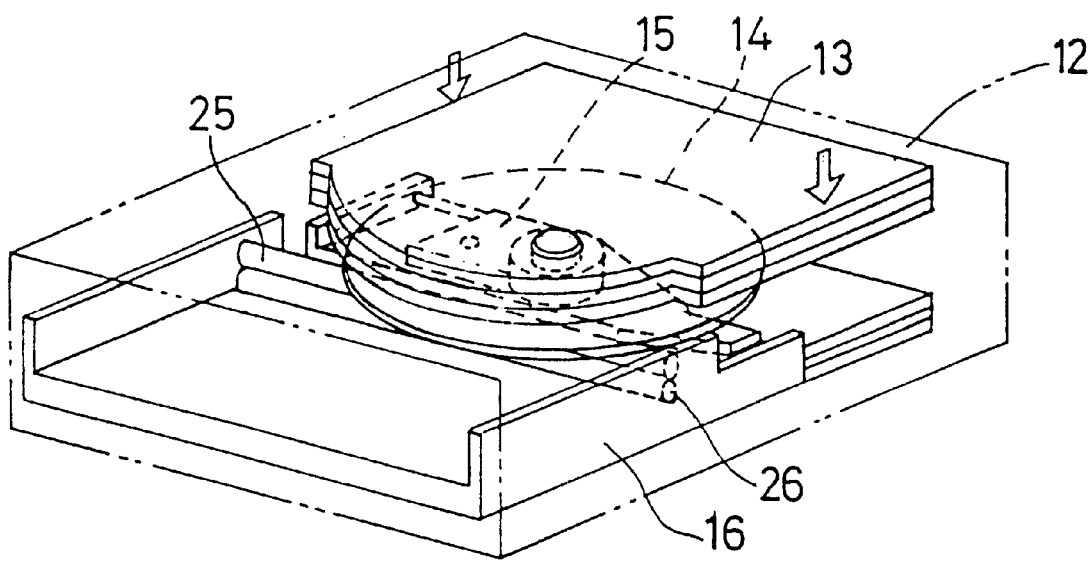
FIG. 4 is a perspective view illustrating a disk clamping operation of the autochanger apparatus 11 shown in FIG. 1.
Figure 5:
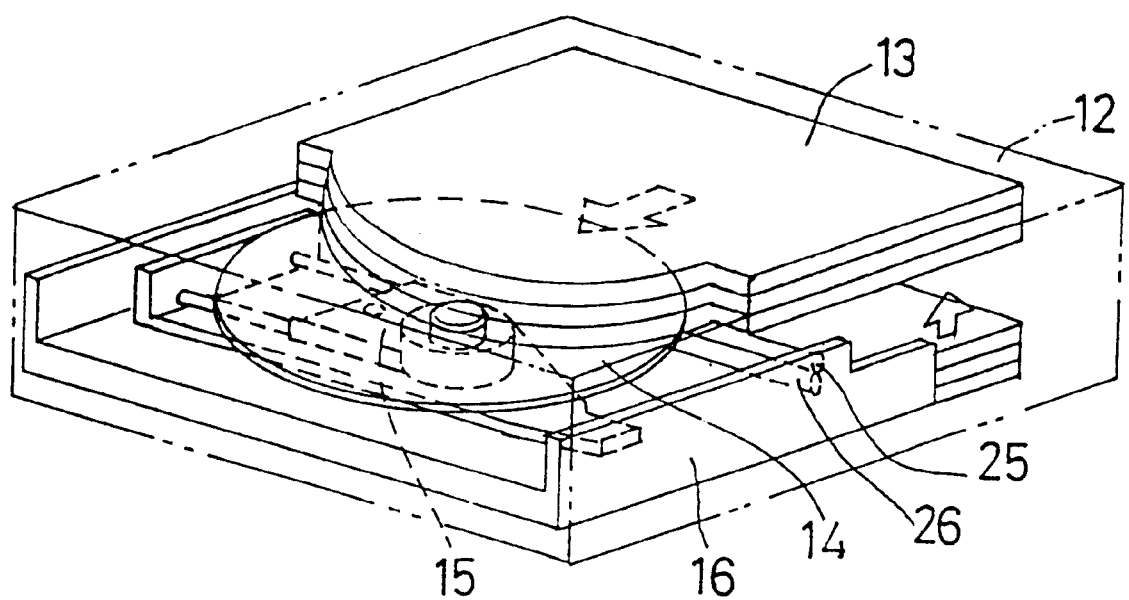
FIG. 5 is a perspective view illustrating a reproduction operating state of the autochanger apparatus 11 shown in FIG. 1.

FIGS. 2 to 5 illustrate operations ranging from insertion to reproduction of the CD 14 in the autochanger apparatus 11 shown in FIG. 1. FIG. 2 illustrates a disk loading state in which the CD 14 is inserted through the opening of the enclosure 12 up to a holding position in the stocker 13 while holding the CD 14 between an upper roller 25 and a lower roller 26 of transfer rollers 24. The PU unit 15 comprises a turntable 27 for rotation-driving the CD 14, a PU 28 for reproducing information stored in the CD 14, and a tracking mechanism 29 for causing the PU 28 to move in the radial direction of the CD 14. FIG. 3 illustrates a loading state of a pickup unit for causing the PU unit 15 to advance into a space formed by upward movement of the upper portion of the stocker 13 divided at a specified holding position, alignment of the PU unit 15 with a specified holding position through lifting of the rack 16, and upward movement of the divided portion of the stocker 13. FIG. 4 illustrates a disk clamping state in which the divided portion of the stocker 13 holding the CD 14 moves down, and the CD 14 is clamped on the rotation shaft of the PU unit 15. FIG. 5 illustrates a reproduction state in which, after releasing the holding state by the stocker 13 brought about by retreat of the PU unit 15, the divided portion of the stocker 13 moves up again, and the CD 14 is reproduced by the PU unit 15.

Figure 6:
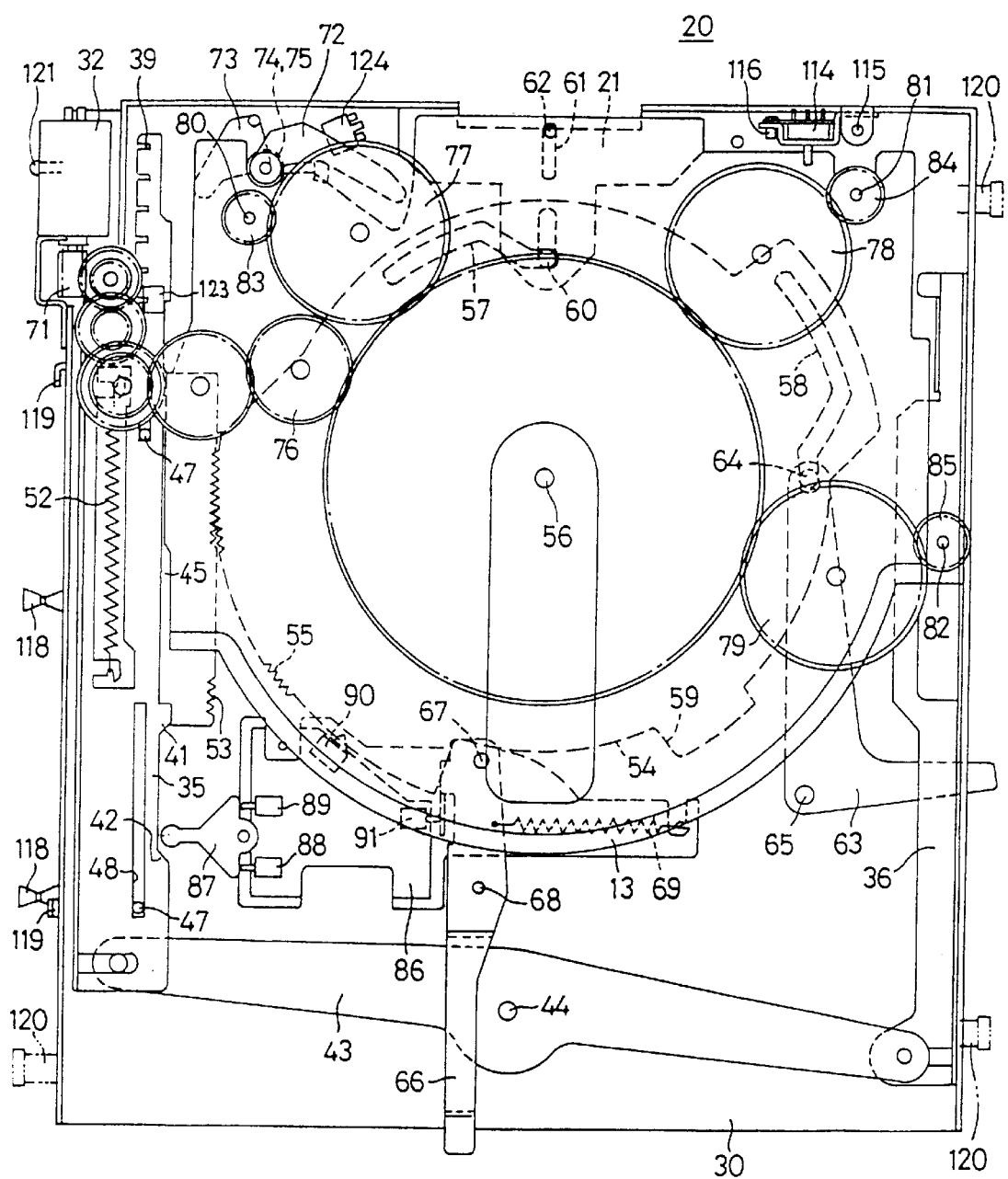
FIG. 6 is a plan view of a chassis 20 of the autochanger apparatus 11 shown in FIG. 1.
Figure 7:
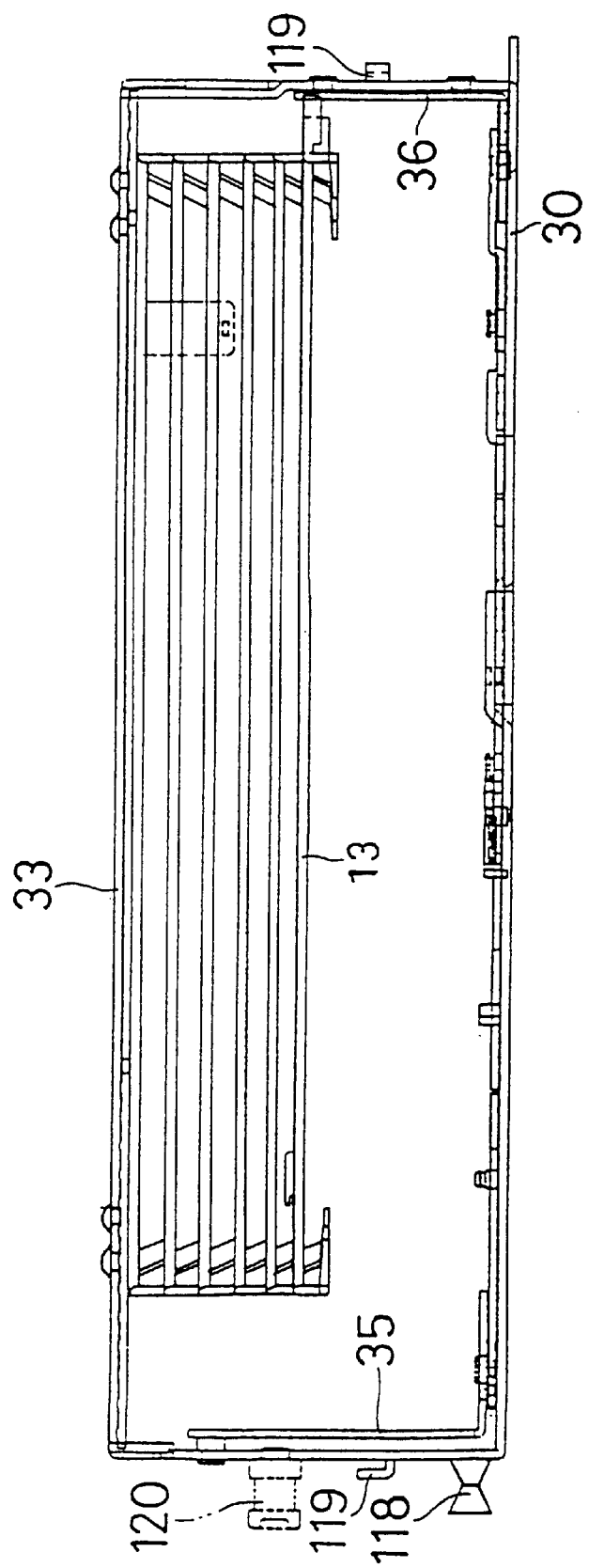
FIG. 7 is a front view of the chassis 20 shown in FIG. 1.
Figure 8:
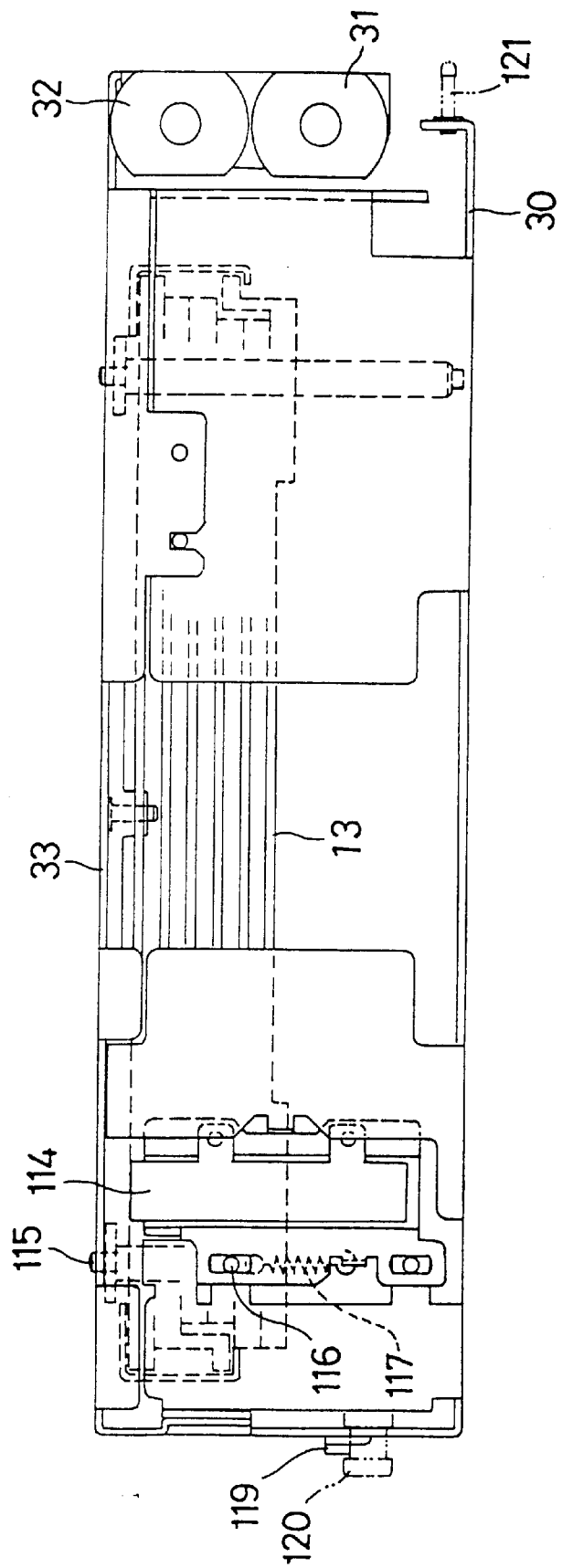
FIG. 8 is a rear view of the chassis 20 shown in FIG. 1.
Figure 9:
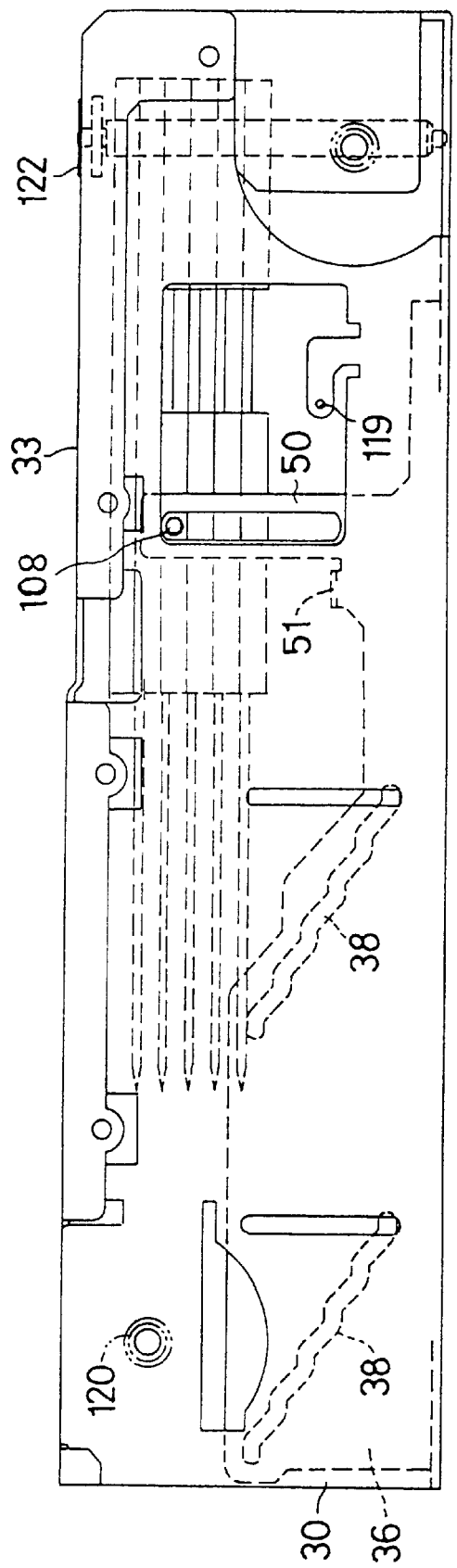
FIG. 9 is a right side view of the chassis 20 shown in FIG. 1.
Figure 10:
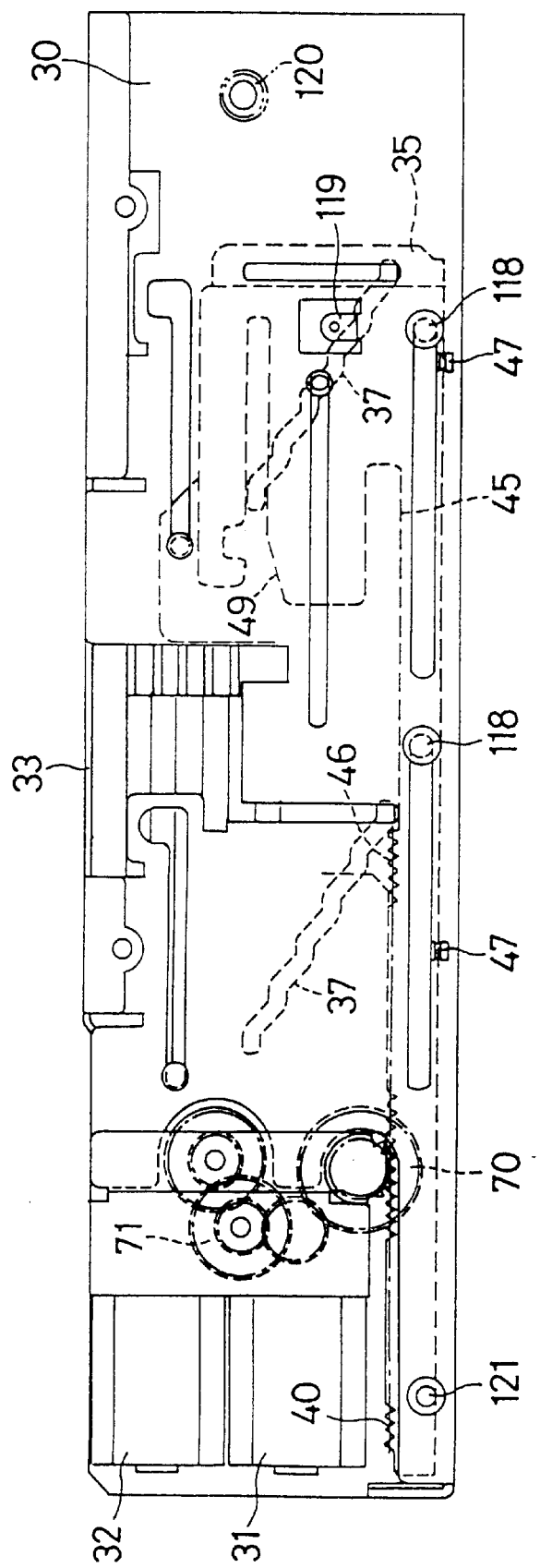
FIG. 10 is a left side view of the chassis 20 shown in FIG. 1.
Figure 11:
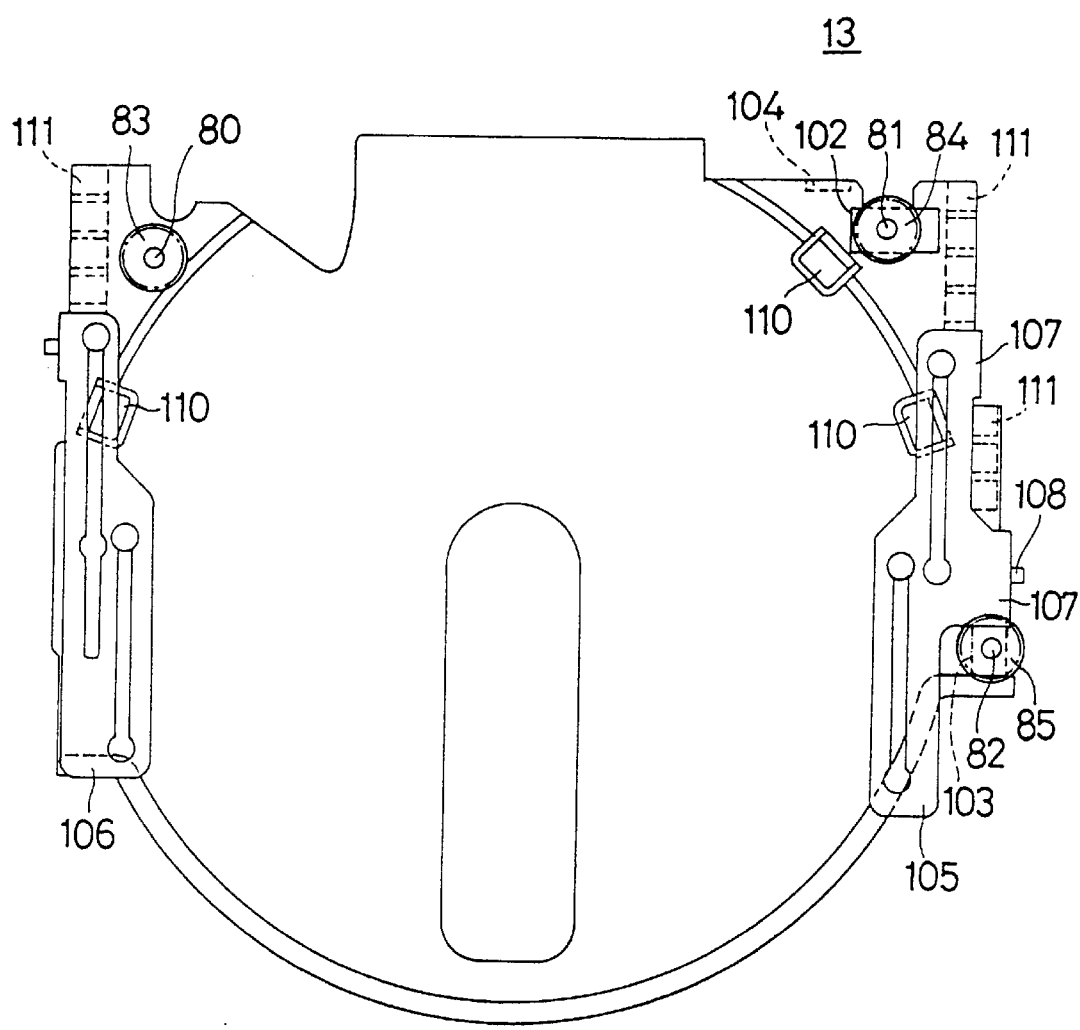
FIG. 11 is a plan view of a stocker 13 shown in FIG. 1.
Figure 12:
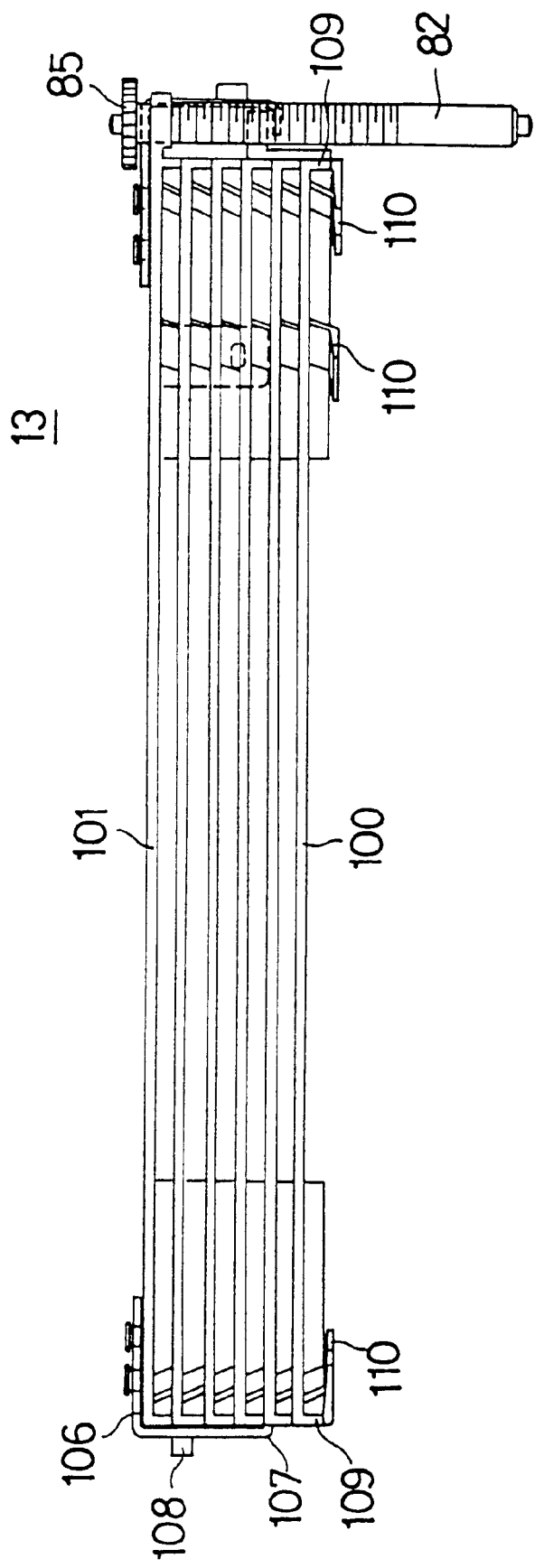
FIG. 12 is a front view of the stocker 13 shown in FIG. 1.
Figure 13:
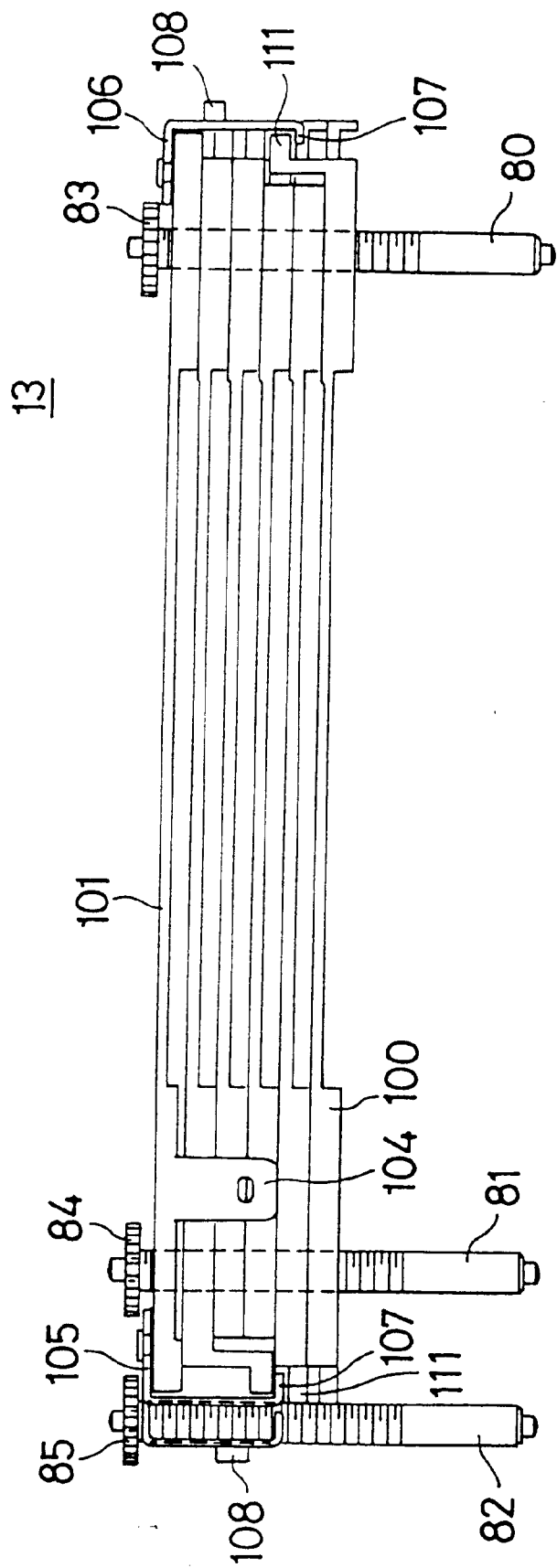
FIG. 13 is a rear view of the stocker 13 shown in FIG. 1.
Figure 14:
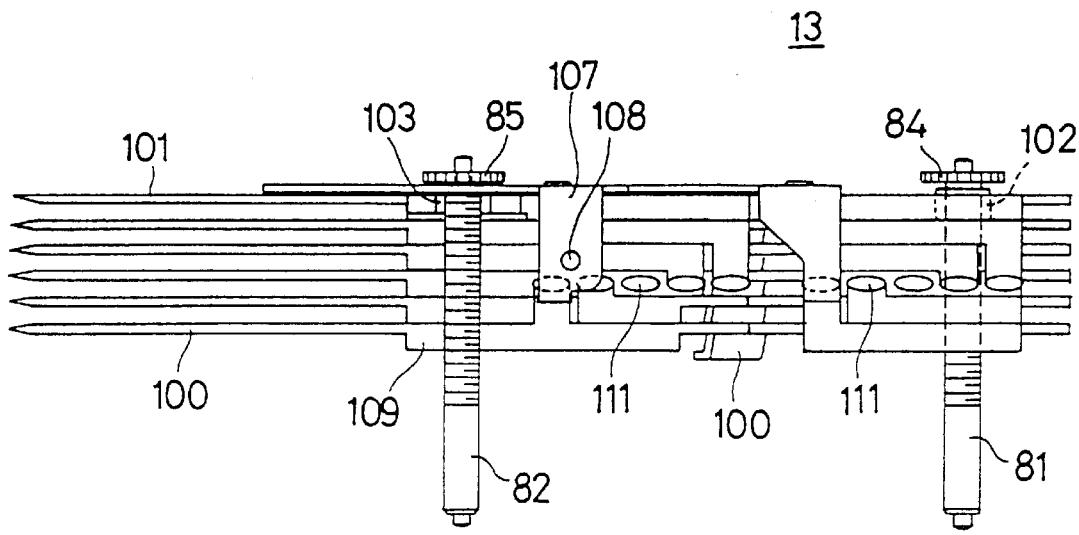
FIG. 14 is a right side view of the stocker 13 shown in FIG. 1.
Figure 15:
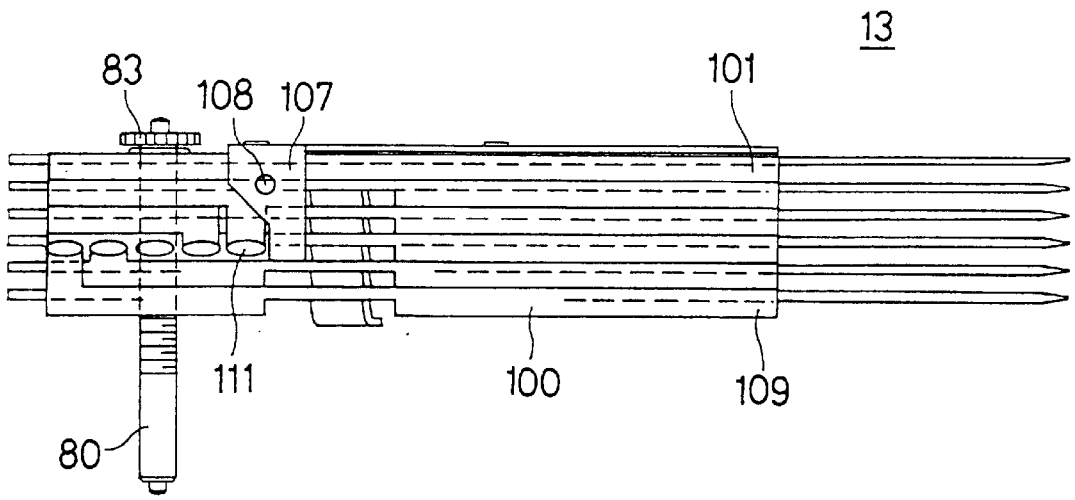
FIG. 15 is a left side view of the stocker 13 shown in FIG. 1.

FIGS. 6 to 10 illustrate a configuration associated with the chassis 20 of the autochanger apparatus 11. FIG. 6 is a plan view; FIG. 7 is a front view; FIG. 8 is a rear view; FIG. 9 is a right side view; and FIG. 10 is a left side view. A stair motor 31 is attached to the lower portion of a base 30 on the rear left side, and a stocker motor 32, to the upper portion. The top of the base 30 is covered with a cover 33.

Stair sliding members 35 and 36 are arranged on the right and left sides of the base 30. Stair grooves 37 and 38 are formed on the stair sliding members 35 and 36, respectively, so that the rack 16 can move up and down along six steps in response to forward/back displacement of the stair sliding members 35 and 36. The left stair sliding member 35 is provided with a slit 39 so as to permit optical detection of the position of the rack 16. The left stair sliding member 35 has a stair rack 40 formed on an upper portion of the rear side for forward/back driving, and a stair upper limit contact section 41 and a stair origin contact section 42 are formed on an inside portion of the front side. The left stair sliding member 35 and the right stair sliding member 36 are connected with a transmission lever 43 provided at the front of the base 30. A center shaft 44 is provided at the center of the transmission lever 43, and the transmission lever 43 can oscillate (rotate) around the center shaft 44 relative to the base 30. Since the stair sliding members 35 and 36 are connected via the transmission lever 43, right and left sliding members 35 and 36 are displaceable in reverse directions. As a result, the stair groove 38 provided in the right stair sliding member 36 has a direction counter to the stair groove 37 provided in the left stair sliding member 35.

A locking sliding member 45 is arranged between the left stair sliding member 35 and the base 30. A locking rack 46 is formed on the upper rear side of the locking sliding member 45. An interlocking pin 47 is attached to the locking sliding member 45, and inserted into an interlocking long hole 48 formed in the stair sliding member 35. The interlocking pin 47 is freely displaceable in the interlocking long hole 48 within a range of up/down displacement of the rack 16 by the stair sliding member 35 to any position of second to sixth stages. When the stair sliding member 35 pulls down the rack 16 to the position of the first stage, the interlocking pin 47 comes into contact with the front end of the interlocking long hole 48, and causes the locking sliding member 45 to displace to the rear side. A transfer switching cam 49, for switching between connecting and not connecting a mechanism for advance and retreat of the PU unit 15 provided on the rack 16 to a mechanism for driving the transfer roller 24, is formed in the middle of the locking sliding member 45. A stocker guide 50 and a stocker stopper 51 are formed in the rear portions of the stair sliding members 35 and 36 and are used for up/down displacement and division of the stocker 13 as described later. The left stair sliding member 35 and the locking sliding member 45 are pulled toward each other by a spring 52 so as to impart a force to cause the interlocking pin 47 to come into contact with the front end of the interlocking long hole 48.

A transmission rack 53 is formed toward an inside portion of the locking sliding member 45. The transmission rack 53 engages with a gear 55 formed on a portion of the outer periphery of a cam member 54 attached to the rear center portion of the base 30. The cam member 54 is substantially circular, and angularly displaceable around a center shaft 56 thereof. A rear locking cam groove 57, a side locking cam groove 58 and a shutter contact section 59 are formed on portions toward the rear, right side and front, respectively, of the cam member 54. A follower 60 of a locking pawl 21 is inserted into the rear locking cam groove 57. A long hole 61 extending in the forward/back direction is provided at the center of the locking pawl 21, and a pin 62 provided upright on the base 30 engages with the long hole 61. When the rear locking cam groove 57 pushes out the follower to the rear in response to an angular displacement of the cam member 54, pushing out the locking pawl 21 rearward, the front end side of the chassis 20 can be pressed against the front side of the enclosure 12 with the rear end thereof so as to bring chassis 20 farther from the rear end of the enclosure 12. A follower 64 provided at the base of the side locking lever 63 engages with the side locking cam groove 58. The side locking lever 63 has substantially an L-shape. A pin provided upright on the base 30 is inserted into a throughhole provided at the bend of the side locking lever 63 so that the lever can be displaced by oscillating (pivoting) around a pin 65. The leading end of the side locking lever 63 projects to the right of the base 30, and can press the base 30 so as to leave the right side of the enclosure 12. The shutter contact section 59 presses a pin 67 provided at the base of the shutter transmission lever 66 from a side to cause an angular displacement around an oscillation shaft 68 which rotatably supports the shutter transmission lever 66. A force is imparted to the shutter transmission lever 66 by a spring 69 in a direction to close the shutter 22.

Rotary outputs of the stair motor 31 and the stocker motor 32 transmitted via gear trains 70 and 71, respectively. A pushing lever 72 is provided at the rear end of the base 30 toward the left side, and can push out the CD 14 held in the stocker 13 from the holding state. A transmission lever 73 is provided below the pushing lever 72, and can come into contact with the rear end of the locking sliding member 45. In a state in which the locking sliding member 45 fully retreats, the leading end of the pushing lever 72 pushes out the CD 14 held in the stocker 13 via the transmission lever 73. Springs 74 and 75 are provided between the pushing lever 72 and the transmission lever 73, and between the transmission lever 73 and the base 30, respectively. Between the pushing lever 72 and the transmission lever 73, the spring 74 imparts a force in a direction of pushing out the leading end of the pushing lever 72. A force is imparted to the transmission lever 73 by the spring 75 so as to cause contact with the rear end of the locking sliding member 45 in order to advance it.

A gear train 76 for transmitting a rotation-driving force transmitted via the gear train 71 from the stair motor 31 is attached to the cover 33. Spur gears 77 and 78, engaging with the gear train 76, are attached to the upper surface of the cover 33. The spur gears can be inserted after assembly of the gear train 76. A spur gear 79, similar to the spur gears 77 and 78, is attached to the lower surface of the cover 33. The spur gears 77, 78 and 79 engage with spur gears 83, 84 and 85, respectively, attached to the upper parts of the feed screws 80, 81 and 82 provided on the stocker 13.

A switch (hereinafter sometimes referred to as "SW") board 86 is attached near the cam member 54 toward the front of the base 30. The base portion of the stair upper/lower limit lever 87 is attached to the left side of the switch board 86. The leading end of the stair upper/lower limit lever 87 can come into contact with the stair upper limit contact section 41 and the stair origin contact section 42 of the stair sliding member 35. When the stair upper/lower limit lever 87 comes into contact with the stair upper limit contact section 41, the stair upper limit SW 88 at the base portion of the stair upper/lower limit lever 87 is turned on. When the stair sliding member 35 retreats and the stair origin contact section 42 is in contact with the leading end of the stair upper/lower limit lever 87, the base portion of the stair upper/lower limit lever 87 turns on the stair origin SW 89.

Further, a lock position SW 90 is attached to the switch board 86. The lock position SW 90 is turned on when the SW 90 is pressed by the circumferential portion following the gear 55 of the outer periphery of the cam member 54, and is turned off upon completion of this circumferential portion. When the cam member 54 angularly displaces and a locking state is achieved by the locking pawl 21 and the side locking lever 63, the lock position SW 90 is turned off. An insert/ejection position SW 91, which is turned on by the shutter transmission lever 66 at a position for insertion or ejection of the CD 14 by the transfer roller 24 in response to the height of the rack 16 aligned with the height of the opening 23, is further provided on the base 30.

FIGS. 11 to 15 are a plan view, a front view, a rear view, a right side view and a left side view of the stocker 13 in combination, respectively. In this embodiment, the stocker 13, capable of housing six stages of CDs 14, is formed by a stocker member 100 for five stages, which is a housing member, and an uppermost-stage stocker member 101. The feed screws 80, 81 and 82 engage with the uppermost-stage stocker member 101 at two positions toward the rear and a position to the right. The feed screw 80 at the left rear end engages directly with the uppermost-stage stocker member 101. The other feed screws 81 and 82 are connected to the uppermost-stage stocker member 101 via lifting members 102 and 103, respectively. Female screws are formed in the lifting members 102 and 103 to engage with the feed screws 81 and 82 to make the uppermost-stage stocker member 101 vertically displaceable. However, because the female screws are formed so as to make the uppermost-stage stocker member 101 displaceable with the lifting members 102 and 103, it is possible to adjust engagement of the individual spur gears 83, 84 and 85 with the spur gears 77, 78 and 79. A position detecting piece 104 is arranged at the rear end of the uppermost-stage stocker member 101. The position detecting piece 104 is used for detecting the position with a high degree of accuracy as described later.

Dividing sliding members 105 and 106 are attached to the uppermost-stage stocker member 101. Each of the dividing sliding members 105 and 106 has a flat portion sliding with the upper surface of the uppermost-stage stocker member 101 and a pawl 107 having a tip which hangs on a side and bends toward the interior. Two pawls 107 hang from the right dividing sliding member 105, and a pawl 107 hangs from the left dividing sliding member 106. Each of one of the pawls 107 of the right dividing sliding member 105 and the pawl 107 of the left dividing sliding member 106 is provided with a projection 108 protruding toward outside. The projection 108 engages with a long hole provided in the stocker guide of each of the stair sliding members 36 and 35, and is vertically displaceable while being guided by the long hole. A driving force for advancing or retreating displacement is transmitted from the stair sliding members 36 and 35.

A holding leaf spring 109 for holding the CD 14 is provided for the stocker member 100 and the uppermost-stage stocker member 101 at a position slightly toward the front from the both sides. In the portion toward the rear from that having the holding leaf spring 109, CD mounting pawls 110, which are a plurality of holding sections, are formed at certain intervals. The portion of the outer periphery toward the rear of the CD 14 held by the stocker member 100 or the uppermost-stage stocker member 101 is placed on the leading end of the CD mounting pawl 110, and is further held by the holding leaf spring by pressing. Dividing projections 111, which are selecting sections, are formed with equal heights on the sides of the stocker member 100 and the uppermost-stage stocker member 101, and are selectively divisible by the stocker stoppers 51 of the stair sliding members 35 and 36 and the pawls 107 of the dividing sliding members 105 and 106.

Figure 16:
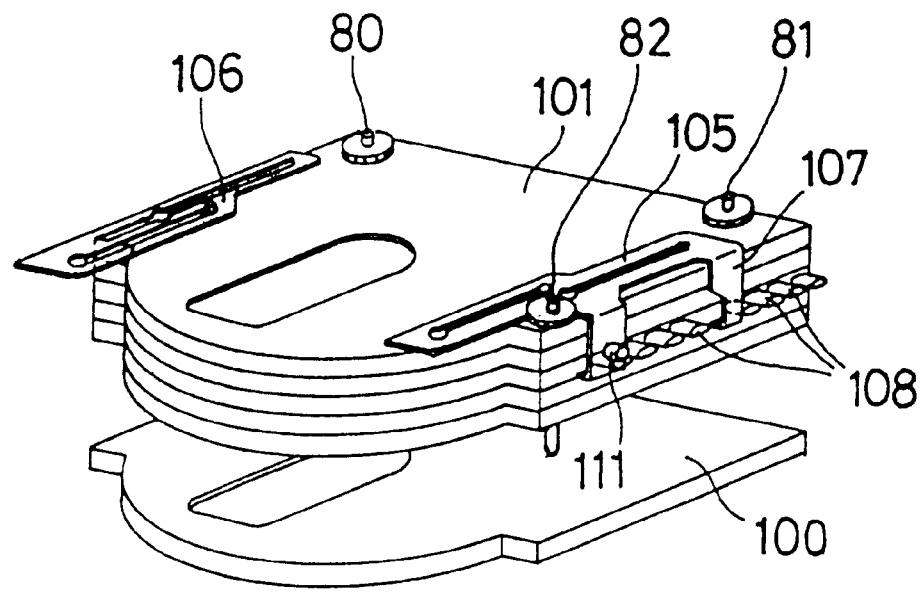
FIG. 16 is a whole perspective view illustrating division of the stocker 13 shown in FIG. 1.
Figure 17:
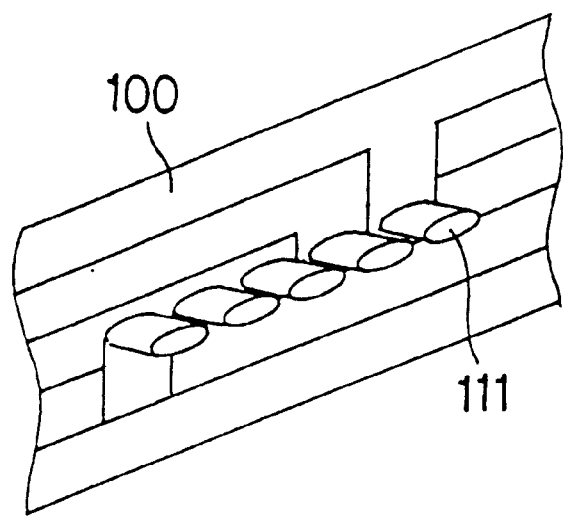
FIG. 17 is a partial perspective view of a divided state of the stocker 13 shown in FIG. 1.

FIG. 16 is a whole perspective view of the division of the stocker 13, and FIG. 17 is a perspective view of the dividing projection 111. The dividing projections 111 are arranged at a position, and the pawls 107 of the dividing sliding members 105 and 106 and the stocker stoppers 51 of the stair sliding members 35 and 36 come into contact with the adjacent dividing projections 111 from below and from above, respectively. When the feed screws 80, 81 and 82 are rotated by rotation-driving the stocker motor 32, the upper stocker 13 which is closer to the uppermost-stage stocker member 101 from the stocker member 100 selected by the pawl 107 is lifted and divided.

Figure 18:
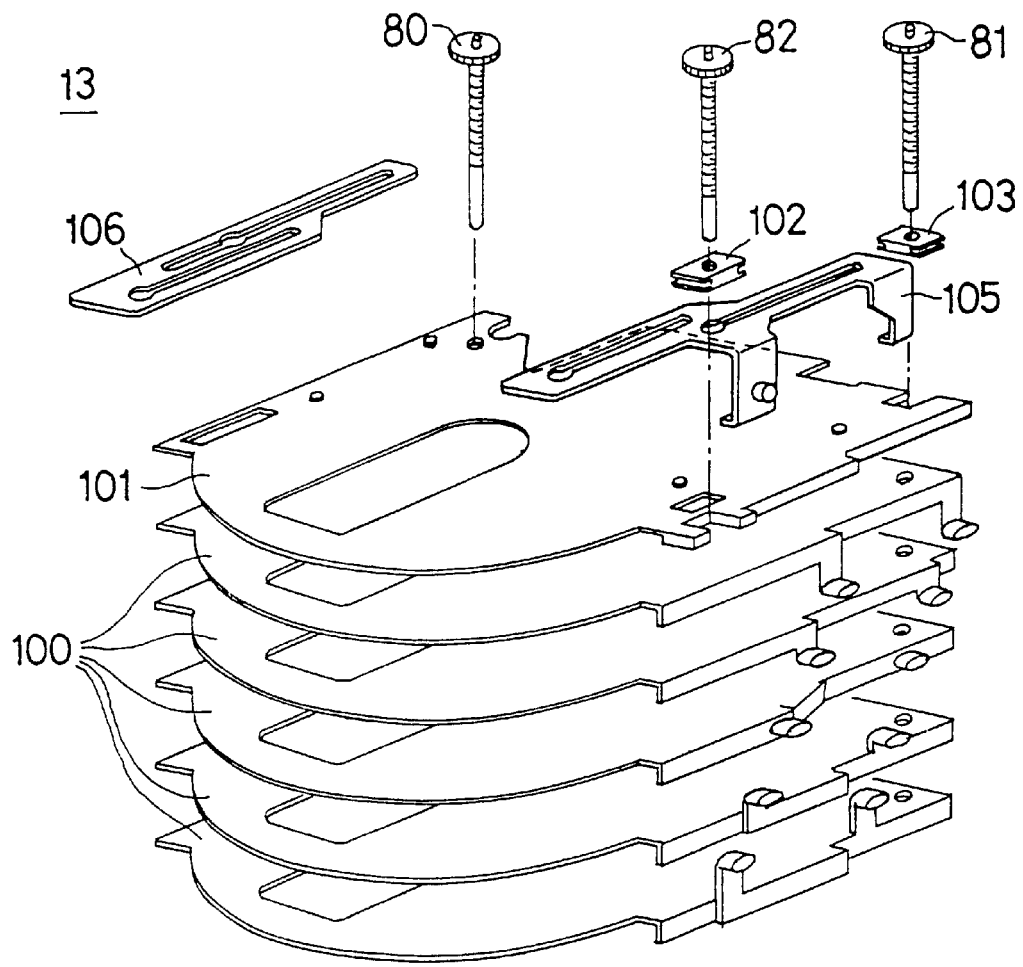
FIG. 18 is an exploded perspective view of the stocker 13 shown in FIGS. 11 to 16.
Figure 19:
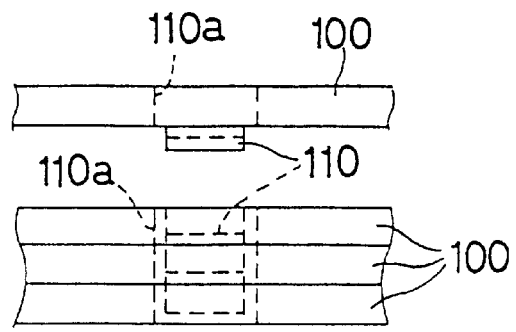
FIG. 19 is a side view illustrating lamination of a portion of a CD mounting pawl 110 in the stocker 13 shown in FIGS. 11 to 16.
Figure 20:
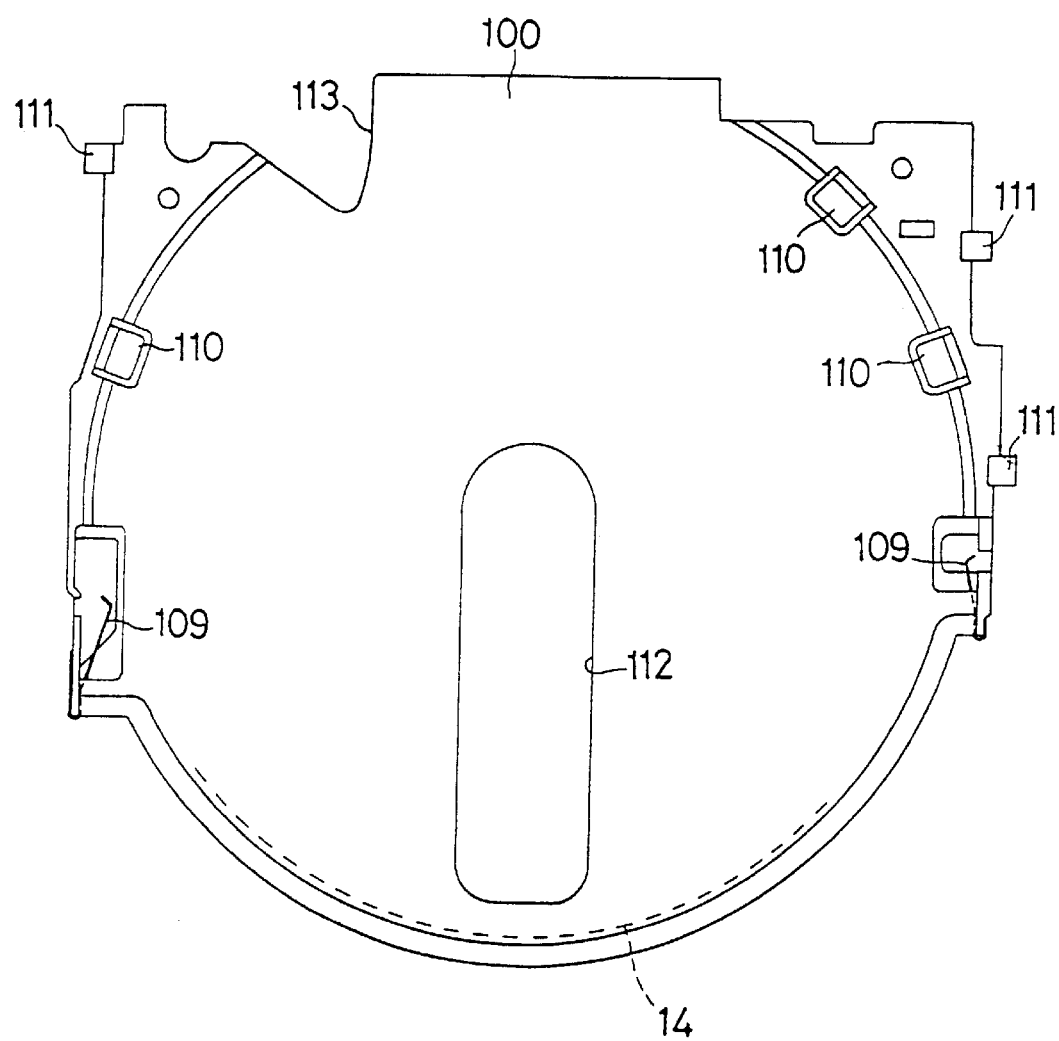
FIG. 20 is a plan view of the individual stocker members forming the stocker 13 shown in FIGS. 11 to 16.
Figure 21:
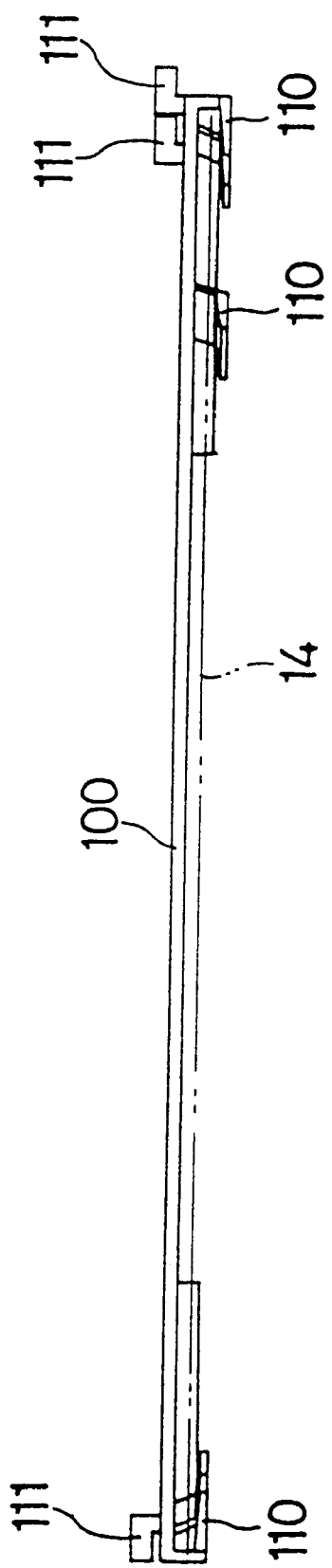
FIG. 21 is a front view of the stocker member 100 shown in FIG. 20.
Figure 22:
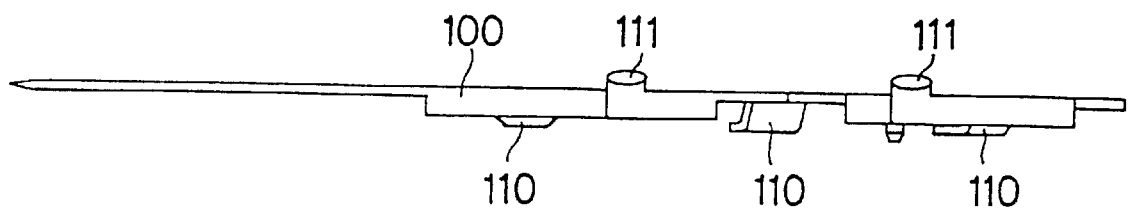
FIG. 22 is a right side view of the stocker member 100 shown in FIG. 20.
Figure 23:
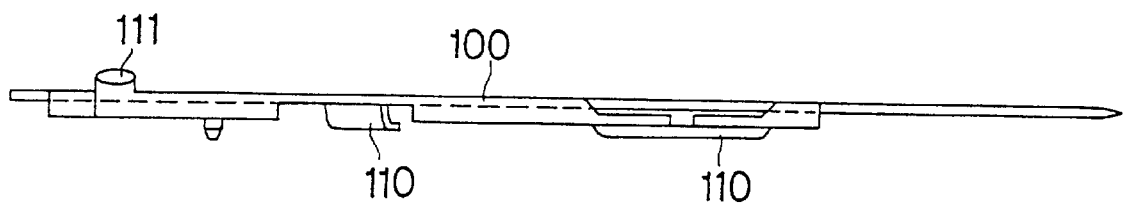
FIG. 23 is a left side view of the stocker member 100 shown in FIG. 20.
Figure 24:
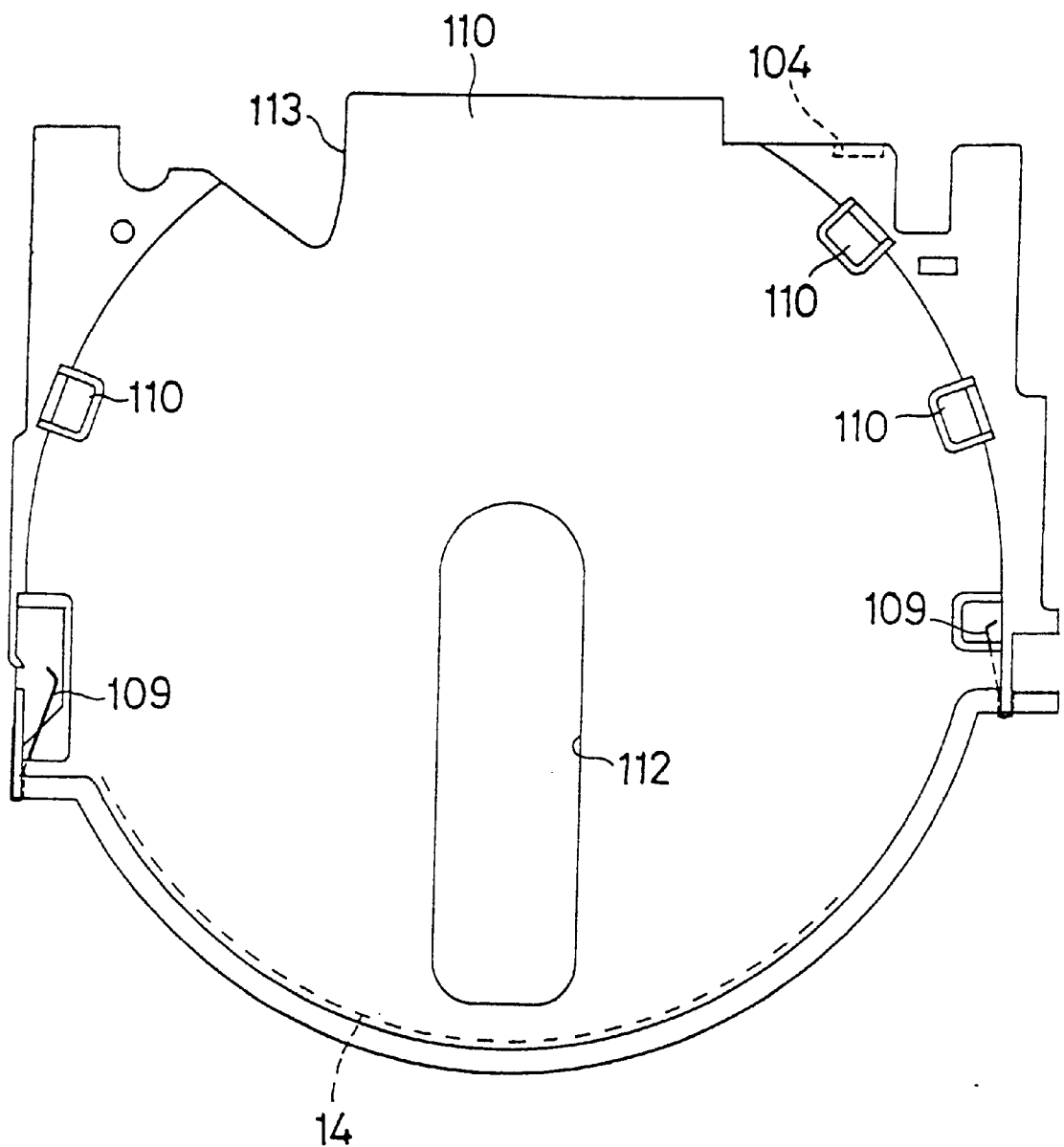
FIG. 24 is a plan view of the uppermost stocker member 101 of the stocker 13 shown in FIGS. 11 to 16.
Figure 25:
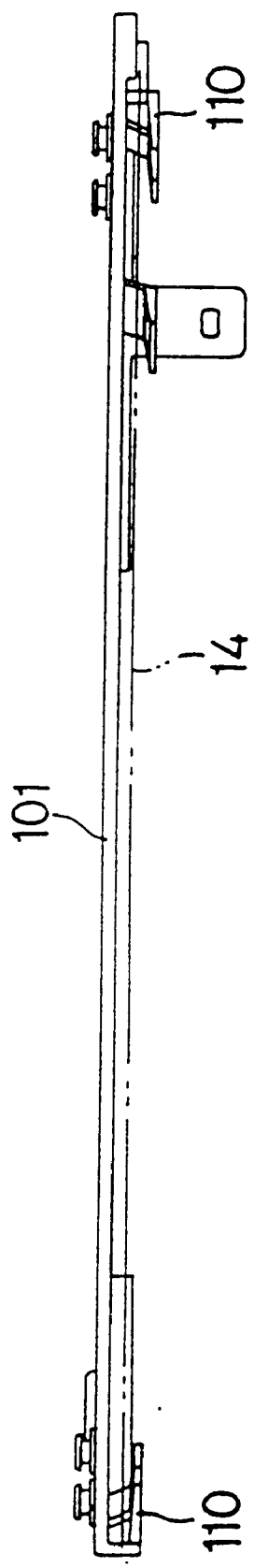
FIG. 25 is a front view of the uppermost stocker member 101 shown in FIG. 24.
Figure 26:
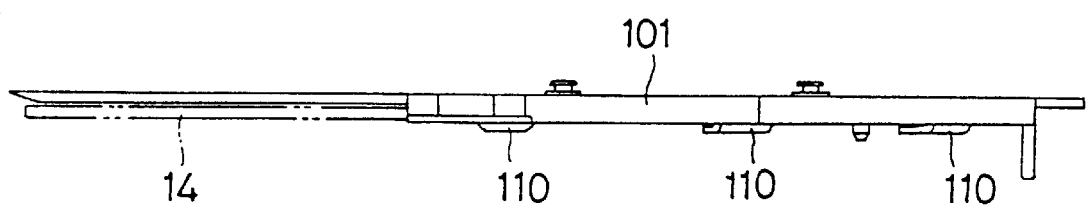
FIG. 26 is a right side view of the uppermost stocker member 101 shown in FIG. 24.
Figure 27:
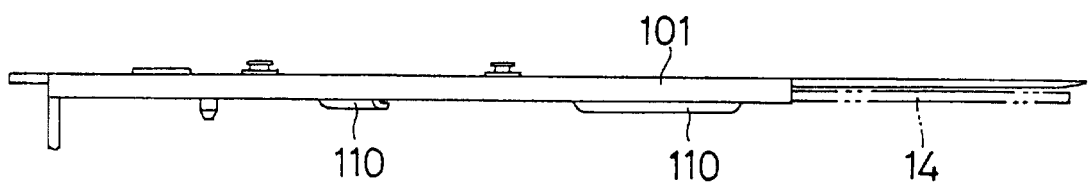
FIG. 27 is a left side view of the uppermost stocker member 101 shown in FIG. 24.
Figure 28:
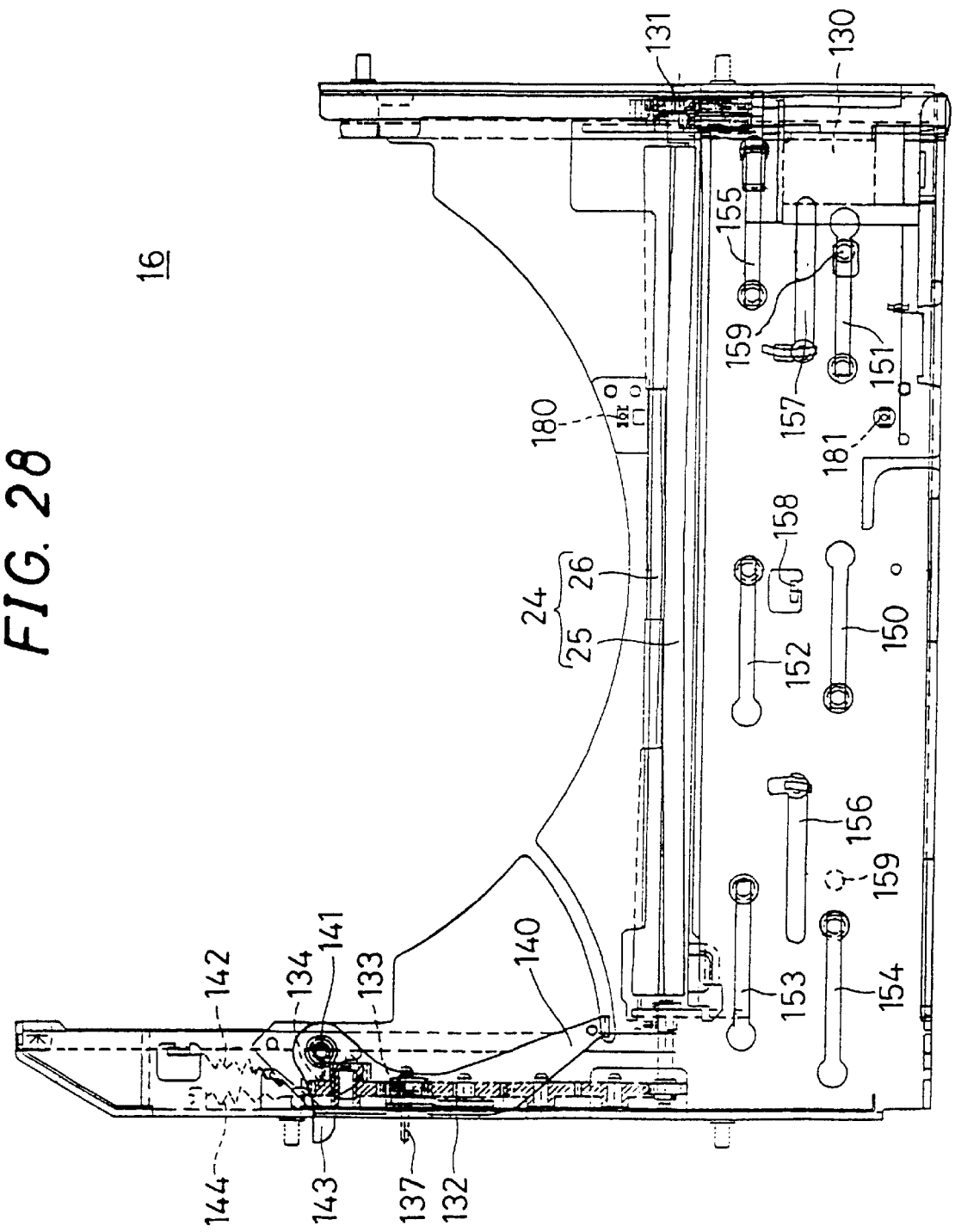
FIG. 28 is a plan view of a rack 16 shown in FIG. 1.
Figure 29:
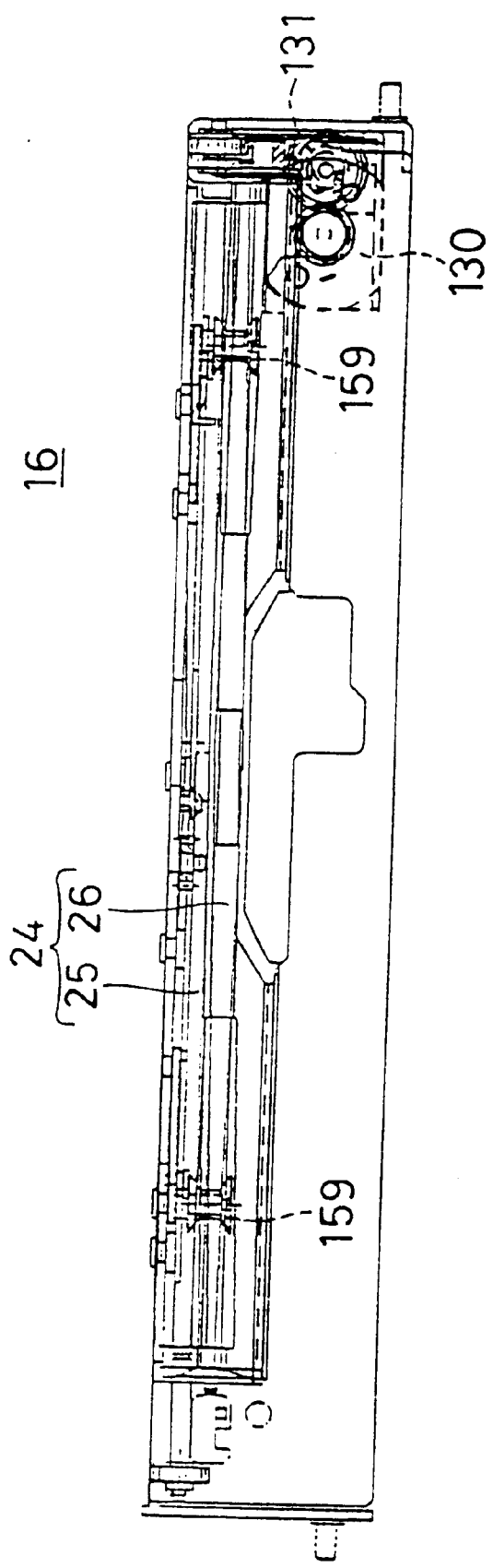
FIG. 29 is a front view of the rack 16 shown in FIG. 1.
Figure 30:
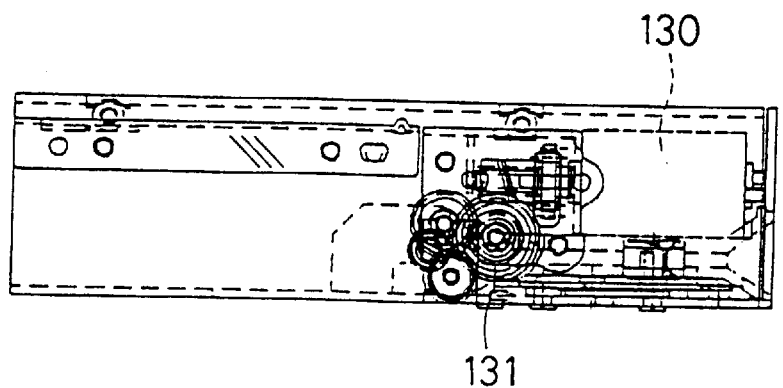
FIG. 30 is a right side view of the rack 16 shown in FIG. 1.
Figure 31:
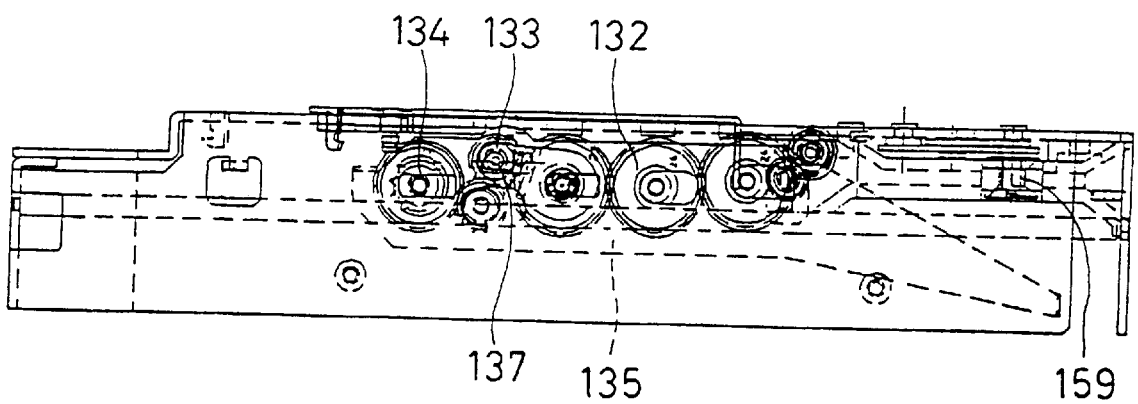
FIG. 31 is a left side view of the rack 16 shown in FIG. 1.

FIG. 18 is an exploded view of the stocker 13, and FIG. 19 illustrates lamination of the stocker members 100. For each stocker member 100, a throughhole 110a permitting insertion of the CD mounting pawl 110, having a diameter larger than the outside diameter of the CD mounting pawl 110 is provided on the inside on a surface side other than the surface having the CD mounting pawl. In a lamination state as shown in FIG. 19, the CD mounting pawl 110 is inserted into the throughhole 110a, thus making it possible to reduce the thickness as a whole.

FIGS. 20 to 23 are a plan view, a front view, a right side view and a left side view of the individual stocker member 100. FIGS. 24 to 27 are a plan view, a front view, a right side view and a left side view of the uppermost-stage stocker member 101. While the uppermoststage stocker member 101 should also have a CD mounting pawl 110 formed on one surface side, it is not always necessary to form a throughhole 110a, because no stocker member 100 is laminated at the portion above the uppermost-stage stocker member 101. Dividing sliding member 105 and 103 are attached to the uppermost-stage stocker member 101 as shown in FIGS. 11 to 16. A position detector 104 is formed at the rear end.

A turntable long hole 112, allowing insertion of the center shaft of the turntable 27 described later, is formed in a portion closer to the front than the center of each of the stocker members 100 and the uppermost-stage stocker member 101. A pushing notch 113 is formed at the rear end of the stocker member 100, into which the leading end of the foregoing pushing lever 72 can advance.

A stocker position sensor 114, to be connected to the position detector 104 provided on the uppermost-stage stocker member 101, is attached to the rear end of the base 30 as shown in FIG. 6. The stocker position sensor 114, achieved by a variable resistor in which a slider linearly displaces, can detect a displacement of the uppermost-stage stocker member 101 through vertical linear displacement of the slider. An adjusting screw 115 is provided for adjusting the attachment position of the stocker position sensor 114, and a fixing screw 116 is provided for fixing the adjusted position. When adjusting the position of the stocker position sensor 114, the vertical position of the adjusting screw 115 is adjusted with the adjusting screw 115 while being pulled upward with a spring 117, and the adjusted position is fixed with the fixing screw 116.

A lock positioning member 118, horizontally extending from the locking sliding member 45 to a side, thereof projects on the left side of the base 30. The lock positioning member 118 has a hand drum shape in which the diameter of the middle portion is smaller than that of the leading end and the base portion, and is connected to the long hole provided in the enclosure 12. With a small diameter of the long hole to which the retreating locking sliding member 45 is connected, the small-diameter portion at the middle of the lock positioning member 118 guided in the long hole of a small diameter would be constrained for the displacement in the transverse direction, thus permitting positioning. A spring shoe 119, for receiving the spring serving as a floating mechanism 17 for hanging the chassis 20 within the enclosure 12, is provided on a side of the base 30. Further, dumper attaching members 120 for performing dumping in a floating state are attached to the both sides of the base 30. Another dumper attaching member 121, which is slenderer than the other dumper attaching members 120, is attached to the left rear portion of the base 30, considering the attaching position. A leaf spring 122, pressing the upper ends of the feed screws 80, 81 and 82, is provided in the cover 33. The position of the slit 39 is detected by a count sensor 123 of a photointerrupter to the effect that the rack is at a position permitting PLAY. When the pushing lever 72 is pressed to the rear, the insertion completion SW 124 is turned on.

FIGS. 28 to 31 are a plan view, a front view, a right side view and a left side view of the rack 16 shown in FIG. 1. Driving of the transfer roller 24 for insertion and ejection of the CD 14 and driving for advance and retreat of the PU unit 15 are accomplished by sharing the rotation force generated by the insertion/ejection motor 130. The insertion/ejection motor 130 is attached to the right front of the rack 16, and the rotation force rotation-drives the right end of the upper roller 25 through a transmission gear 131. The upper roller 25 simultaneously serves as the transfer roller 24 and as a transmission route of the rotation force for advancing and retreating of the PU unit 15. When the upper roller 25 is rotation-driven via the transmission gear 131, the rotation force is transmitted from the right end to the left end of the upper roller 25, thus driving a left transmission gear 132 of the rack 16.

A pinion gear 134 engages via a displacement gear 133 with the trailing end of the transmission gear 132 which is a transmission means. The displacement gear 133 is vertically displaceable under the effect of a transfer switching cam 49 formed on the foregoing locking sliding member 45. When the displacement gear 133 displaces upward, transmission of driving force is disconnected between the final stage of the transmission gear 132 and the pinion gear 134. In a state in which the displacement gear 133 engages between the transmission gear 132 and the pinion gear 134, the pinion gear 134 is rotation-driven by the rotation force from the insertion/ejection motor 130, thus making it possible to cause the PU unit 15 engaging with the pinion gear 134 to advance to the rear from the rack 16 or cause the PU unit 15 having advanced to retreat to return back to the rack 16 side.

A locking sliding plate 135, comprising a thin metal sheet, is provided between the transmission gear 132 and the displacement gear 133, on the one hand, and the side of the rack 16, on the other hand, and a force is imparted thereto by a spring 136 toward the rear. The front end of the locking sliding plate 135, which is an engagement keeping means, is arrested at the front end of the PU unit 15. When the PU unit 15 displaces and the locking sliding plate 135 is pulled back by the spring 136, the displacement gear 133 is secured in the locking section at a driving force transmitting position between the transmission gear 132 and the pinion gear 134. More specifically, when the PU unit 15 begins displacing from the position at the leading end of the rack 16 to the rear, the displacement gear 133 enters into a state of continuously transmitting the driving force from the transmission gear 132 to the pinion gear 134. Only when the PU unit 15 is in standby at the leading end position of the rack 16, does the locking sliding plate 135 allow vertical displacement of the displacement gear 133, thus making it possible to lift a shaft 137 of the displacement gear 133 projecting outside from a side of the rack 16 by the action of the transfer switching cam 49 of the locking sliding member 45, and to disconnect the transmission route. Followers 138 and 139 engaging with stepping grooves 37 and 38 of the stair sliding members 35 and 36 project on the left side and the right side of the rack 16.

A push-in lever 140 is provided to the left of the rack 16 and above the transmission gear 132, the displacement gear 133 and the pinion gear 134. The push-in lever 140 is used for pushing in the inserted CD 14 onto the stocker 13 side, while the leading end thereof angularly displaces around an oscillation shaft 141 provided near the base. A force acting in a direction counter to the push-in direction is imparted to the push-in lever 140 by a spring 142. In order to cause an angular displacement to the push-in lever 140 for push-in, a transmission lever 143 is provided. A force acting in a direction counter to the push-in direction of the push-in lever 140 is imparted to the transmission lever 143 by a spring 144 having a spring force smaller than that of the spring 142 imparting the force to the push-in lever 140. The transmission lever 143 is driven by a push-in cam formed in the locking sliding member 45.

The lower roller 26 of the transfer rollers 24 is attached, not directly below the upper roller 25, but at a position slightly shifted to the rear, i.e., in the inserting direction of the CD 14. The lower roller 26, of which both ends of the shaft thereof are supported in U-shaped grooves, is vertically displaceable, and is pulled onto the upper roller 25 side by a lower roller spring 146.

When a CD 14 is inserted between the upper roller 25 and the lower roller 26, the inserted CD 14 is pressed by the lower roller 26 since the position of the lower roller 26 shifts toward the rear. The leading end of the CD 14 therefore inclines upwardly, and the CD 14 is guided in contact with the front extension of the stocker 13 smoothly to the holding position by the holding leaf spring 109 and the CD mounting pawl 110. When the lower roller 26 is directly below the upper roller 25, the leading end of the inserted CD 14 drops, thus making it difficult to ensure smooth guiding.

A plurality of long holes 150, 151, 152, 153, 154 and 155 and stop-grooved long holes 156 and 157 are formed on the front upper surface of the rack 16. The stop-grooved long holes 156 and 157 have long hole portions in parallel with the long holes 150 to 155 and substantially vertical short stop grooves. These long holes extend substantially in the width direction. A spring shoe 158 is also provided on the upper surface of the rack 16. These long holes 150 to 157 and the spring shoe 158 are used for a disk identifying mechanism based on a pin 159 built in the front upper portion of the rack 16.

Figure 32:
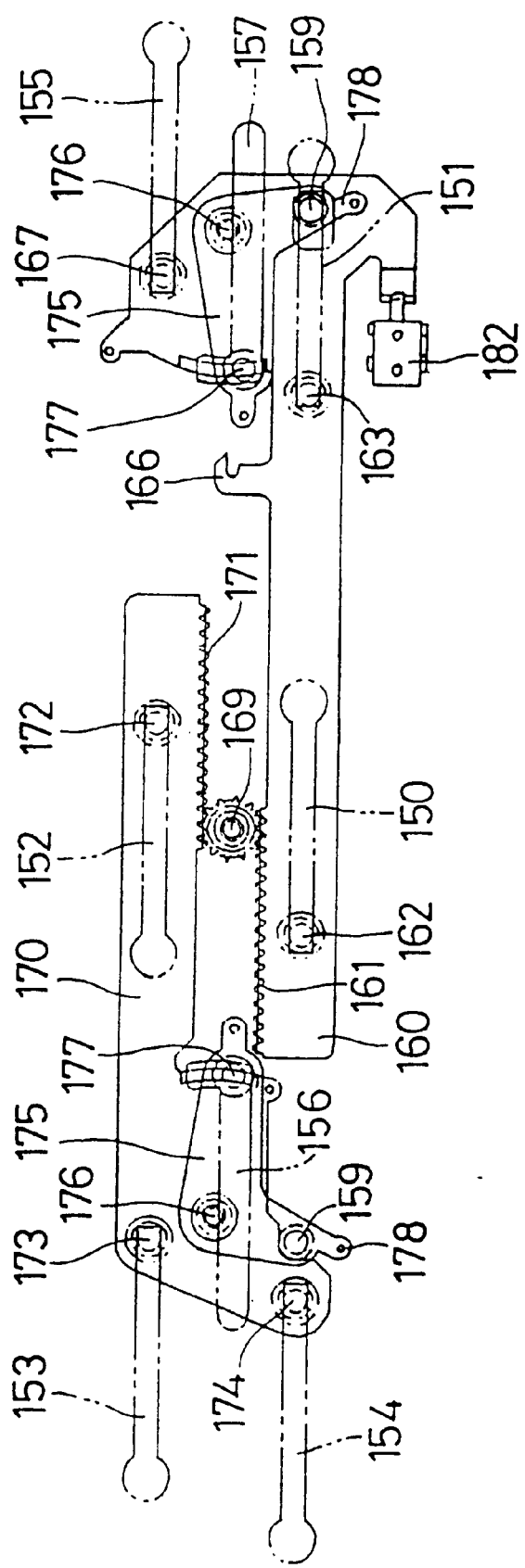
FIG. 32 is a plan view of a disk identifying mechanism provided on the rack 16 shown in FIGS. 28 to 31.

FIG. 32 illustrates a configuration of the disk identifying mechanism built in the front upper portion of the rack 16. A rack 161 is formed at a position closer to the rear of a sliding plate 160 arranged near the front, and followers 162 and 163 engaging with the long holes 150 and 151 are provided. A pin 164 is provided, and a spring shoe 166 is formed on the sliding plate 160. The rack 161 of the sliding plate 160 engages with an interlocking gear 169. The interlocking gear 169 engages also with a rack 171 formed on a portion closer to the front of the sliding plate near the rear. The sliding plate 170 is substantially L-shaped and comprises a portion extending in the width direction having the rack 171 formed thereon, and a portion extending from the left side toward the front. Followers 172 and 173, engaging with the long holes 152 and 153 of the rack 16, are provided on the portion extending in the width direction, and a follower 174, engaging with the long hole 154, is provided near the leading end of the portion extending toward the front. An oscillating shaft 176 of an oscillating lever 175 is secured to a position near the bent portion of the sliding member 170. The oscillating lever 175 is also substantially L-shaped. A follower 177 is arranged at the leading end of one of the arms thereof, and engages with the stop-grooved long hole 156 formed on the rack 16. A pin 159 is formed in the leading end of the other arm of the oscillating arm. A similar oscillating lever 175 is also provided to the right of the sliding plate 160, and the follower 177 at the leading end of one arm engages with the stop-grooved long hole 157. The follower 167, engaging with the long hole 155, is also provided on the sliding plate 160.

A tension spring is attached between the spring shoe 166 of the sliding plate 160 and the spring shoe 158 of the rack 16. The tension spring imparts a force so that the followers 162, 163 and 167, provided on the sliding plate 160, are biased into contact with the left ends of the long holes 150, 151 and 155. The followers 172, 173 and 174, provided on the sliding plate 170, come into contact with the right ends of the long holes 152, 153 and 154. Each of the oscillating levers 175 is imparted a force by a spring so that the follower 177 provided at the leading end of one arm of the oscillating lever 175 drops into the stop grooves of the stop-grooved long holes 156 and 157.

Upon insertion of the CD, the interval between the pins 159 provided on the arm other than that having the follower 177 of the oscillating lever 175 provided thereon is broadened, and the follower 177 comes off the stop grooves of the stop-grooved long holes 156 and 157. Thereupon, the sliding plate 160 becomes displaceable to the right by the action of the right oscillating lever 175, and the sliding plate 170 becomes displaceable to the left under the effect of the left oscillating lever 175. In a state in which the follower 177 remains in the stop grooves of the stop-grooved long holes 156 and 157, the sliding plate 160 or 170 cannot displace. That is, the CD can be received only when the both oscillating levers 175 are separated to the right and to the left. It is thus possible to avoid insertion of a single CD having an outside diameter of, for example, 8 cm different from that of the CD 14 of 12 cm. The interval between the pins 159 provided on the oscillating lever 175 is slightly larger than the outside diameter of a single CD so that, upon insertion of a single CD, it is impossible to cause a transverse displacement of the sliding plate 160 or 170.

As shown in FIGS. 28 to 31, two light-emitting diodes (hereinafter abbreviated as "LED") 180 and 181 are arranged on the rack 16 at an interval along a straight line in the front-back direction. The light emitted from the LEDs 180 and 181 is detected by a photosensor provided in the PU unit 15 as described later. Displacement of the sliding plate 160 within the rack 16 is detected by an insertion detecting SW 182, thus permitting detection of the insertion of a CD.

Figure 33:
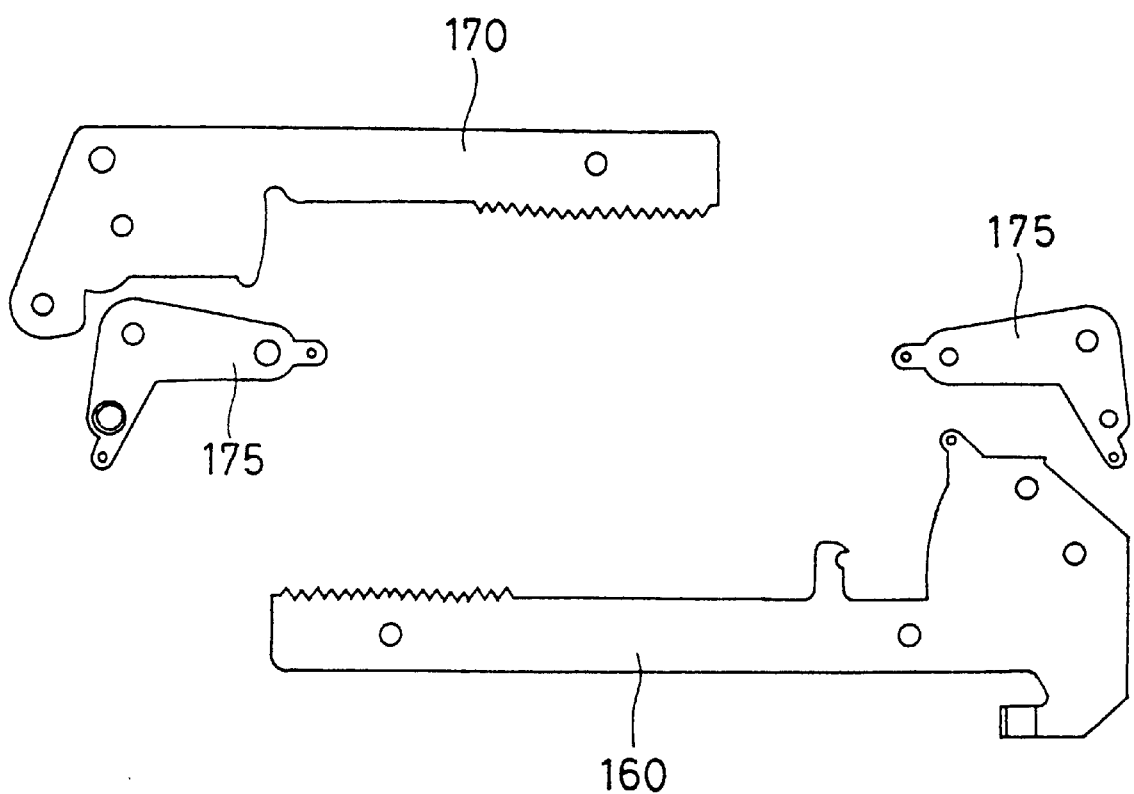
FIG. 33 is a plan view illustrating component parts of the disk identifying mechanism provided on the rack 16 shown in FIGS. 28 to 31.

FIG. 33 illustrates shapes of the main sliding plates 160 and 170 and the oscillating lever 175 of the disk identifying mechanism shown in FIG. 32. Because the oscillating lever 175 constrains the sliding plates 160 and 170, respectively, in a state in which the follower 177 at the leading end of one arm engages with the stop grooves of the stop-grooved long holes 156 and 157, the sliding plates 160 and 170 cannot displace. The sliding plates 160 and 170 can displace in parallel with each other while rotating an interlocking gear 169 only when the followers 177 of the both oscillating levers 175 come off the stop grooves of the stop-grooved long holes 156 and 157.

Figure 34:
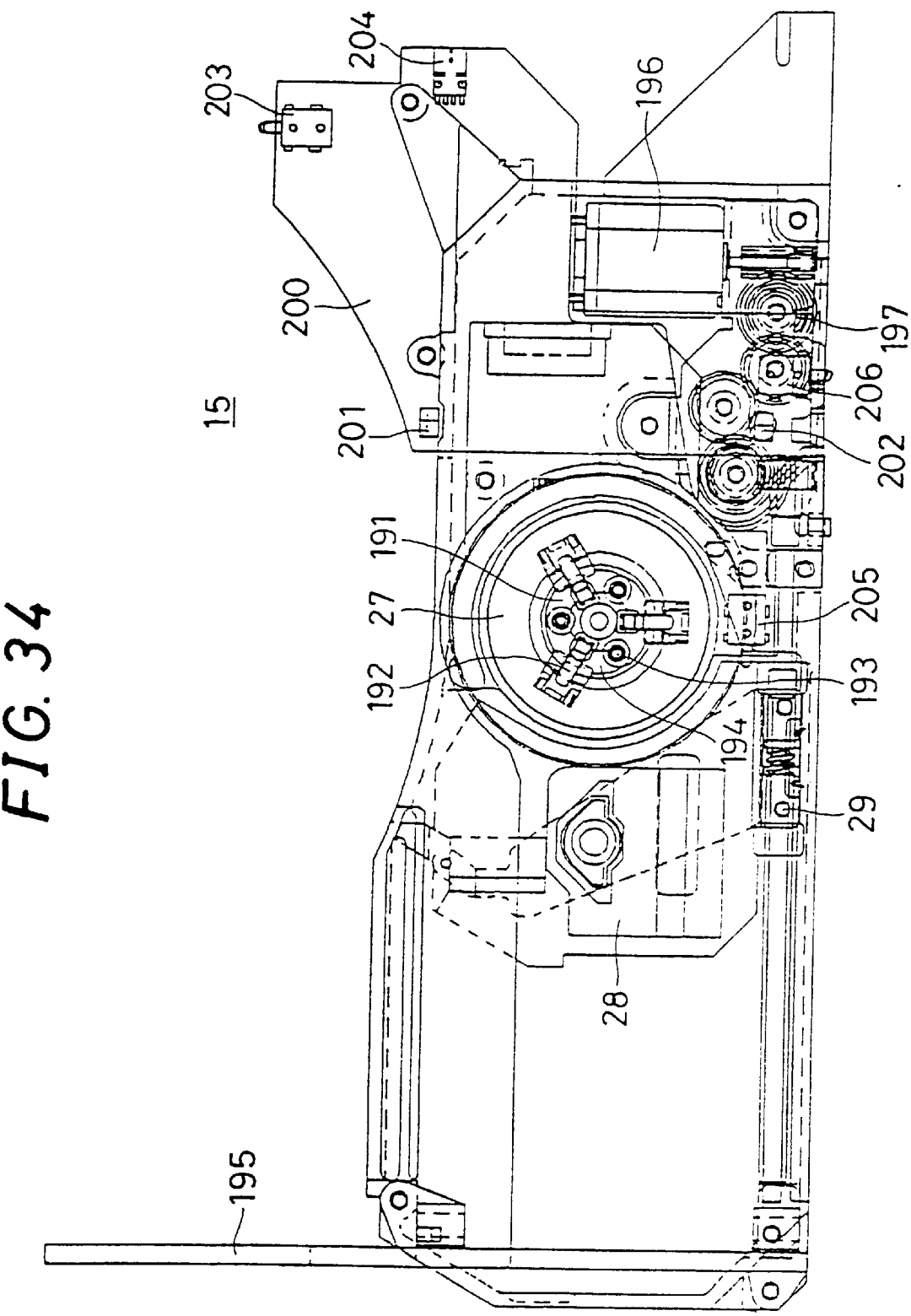
FIG. 34 is a plan view of a PU unit 15 shown in FIG. 1.
Figure 35:
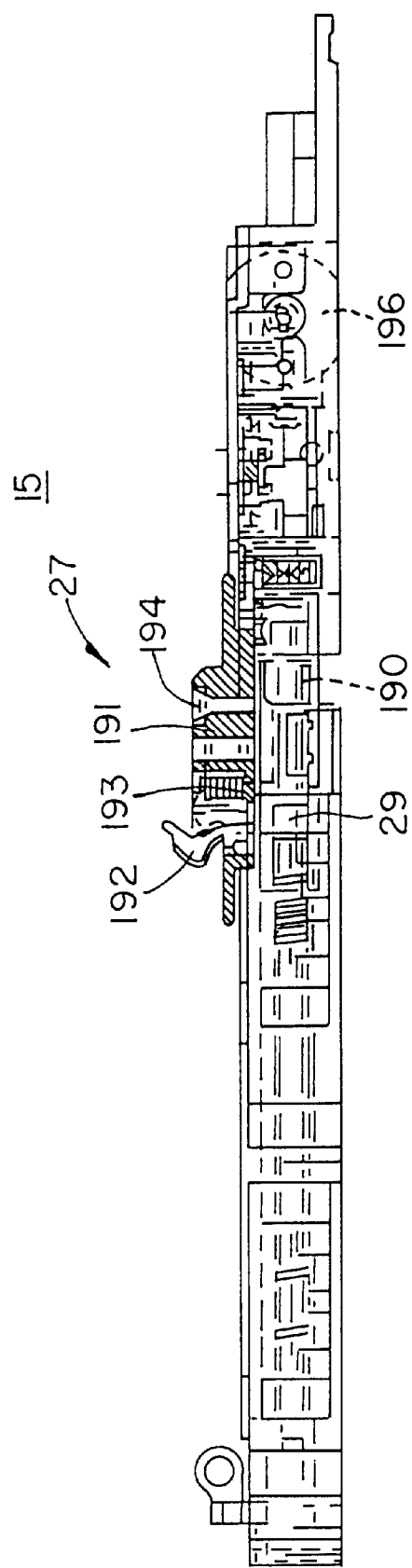
FIG. 35 is a front view of the PU unit 15 shown in FIG. 1.
Figure 36:
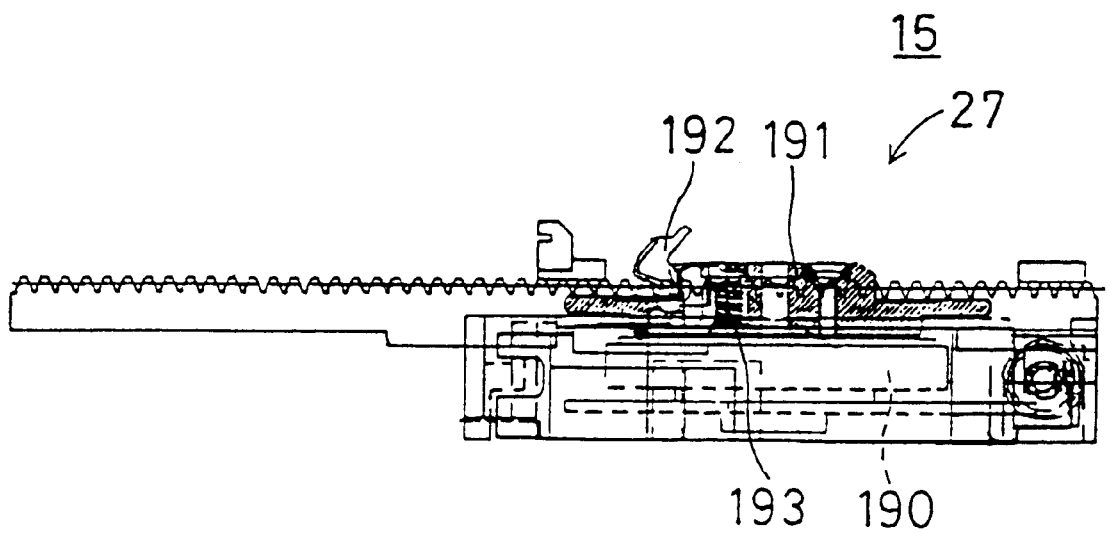
FIG. 36 is a left side view of the PU unit 15 shown in FIG. 1.
Figure 37:
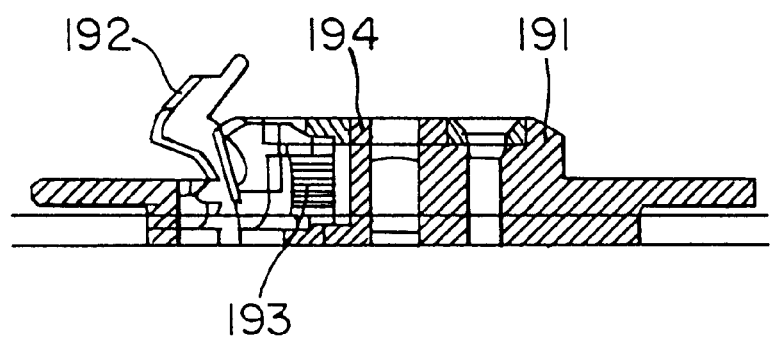
FIG. 37 is a sectional front view illustrating a configuration of the center shaft 191 of a turntable 27.
Figure 38:
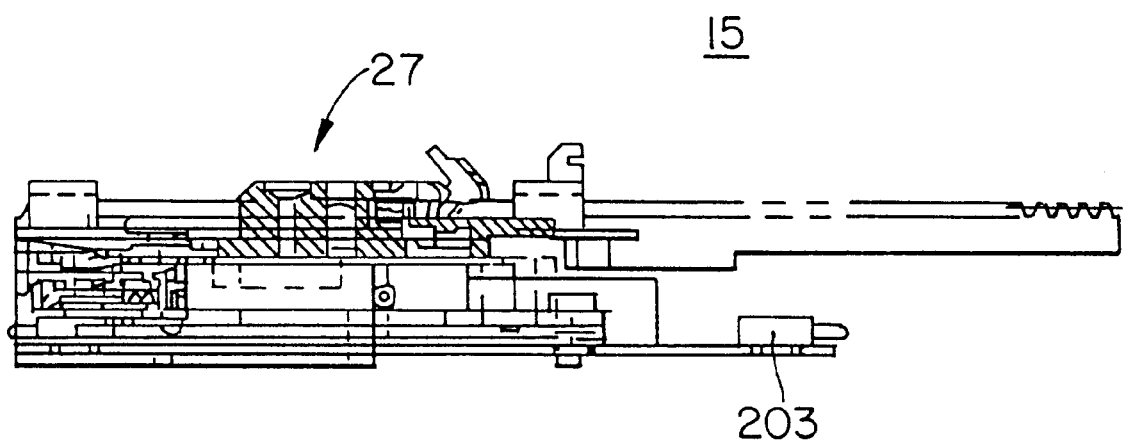
FIG. 38 is a right side view of the PU unit 15.

FIGS. 34 to 36 are a plan view, a front view and a left side view, respectively, of the PU unit 15 shown in FIG. 1. A turntable 27 is provided substantially at the center of the PU unit 15, and a center shaft 191 is rotation-driven directly by a motor 190. A plurality of pawls 192 are attached to the center shaft 191 shown in FIG. 37, and a force to expand radially outside is imparted by a spring 193 attached at a position toward the interior of the center shaft. The spring 193 is held by a cover 194. The spring 193 is a compression spring having a small diameter, and it suffices to insert it in parallel with the axial direction of the center shaft 191, thus permitting relatively easy assembly. A tracking mechanism 29 for moving the PU 28 is provided to the left of the turntable 27. A rack 195 engaging with the pinion gear 134 provided on the rack 16 is attached to the left side of the PU unit 15 to convert the rotation force of the pinion gear 134 into linear motion of the PU unit 15. The tracking mechanism 29 is driven by a motor 196 arranged to the right of the turntable 27 of the PU unit 15 and a transmission gear 197 transmitting the rotation driving force thereof. FIG. 38 is a right side view of the PU unit 15.

A sensor board 200 is attached to the rear of a portion of the PU unit 15 to the right of the turntable 27. An ejection end sensor 201 and a disk presence detecting sensor 202 are attached at an interval as photosensors for receiving the light from an LED 180 are attached to the rack 16 on a straight line extending from front to rear on the sensor board 200. A clamping position SW 203, which detects that the PU unit 15 advances to the rearmost position and arrives at a clamping position allowing insertion of the CD 14 held in the stocker 13 to the center shaft 191, is provided at the rear end of the sensor board 200. A PLAY position sensor 204 which detects the PLAY position, after retreat of the PU unit 15 from the clamping position, for reproduction of the CD 14, is provided on the right side of the sensor board 200. The PLAY position sensor 204 comprises a photointerrupter in which a member interrupting the light is arranged at the PLAY position. A PU origin SW 205, for detecting the state in which the PU 28 is at the position of origin, is provided in the portion closer to the front below the turntable 27. There is also provided a unit origin SW 206 having a detecting end projecting slightly from the front end of the PU unit 15 and detecting the presence of the PU unit 15 at the frontmost origin of the rack 16.

Figure 39:
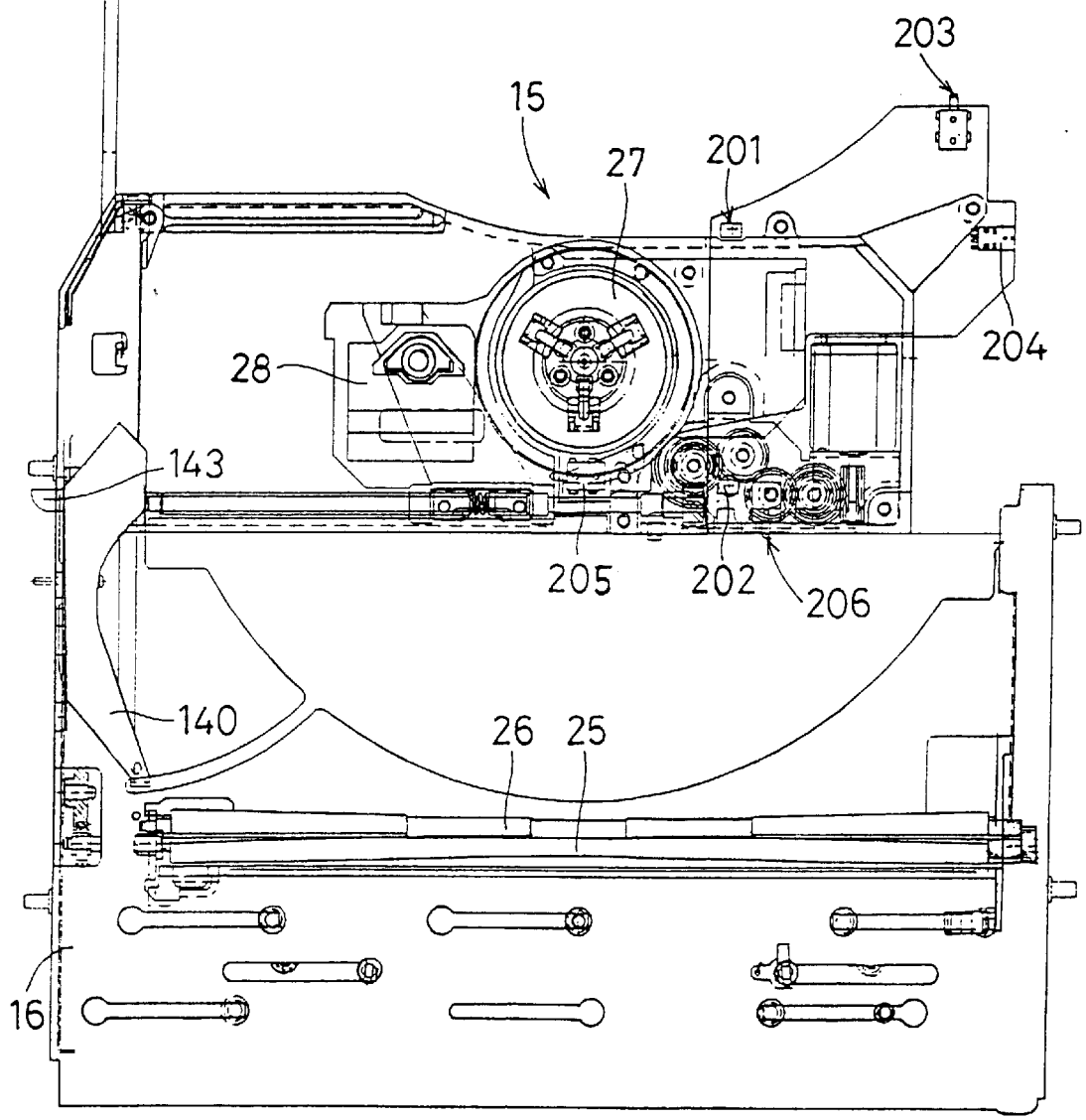
FIG. 39 is a plan view illustrating the PU unit 15 displaced to a PLAY position.

FIG. 39 illustrates a state in which the PU unit 15 has advanced from the rack 16 and is present at the PLAY position. The PLAY position is detected by a PLAY position sensor 204. The PLAY position sensor 204 comprises a photointerrupter, and can detect that the PLAY position has been reached by interrupting the light from the light-emitting element before reaching the photo-element.

Figure 40:
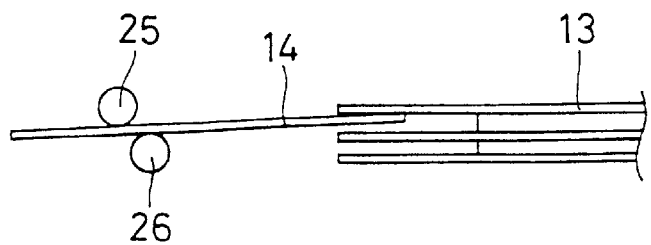
FIG. 40 is a schematic sectional side view illustrating the effect of shift of a roller of transfer means 24.

FIG. 40 illustrates a state in which the upper roller 25 for transfer and the lower roller 26 for pressing of the transfer rollers 24 provided on the rack 16 have a vertical shift, such that the leading end of the CD 14 is inclined in an upward direction by locating the lower roller on the transfer direction. Because the leading end of the CD 14 is directed upward, it comes into contact with the front extension of the stocker member 100 of the stocker 13 or the uppermost-stage stocker member 101, and insertion is ensured without dropping.

Figure 41:
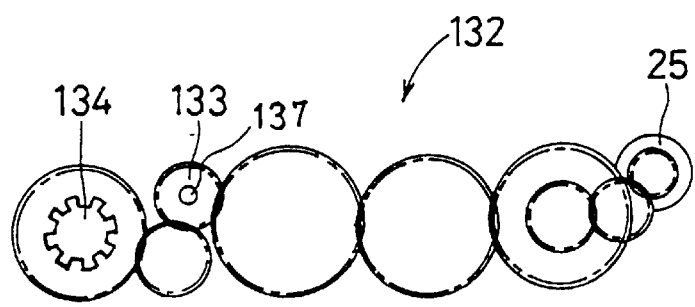
FIG. 41 is a left side view illustrating a gear train provided to the left of the rack 16.

FIG. 41 illustrates a gear train comprising a transmission gear 132, a displacement gear 133 and a pinion gear 134 provided on the left side of the rack 16. Because the displacement gear 133 arranged between the transmission gear 132 and the pinion gear 134 is vertically displaceable, it is possible to interrupt transmission of the driving force from the transmission gear 132 to the pinion gear 134 in a state in which the transmission gear 133 is slightly displaced in an upward direction.

Figure 42:
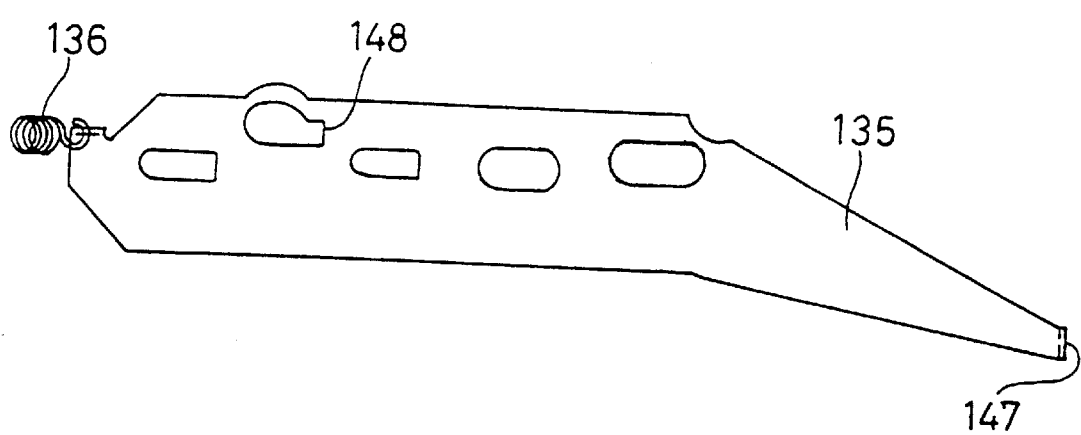
FIG. 42 is a left side view of a sliding plate 135 for locking, the sliding plate is arranged to the left of the rack 16.

FIG. 42 illustrates the shape of the locking sliding plate 135 arranged between the gear train shown in FIG. 41 and the left side of the rack 16. Since the right leading end 147 of the locking sliding plate 135 engages with the leading end of the PU unit 15, displacement of the PU unit 15 causes the locking sliding plate 135, elastically supported by a spring 136, to displace toward the stocker 13. A cam groove 148 holding the displacement gear in engagement in contact with the rotation shaft of the displacement gear 33 is formed on the locking sliding plate 135 which is held in engagement after the start of displacement of the PU unit 15.

Figure 43:
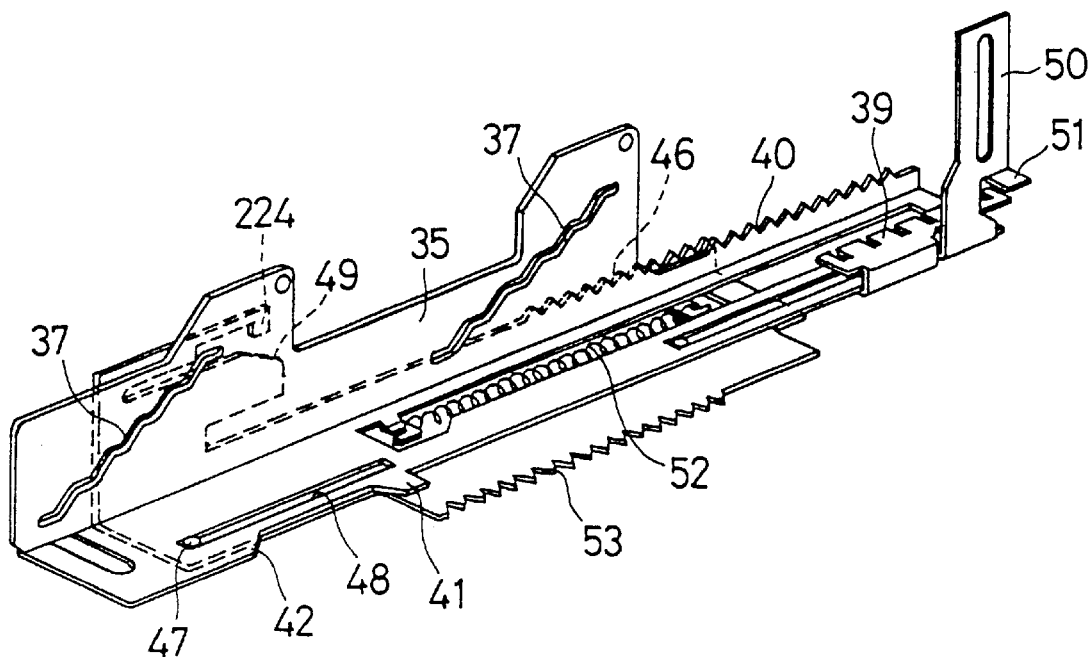
FIG. 43 is a perspective view illustrating the relationship between a stair sliding member 35 and a locking sliding member 45 shown in FIGS. 6 to 10.
Figure 44:
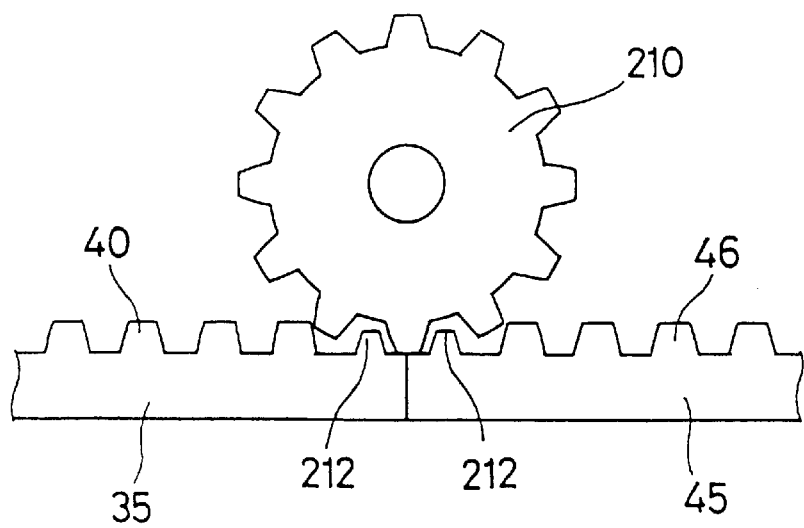
FIG. 44 is a left side view illustrating an interlocking portion of a stair rack 40 of the stair sliding member 35 and a locking rack 46 of the locking sliding member 45.

FIG. 43 illustrates interlocking of the left stair sliding member 35 and the locking sliding member 45, and FIG. 44 shows driving of the stair rack 40 and the locking rack 46. The locking sliding member 45 is arranged between the stair sliding member 35 and the base 30, and the foregoing transfer switching cam 49 is formed thereon. The stair sliding member 35 has the stair rack 40 engaging with a pinion 210 rotation-driven by the stair motor 31. The pinion 210 is engageable also with the locking rack 46 of the locking sliding member 45. However, the stair rack 40 and the locking rack 46 are never in engagement simultaneously with the pinion 210, i.e. only one engages at a time with the latter. To ensure smooth switching of engagement, gears 211 and 212 are deformed into a shape, for example, in which the thread width becomes narrower at the switching portions of the stair rack 40 and the locking rack 46. A projection 224 will be described later in the description of FIG. 48.

Figure 45:
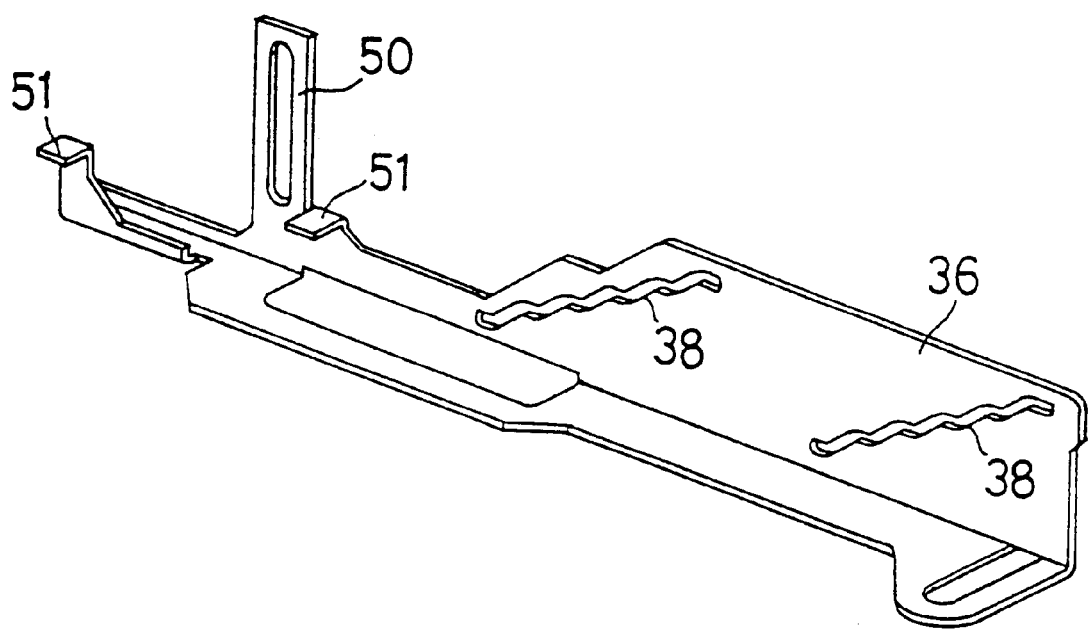
FIG. 45 is a perspective view of a stair sliding member 36 shown in FIGS. 6 to 10.

FIG. 45 illustrates a configuration of the right stair sliding member 36. Because the right stair sliding member 36 displaces in a direction counter to that of the left stair sliding member 35, the stair groove 38 is formed in a direction counter to that of the stair groove 37 formed in the left stair sliding member 35.

Figure 46:
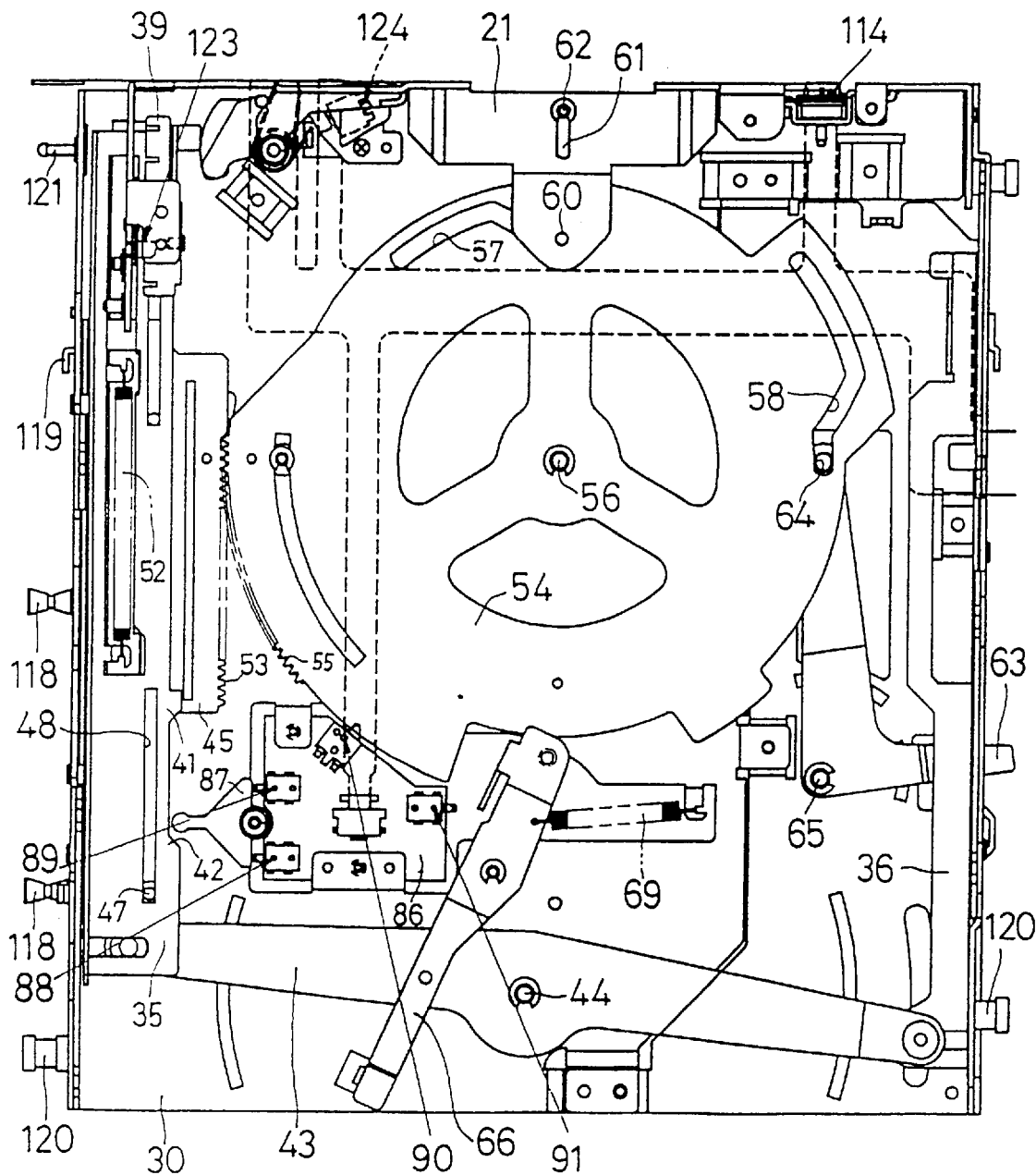
FIG. 46 is a schematic plan view illustrating operation of the locking mechanism shown in FIGS. 6 to 10.

FIG. 46 illustrates operation of the locking pawl 21, the side locking lever 63 and the lock positioning member 118 along with an angular displacement of the cam member 54. At the lock position at which the locking sliding member 45 retreats, the locking pawl 21 projects rearwardly, and the side locking lever 63 projects to the right, resulting in a displacement toward the rear of the lock positioning member 118. The lock position SW 90 is turned off.

Figure 47:
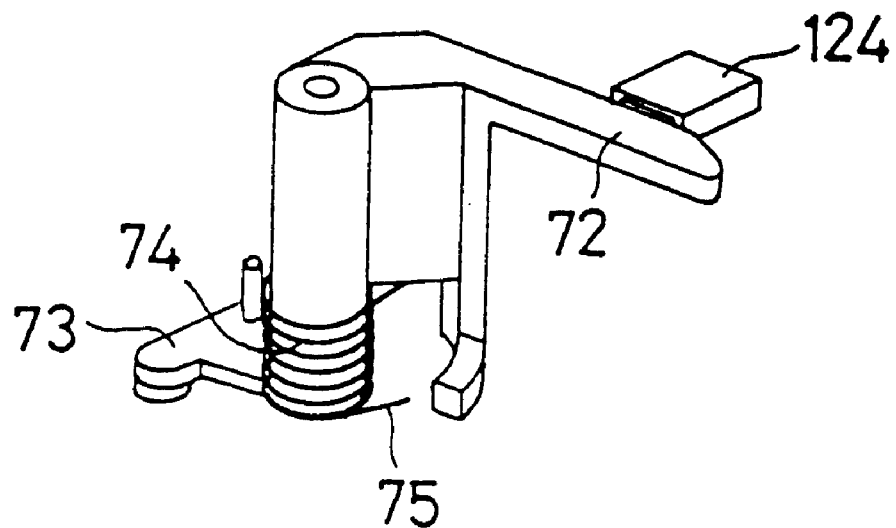
FIG. 47 is a perspective view illustrating a configuration associated with a push lever 72 shown in FIGS. 6 to 10.
Figure 48:
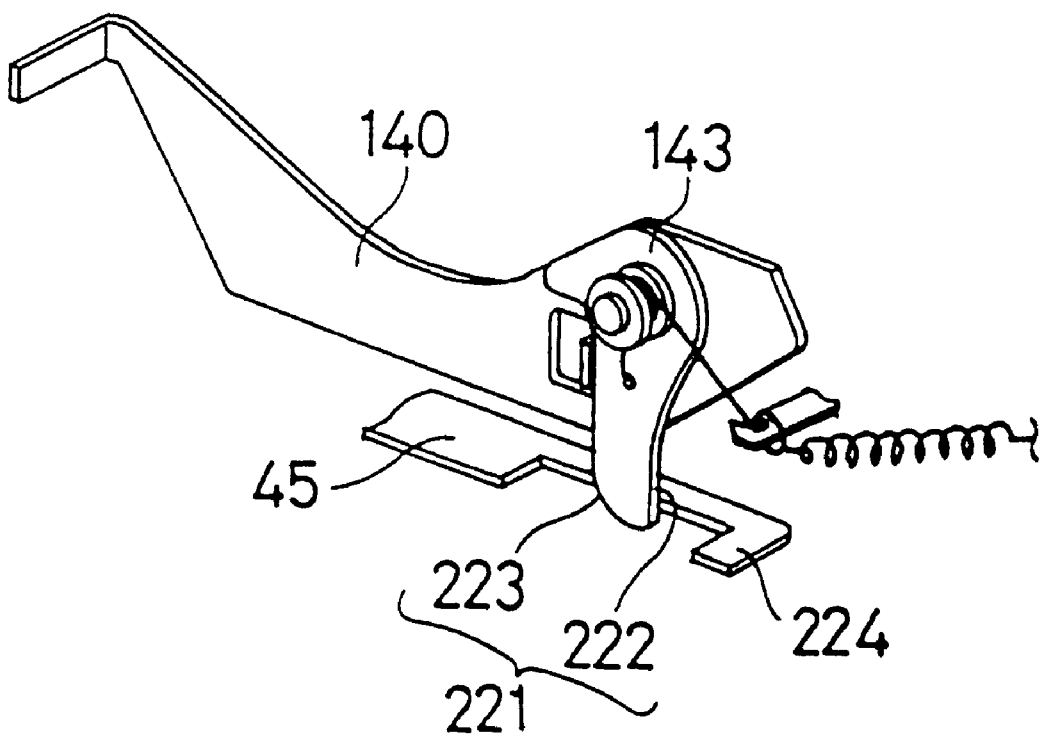
FIG. 48 is a perspective view illustrating a configuration associated with a dump lever 140 shown in FIGS. 28 to 31.

FIGS. 47 and 48 illustrate a configuration associated with the push-out lever 72 and the push-in lever 140. The push-out lever 72, shown in FIG. 47, has a spring 74 in the space separating the lever 72 from the transmission lever 73, is pushed to the rear upon insertion of the CD into the stocker 13 and turns on the insertion end switch 124. In the push-in lever 140, of which a bottom view is shown in FIG. 48, a projection of the transmission lever 143 has a straight portion 222 and a curved portion 223. When a projection 224 formed on the locking sliding member 45 is in contact with the straight portion 222, therefore, a driving force causing an angular displacement of the push-in lever 140 is transmitted. When the projection 224 is in contact with the curved portion 223, only the transmission lever 143 angularly displaces and no driving force is transmitted to the push-in lever 140.

Figure 49:
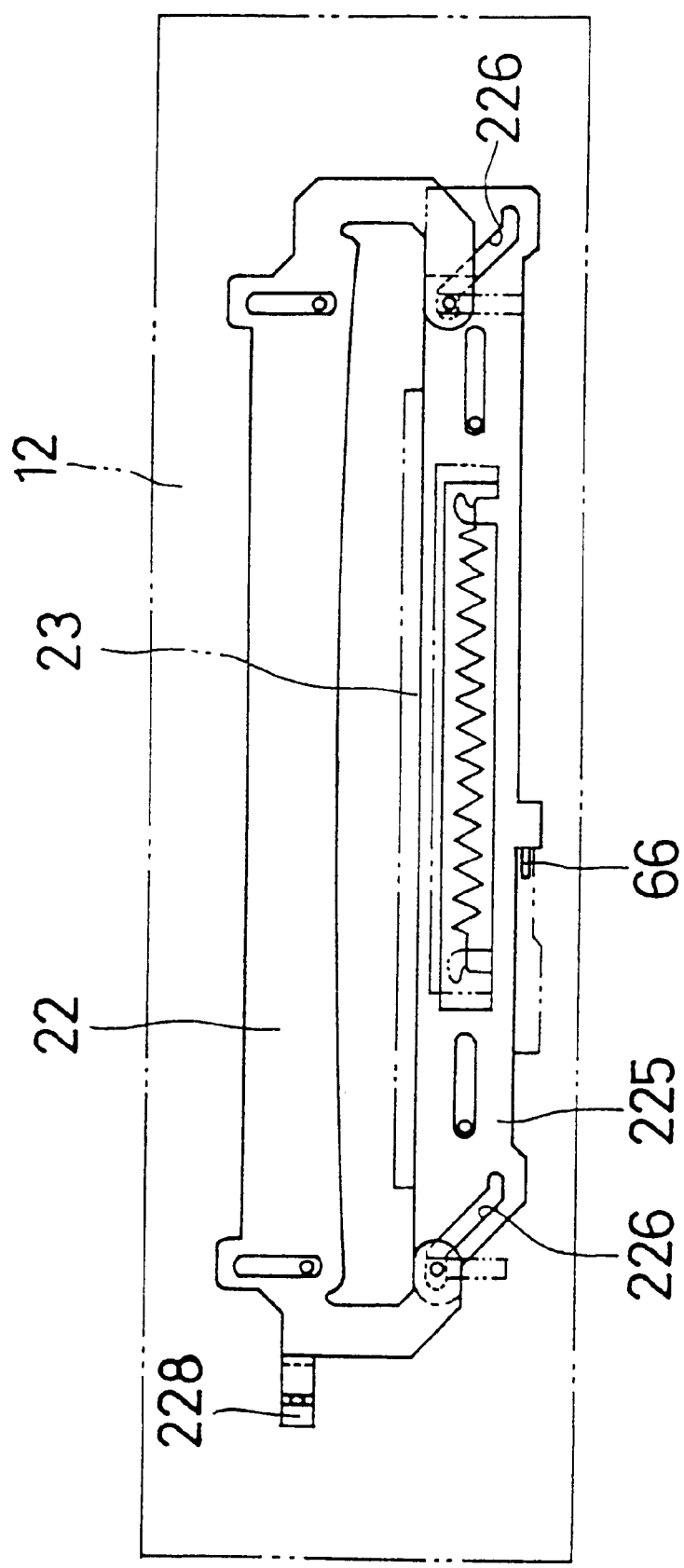
FIG. 49 is a schematic front view illustrating a configuration associated with a shutter 22 shown in FIG. 1.

FIG. 49 illustrates a configuration associated with the shutter shown in FIG. 1. The shutter 22 opens by the driving force imparted through the shutter transmission lever 66 only at a position at which the locking sliding member 45 fully retreats. In this state, the chassis 20 is fixed to the enclosure 12 by the locking pawl 21, the side locking lever 63 and the lock positioning member 118, thus permitting smooth insertion and ejection of the CD 14. The leading end of the shutter transmission lever 66 causes a transverse displacement of the sliding plate 225. The transverse displacement is converted into a vertical opening/closing operation through the pin of the shutter 22 engaging with a slant groove 226. Whether or not the shutter 22 is closed is detected by a sampling detecting sensor 228 based on a photointerrupter. The sampling detection sensor 228 is turned on in a state in which the leading end of the shutter transmission levers 66 opens the opening 23 by means of the shutter 22. After inserting the CD 14 in the opening state of the shutter 22, the shutter 22 cannot be closed in the state of the CD 14 remaining in the opening 23. The sampling detection sensor 228 maintenance the ON state. When the CD 14 is removed, the sampling detection sensor 228 is turned off.

Figure 50:
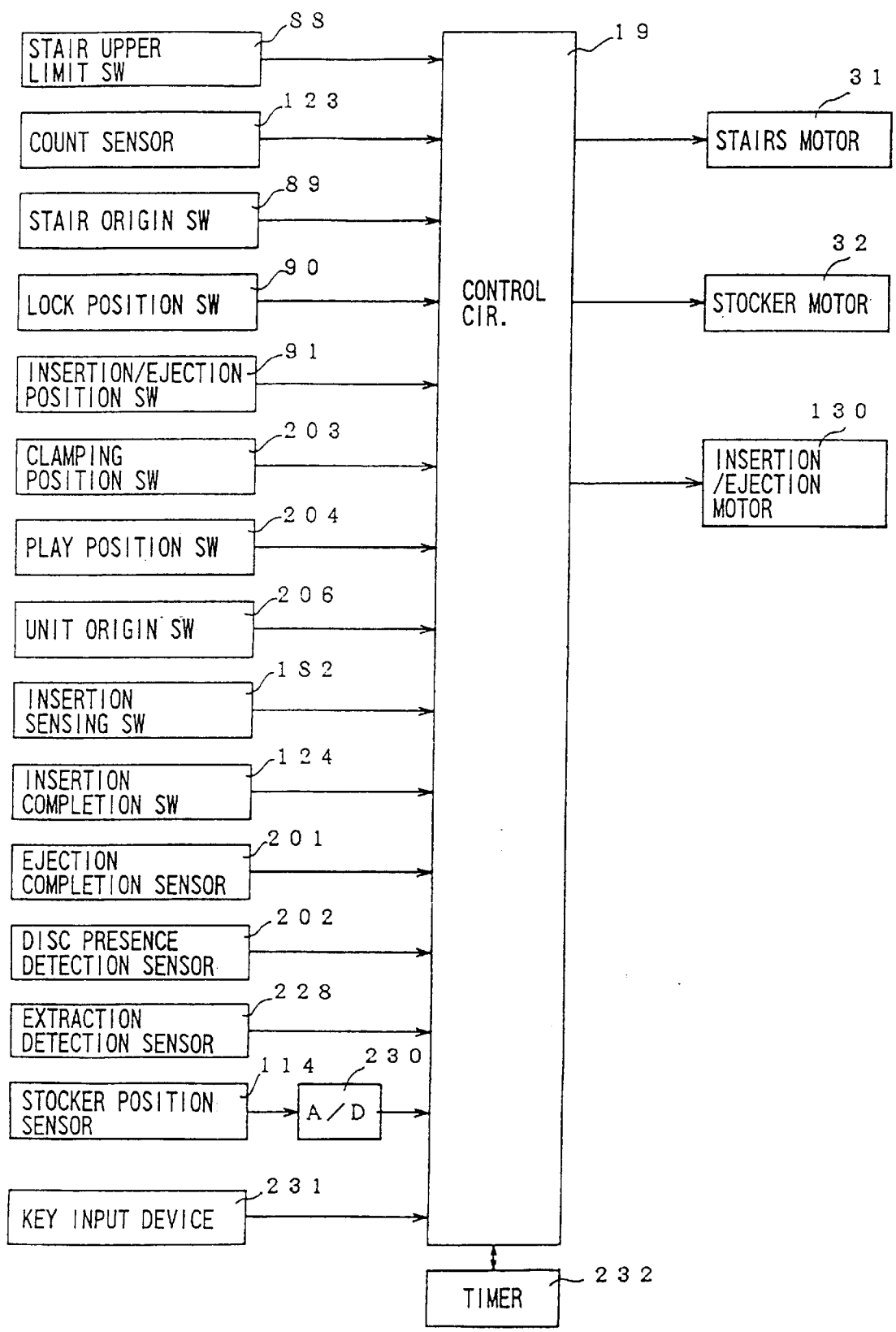
FIG. 50 is a block diagram illustrating an electric configuration associated with a control circuit 19 shown in FIG. 1.

FIG. 50 illustrates an electric configuration associated with the control circuit 19 of the autochanger apparatus 11 shown in FIG. 1. A voltage output corresponding to an absolute position of the position detector 104 is available from the stocker position sensor 114 detecting the lifted position of the stocker. This voltage output is converted by an analog/digital conversion (hereinafter abbreviated as "A/D") circuit 230 into digital data, and entered into the control circuit 19 achieved by program operation of a microcomputer. Signals from the other switches and sensors are entered into the control circuit 19 as well, and the stair motor 31, the stocker motor 32 and the insertion/ejection motor 130 are rotation-driven in accordance with a predetermined program. The displacement positions of the stair sliding members 35 and 36 can be detected as a count of the number of times of passage of the slit 39 through the gap between a light-emitting element and a light-receiving element of a count sensor 23 based on a photointerrupter. A key-input unit 231 which is instruction input means for entering the operating status of the autochanger apparatus 11, and a timer 232 for setting and measuring time are also connected to the control circuit 19.

Figure 51:
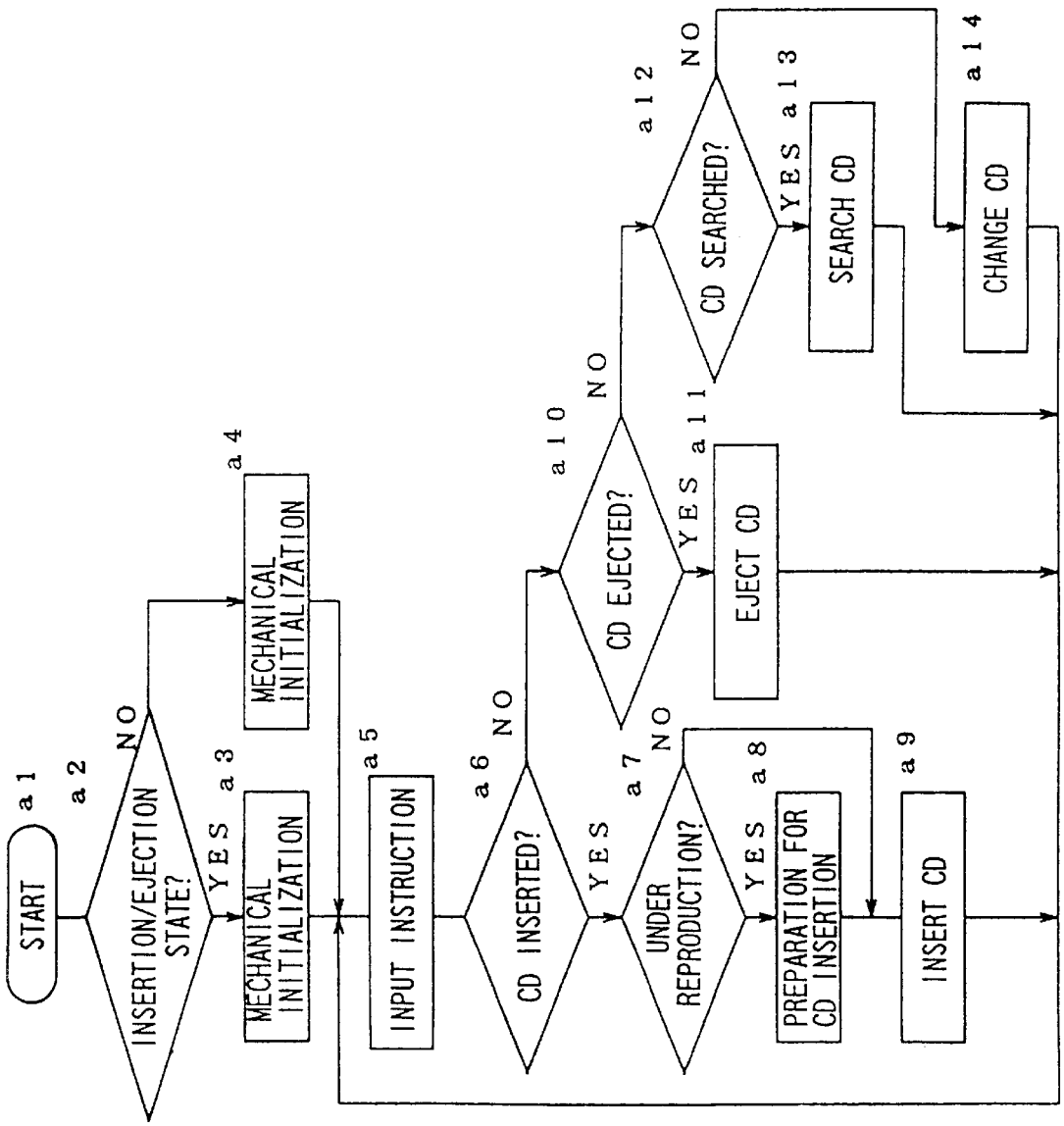
FIG. 51 is a flowchart illustrating entire operations of the control circuit 19 shown in FIG. 50.

FIG. 51 illustrates operations of the control circuit 19 shown in FIG. 50. Operation is started in Step a1, and in Step a2, it is determined whether or not the apparatus is ready for insertion or ejection of the CD 14. If ready, a mechanical initialization for the insertion/ejection state is carried out in Step a3. If not, a mechanical initialization other than that for the insertion/ejection state is performed in Step a4. Upon completion of the mechanical initialization in Step a3 or a4, input of an instruction from the key-input unit 231 is waited for in Step a5. Upon input of an instruction, it is determined in Step a6 whether insertion of a CD is instructed or not. If it is determined that insertion of a CD is instructed, it is determined in Step a7 whether another CD is currently reproduced or not. If during reproduction, an operation for discharging the CD in reproduction is carried out as a preparatory operation for CD insertion in Step a8. Upon completion of the CD insertion preparatory operation in Step a8, or when it is determined that no CD is in reproduction in Step a7, a CD inserting operation is conducted in Step a9.

When it is determined in Step a6 that a CD inserting operation is not instructed, it is determined in Step a10 whether or not a ejection operation is instructed. When CD ejection operation is instructed, operation of discharging the CD is performed in Step a11. When it is determined in Step a10 that a CD discharging operation is not instructed, it is determined in Step a12 whether or not a CD retrieval operation is instructed. If instructed, an operation of retrieving the presence of a CD is carried out in Step a13 for each stage of the stocker. If not, a CD changing operation is conducted as a remaining operation in Step a14. Upon completion of the operation in Step a9, Step a11, Step a13 or Step a14, the process returns to Step a5. When any other operation such as an automotive audio equipment, for example, receiving of a broadcasting program from the tuner is instructed in the middle of reproduction, the reproduction is interrupted, and the apparatus is kept ready to resume reproduction at any time.

Figure 52:
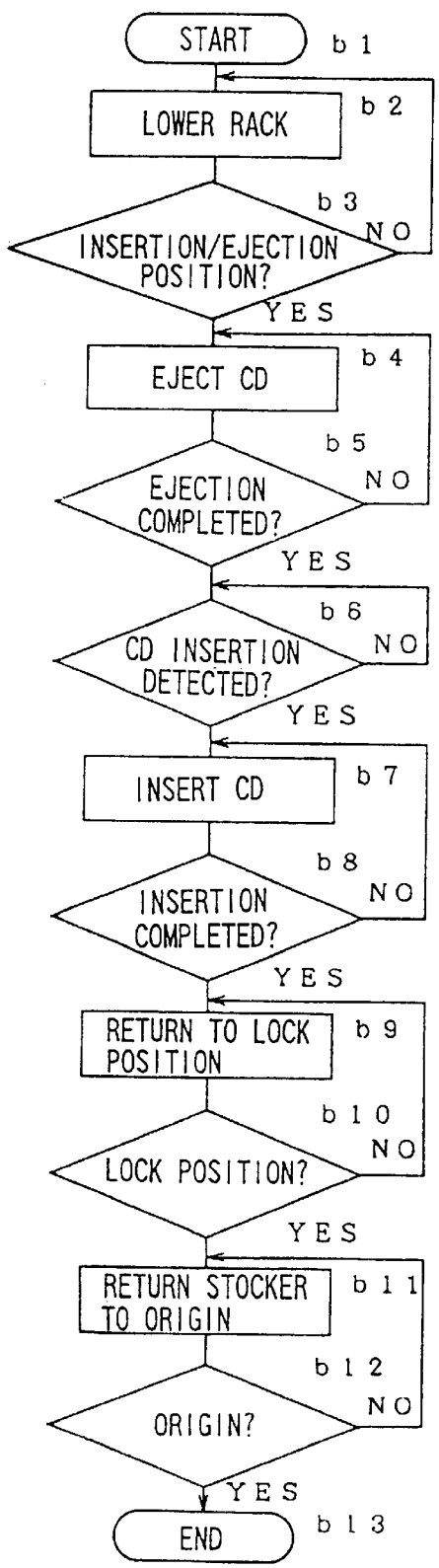
FIG. 52 is a flowchart illustrating operations of the electric configuration shown in FIG. 50.

FIGS. 52 and 53 are a flowchart and a time chart, respectively, of the mechanical initializing operation in Step a3. The process comprises starting operation in Step b1, reversely rotation-driving the stair motor 31 to cause the rack 16 to go down in Step b2, and moving the rack 16 to the insertion/ejection position. When the insertion/ejection SW 91 is turned on in Step b3, the CD discharging operation is started in Step b4. When a ejection end sensor 201 is turn ed on in Step b5, the ejection of the CD is completed. Then, when an insertion detecting SW 182 is turned on in Step b6, the CD inserting operation is started in Step b7, and the inserting operation is continued until an insertion end SW 124 is turned on in Step b8. In Step b9, the stair motor 31 is driven in positive and reverse directions, and the lock position switch 90 is turned from OFF to ON. In Step b10, the lock position returning operation is carried out upon detection of the OFF state again in Step b10. Then, the stocker motor 32 is driven in the reverse direction in Step b11 to cause the stocker 13 to go down to return to the original position. It is determined in Step b12 whether or not the position of the stocker 13 corresponds to a predetermined value, for example, (1F)h with an output from the stocker position sensor 114 as the origin, and the operation is completed in Step b13. Hereinafter, 1F of (1F) represents a two-digit hexadecimal number.

Figure 54:
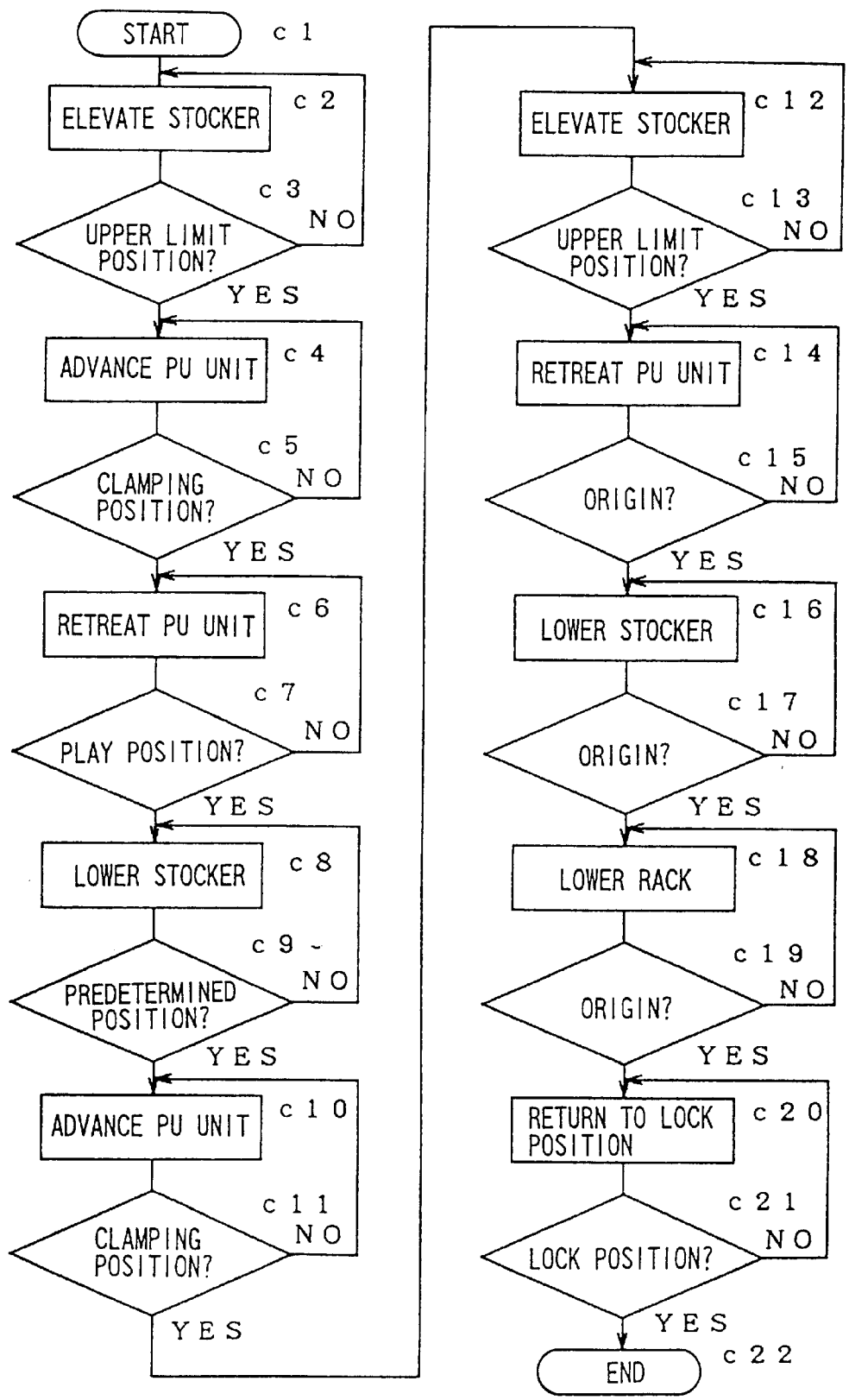
FIG. 54 is a flowchart illustrating the operations of the electric configuration shown in FIG. 50.
Figure 55:
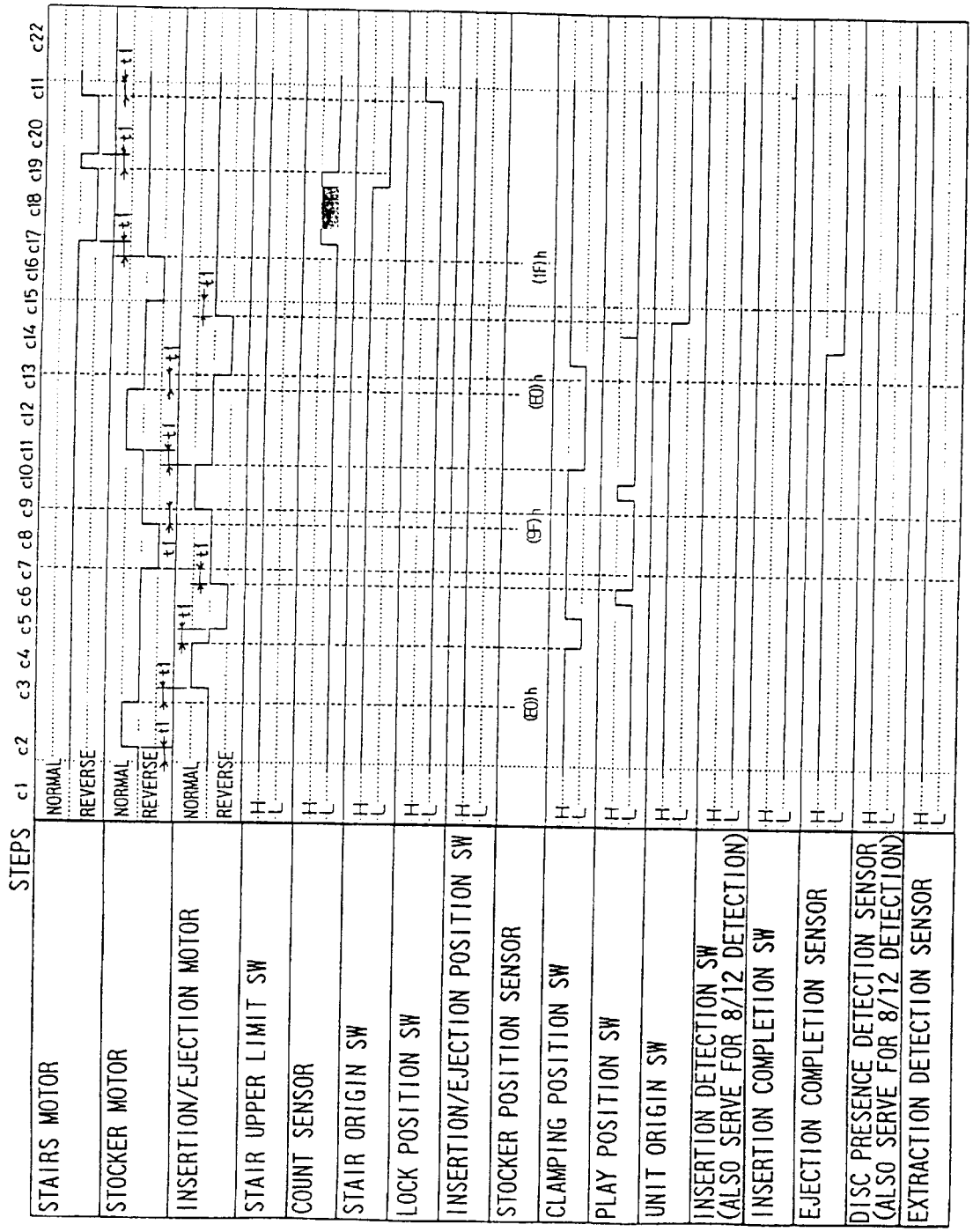
FIG. 55 is a time chart illustrating the operations of the electric configuration shown in FIG. 50.

FIGS. 54 and 55 are a flowchart and a time chart, respectively, corresponding to the mechanical initializing operations other than the insertion/ejection state in Step a4 shown in FIG. 51. Operations are started in Step c1. In Step c2, the stocker motor 32 is caused to rotate in the positive direction to raise the stocker 13 to the upper limit. When arrival at the upper limit is detected from an output of the stocker position sensor 114 in Step c3, the insertion/ejection motor 130 is caused to positively rotate in Step c4, and the PU unit 15 is caused to advance to reach the clamping position. Advance to the clamping position is detected by the ON operation of the clamping position SW 203 in Step c5. Then in Step c6, the insertion/ejection motor 130 is reversely rotated to cause the PU unit 15 to retreat to return to the PLAY position. Return to the PLAY position is detected by a PLAY position sensor 204 in Step c7. In Step c8, the stock motor 32 is caused to rotate in the reverse direction for descent of the stocker 13. The descent position of the stocker 13 is detected from an output of the stocker position sensor 114 in Step c9. After the descent of the stocker 13, the insertion/ejection motor 130 is positively rotated for advance of the PU unit 15, thus inserting the CD 14 attached to the turntable 27 into the stocker 13.

When the clamping position SW 203 is turned on in Step c11, the insertion/ejection motor 130 stops, and after the lapse of a certain period of time t1, the stocker motor 32 positively rotates. As a result, the CD 1 is pulled out from the center shaft 191 of the turntable, thus releasing clamping. When the lifted position of the stocker 13 is determined to reach a predetermined position from an output of the stocker position sensor in Step c13, the unit ejection operation in which the PU unit 15 retracts to the origin position of the rack 16 is conducted in Step c14. When return to the origin is detected by a unit origin SW 206 in Step c15, the stocker motor 32 is reversely rotated in Step c16 to conduct origin returning operation of the stocker 13. When the return to the origin is detected from an output of the stocker position sensor 114 in Step c17, the stair motor 31 is reversely rotated in Step c18, and the origin returning operation of the rack 16 is carried out. In Step c19, the stair origin SW 89 is turned on. When a portion of the stair sliding member 35 having a slit 39 comes off the count sensor 123, return of the rack 16 to the origin is completed. The stair motor 31 once stops for a period of time t1, and then resumes reverse rotation. In the meantime, the rack engaging with the pinion 210 is switched over from the stair rack 40 of the stair sliding member 35 to the locking rack 46 of the locking sliding member 45. When the lock position SW 90 is turned off in Step c21, the operations are completed in Step c22.

Figure 56:
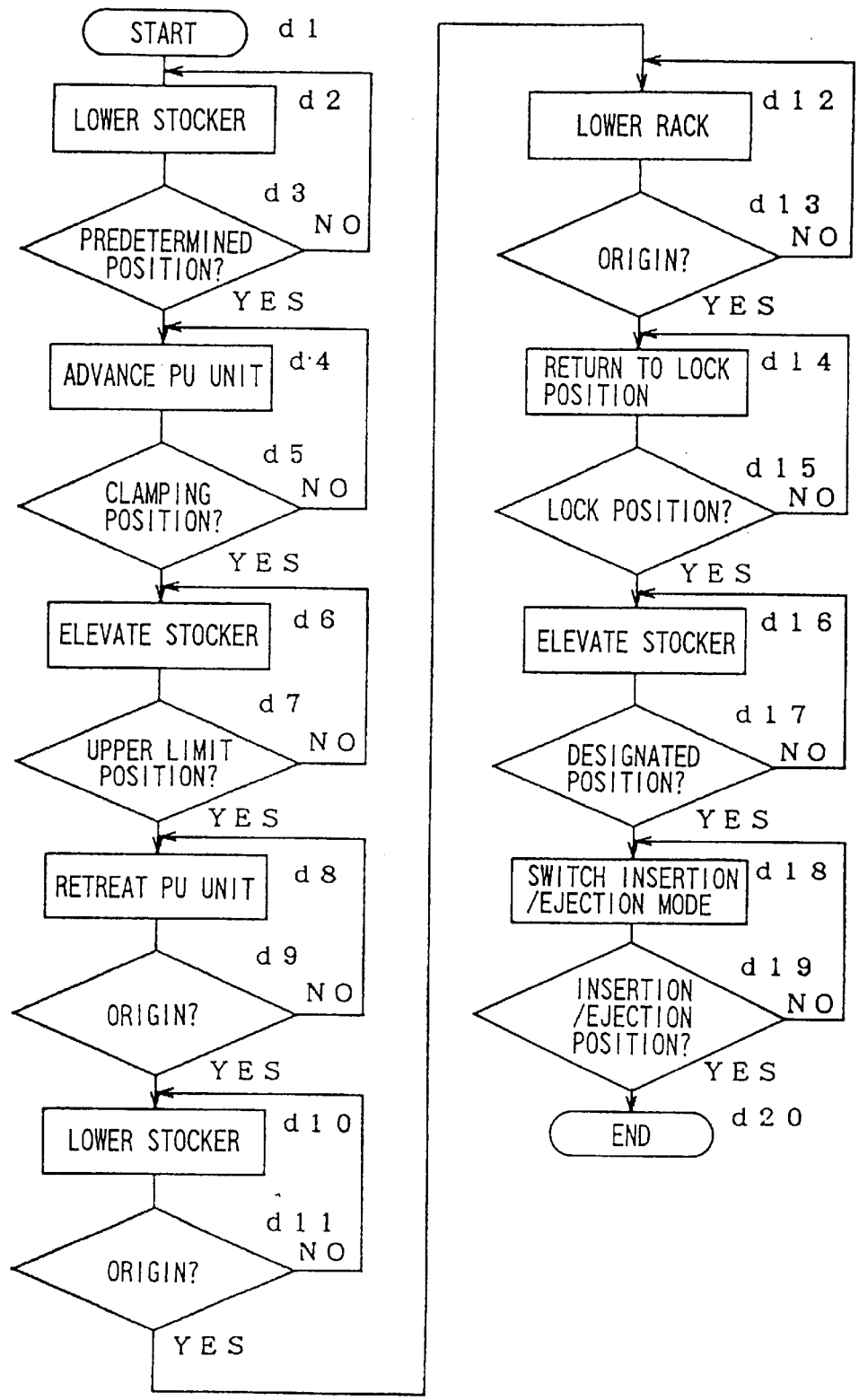
FIG. 56 is a flowchart illustrating the operations of the electric configuration shown in FIG. 50.
Figure 57:
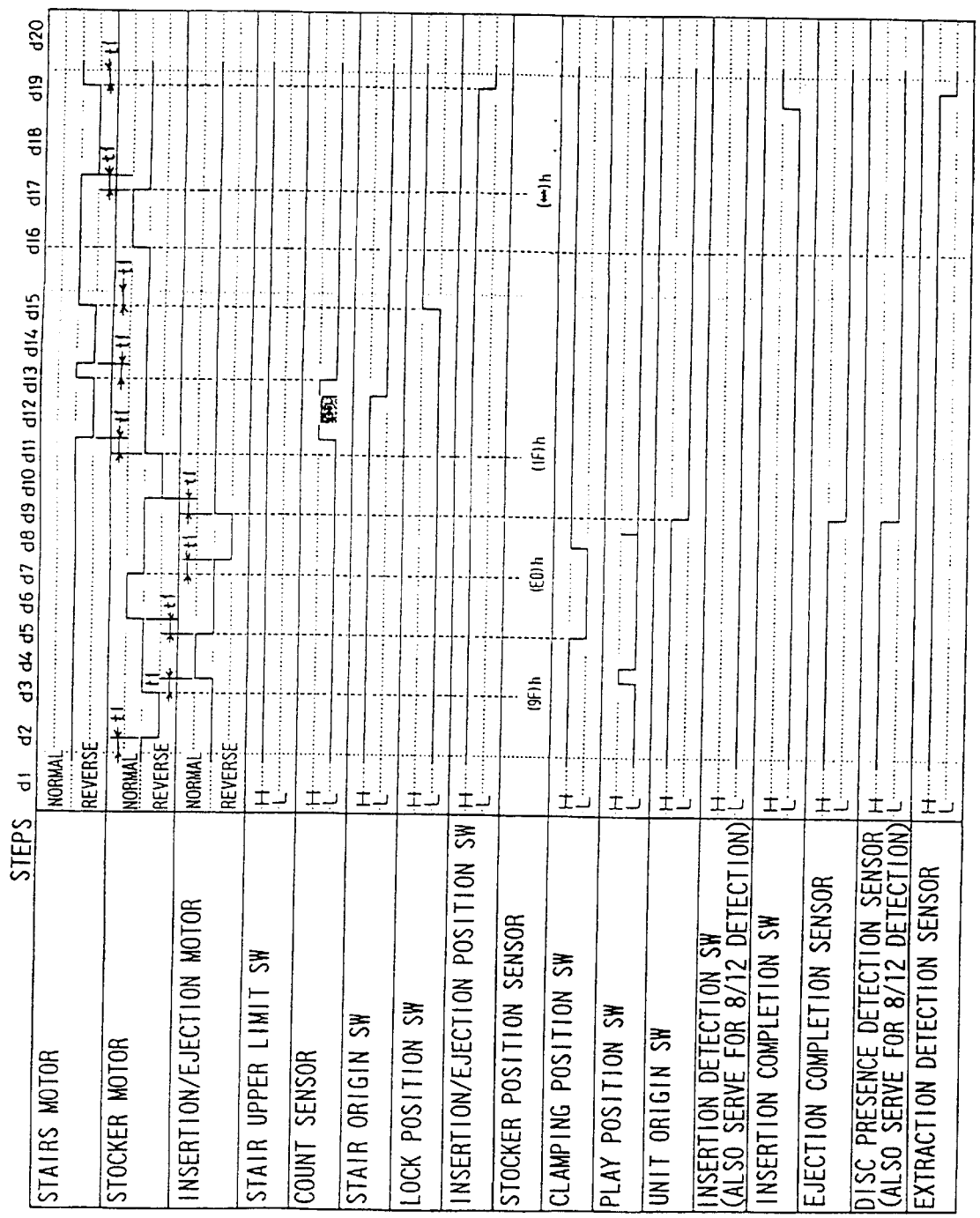
FIG. 57 is a time chart illustrating the operations of the electric configuration shown in FIG. 50.

FIGS. 56 and 57 are a flowchart and a time chart, respectively, of the CD insertion preparatory operation in Step a8. Operations are started in Step d1, and in Step d2, the stocker motor is reversely rotated to move down the stocker 13. When the stocker 13 goes down and reaches a predetermined position from an output of a stocker position sensor 114 in Step d3, the stocker motor 32 is stopped, and after the lapse of a certain period of time t1, the insertion/ejection motor 130 is positively rotated to cause the PU unit 15 to advance into the stocker 13. When the clamping position SW 203 is turned on in Step d5, the insertion/ejection motor 130 is stopped, and after the lapse of a certain period of time t1, the stocker motor 32 is positively rotated to raise the stocker 13 to perform clamping releasing operation to pull out the CD 14 from the center shaft 191.

When the rise of the stocker 13 to a predetermined position is detected from an output of the stocker position sensor 114 in Step d7, the motor 130 is reversely rotated in Step d8 to carry out a unit ejection operation to cause the PU unit to retreat from the stocker 13. When the unit origin SW 206 is turned on in Step d9, the insertion/ejection motor 130 is stopped. Then after the lapse of a certain period of time t1, the stocker motor 32 is reversely rotated in Step d10 to return the stocker 13 to the origin. When an output of the stocker position sensor 114 reaches a predetermined value in Step d11, the stocker motor 32 is stopped, and after the lapse of a certain period of time t1, the stair motor 31 is reversely rotated in Step d12 to return the rack 16 to the origin. After the stair origin SW 89 is turned on, the rack engaging with the pinion 210 is switched over from the stair rack 40 of the stair sliding member 35 to the locking rack 46 of the locking sliding member 45, and a lock position return operation is performed in Step d15. The lock position return operation is completed when the lock position SW 90 is turned off in Step d14, and the stair motor 31 is stopped. In Step d15, the stocker 32 is positively rotated to conduct an ascending operation of the stocker 13. When arrival at a predetermined position is detected in Step d16 from an output of the stocker position sensor 114, the stocker motor 32 is stopped. After the lapse of a certain period of time t1, the insertion/ejection mode switching operation in Step d17 is carried out by reversely rotating the stair motor 31. When the insertion/ejection position SW 91 is turned on in Step d19, the operations are completed in Step d20.

Figure 58:
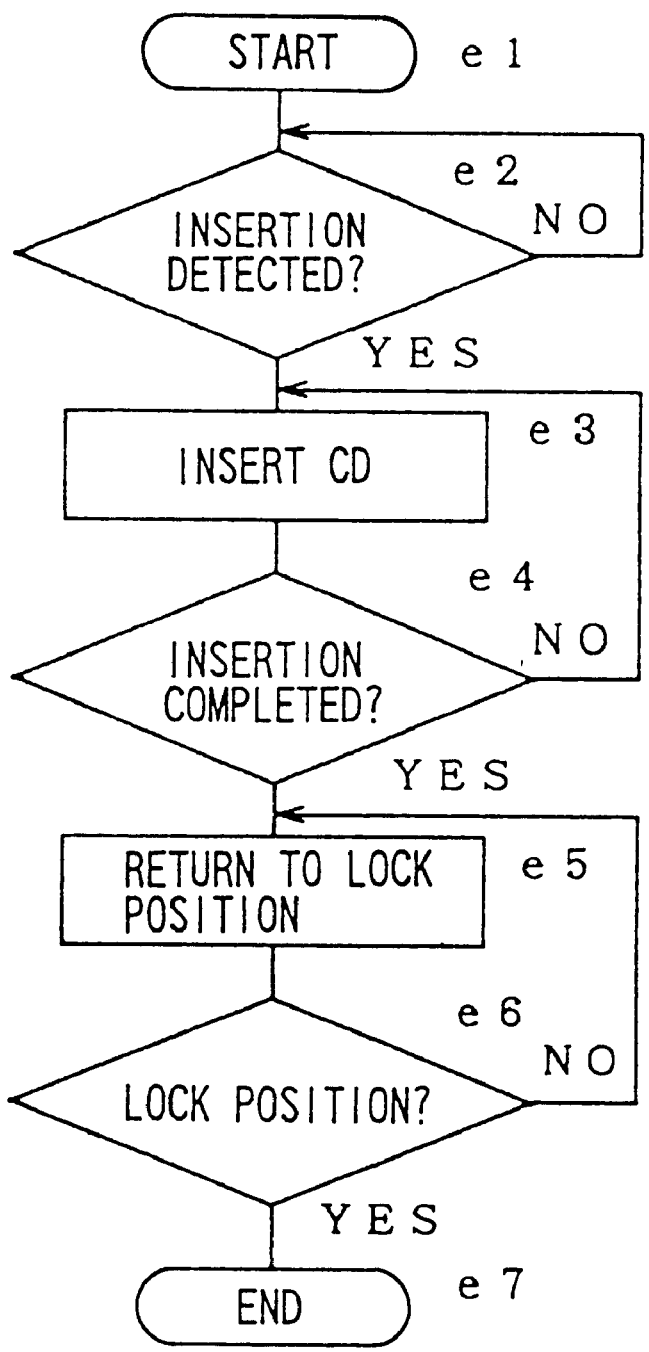
FIG. 58 is a flowchart illustrating the operations of the electric configuration shown in FIG. 50.
Figure 59:
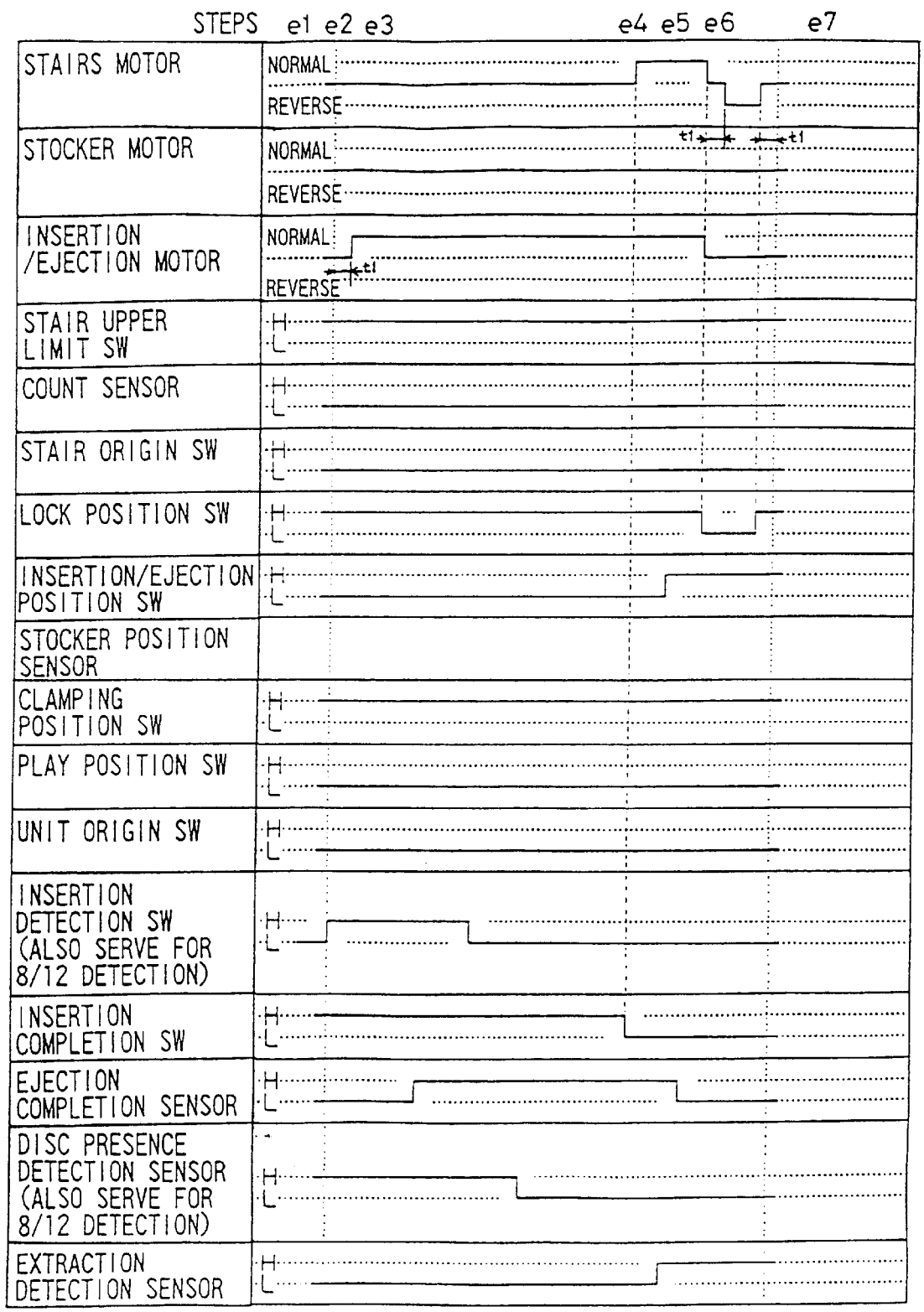
FIG. 59 is a time chart illustrating the operations of the electric configuration shown in FIG. 50.

FIGS. 58 and 59 are a flowchart and a time chart, respectively, of a CD inserting operation in Step a9 shown in FIG. 51. Operations are started in Step e1. In Step e2, the insertion detecting SW 182 is turned off on a high level, thus detecting insertion of the CD 14 of 12 cm. After the lapse of a certain period of time t1, the insertion/ejection motor 130 is positively rotated in Step e3, thus starting the disk inserting operation. The inserted CD 14 is displaced in a backward direction, and at the same time, the output of the ejection end sensor 201 becomes on a high level. The insertion detecting SW 182 is turned on of a low level, and the output of the disk presence detecting sensor 202 changes from a high level to a low level. When the CD 14 is inserted into the stocker 13 and the insertion end SW 124 is turned on in Step e4, the stair motor 31 is positively rotated in Step e5, the operation of returning from the insertion/ejection to the lock position is started. When the lock position SW 90 is turned on, the insertion/ejection motor 130 is stopped, and after stoppage for a time t1, the step motor is reversely rotated, and the lock position SW 90 is stopped at the OFF position, thus completing the CD inserting operation in Step e6.

Figure 60:
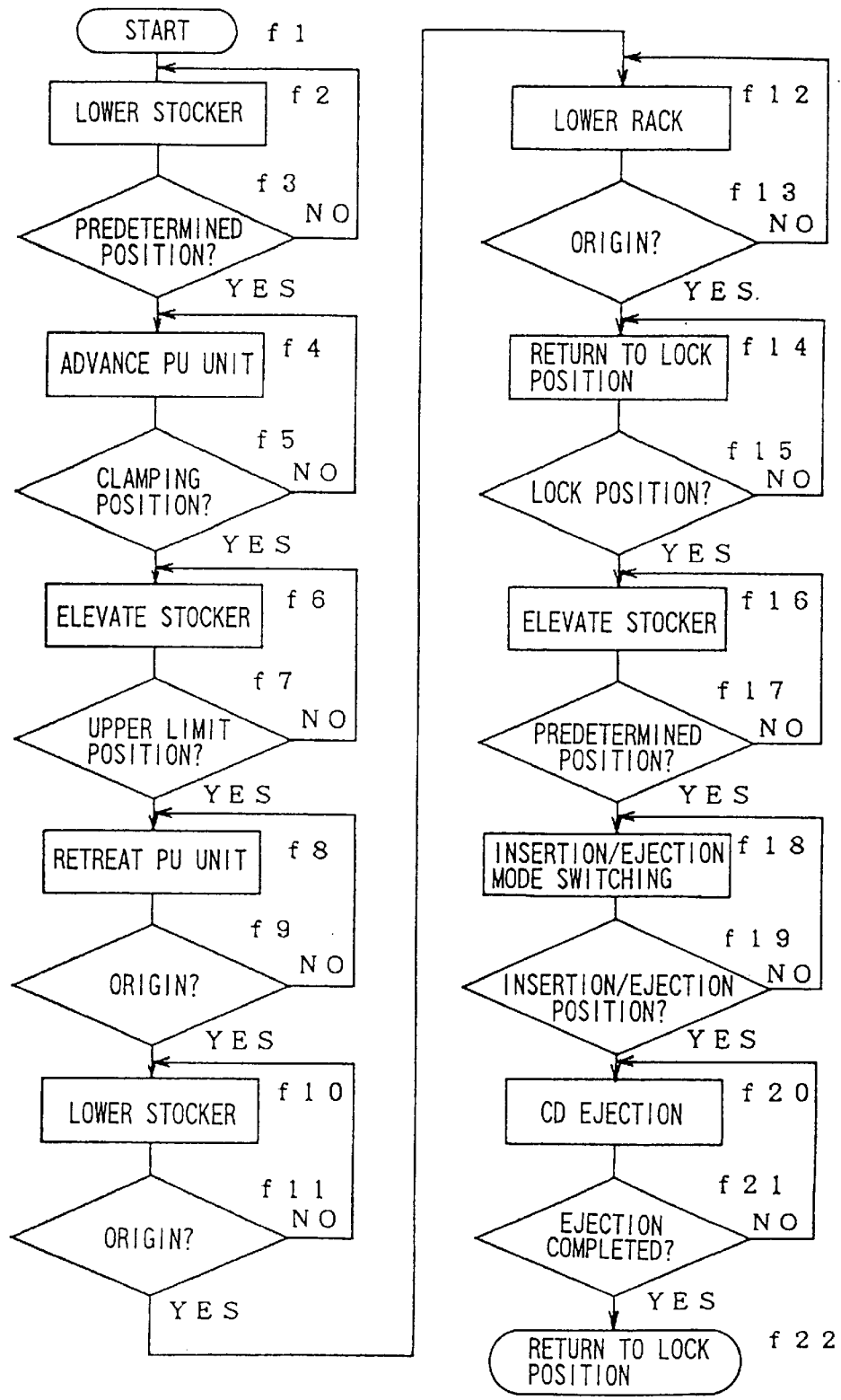
FIG. 60 is a flowchart illustrating the operations of the electric configuration shown in FIG. 50.
Figure 61:
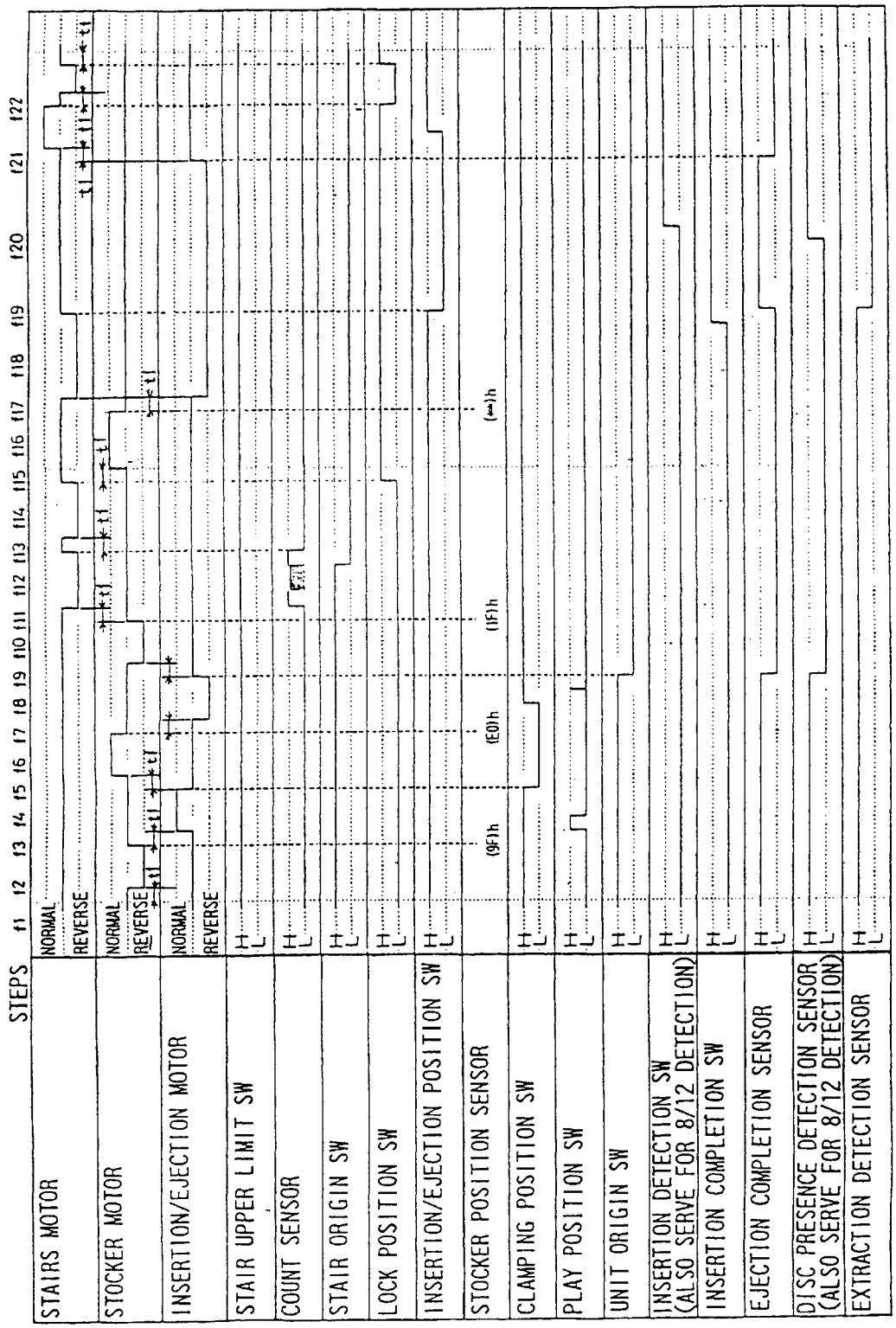
FIG. 61 is a time chart illustrating the operations of the electric configuration shown in FIG. 50.

FIGS. 60 and 61 are a flowchart and a time chart, respectively, of the CD ejection operation in Step a11 shown in FIG. 51. Operations are started in Step f1, and in Step f2, the stocker motor 32 is reversely rotated to cause the stocker 13 to move downwardly. When a descent to a predetermined position is determined from an output of the stocker position sensor 114 in Step f3, the stocker motor 32 is stopped. To return the disk in Step f54, the insertion/ejection motor 130 is positively rotated after the lapse of a certain period of time t1, to cause the PU unit 15 to advance into the stocker 13. When the clamping position SW 203 is turned on in Step f5, the insertion/ejection motor 130 is stopped, and the stocker motor 32 is operated to conduct the clamping releasing operation in Step f6 after the lapse of a certain period of time t1, thus causing the stocker 13 to go up. When the stocker 13 is determined to have reached a predetermined height from an output of the stocker position sensor 114 in Step f7, the insertion/ejection motor 130 is reversely rotated after the lapse of a certain period of time t1 in Step f8, and the unit ejection operation for causing the PU unit 15 to retreat from the stocker 13 is performed. When the unit origin SW 206 is turned on in Step f9, the insertion/ejection motor 130 is stopped. In Step f10, the stocker motor 33 is reversely rotated to cause the stocker 13 to go down after the lapse of a certain period of time t1 for carrying out the return of the stocker 13 to the origin. When a descent to a predetermined position is detected from an output of the stocker position sensor 114 in Step f11, the stocker motor 32 is stopped. In step f12, the stair motor 31 is reversely rotated after the lapse of a certain period of time t1. The origin position of the rack is detected in Step f13, and after a temporary stoppage for rack switching, the locking sliding member 45 is further moved in step f14 to return to the lock position in Step f15.

In step f16, the stocker motor 32 is positively rotated to cause the stocker 13 to move upwardly. In Step f17, ascent of the stocker 13 to a predetermined position is detected from an output of the stocker position sensor 114. When the stocker 13 goes up to the predetermined position, the stair motor 31 and the insertion/ejection motor 130 are reversely rotated in step f18, and the disk ejection operation for discharging the CD 14 is conducted. When the insertion/ejection position switch 91 is turned on in Step f19, the stair motor 31 is stopped, whereas the reverse rotation of the insertion/ejection motor 130 is continued to continue the CD ejection operation in Step f20. When the ejection end sensor 201 becomes on at a low level in Step f21 and detects the CD, the insertion/ejection motor 130 is stopped. After the lapse of a certain period of time t1 in Step f22, the stair motor 31 is positively rotated, and after the lock position SW 90 once becomes ON, the stair motor 31 is reversely rotated to return to the lock position.

Figure 62:
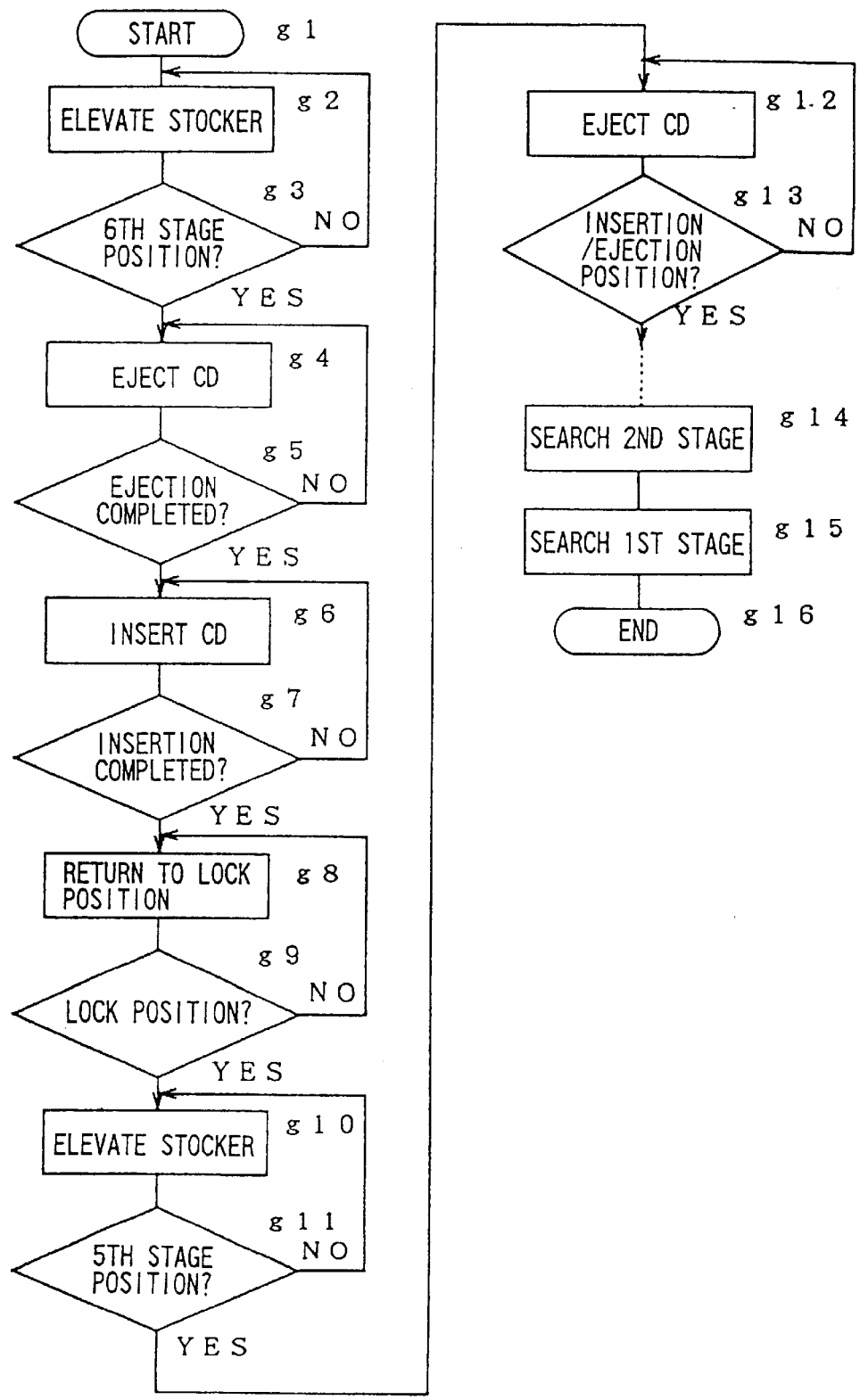
FIG. 62 is a flowchart illustrating the operations of the electric configuration shown in FIG. 50.
Figure 63:
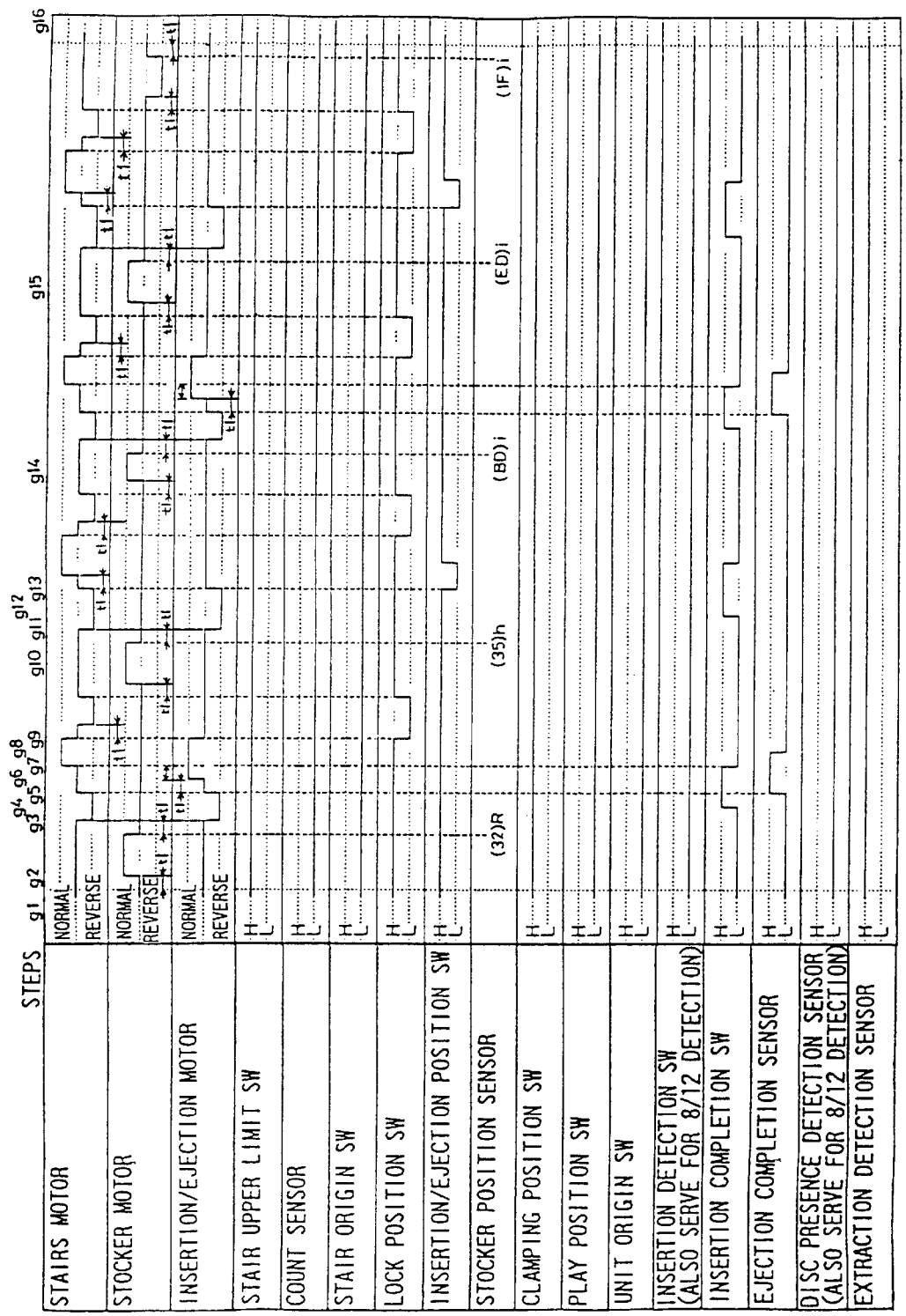
FIG. 63 is a time chart illustrating the operations of the electric configuration shown in FIG. 50.

FIGS. 62 and 63 are a flowchart and a time chart, respectively, of the CD retrieving operation in Step a12 shown in FIG. 51. Operations are started in Step g1, and in Step g2, the stocker motor 32 is positively rotated to conduct the stocker raising operation. When it is determined that the stocker 13 has been lifted up to the sixth-stage position from an output of the stocker position sensor 114 in Step g3, the stocker motor 32 is stopped, and after the lapse of a certain period of time t1 the CD ejection operation is performed in Step g4. At this point, the stair motor 31 and the insertion/ejection motor 130 are reversely rotated. A case where a CD is housed in the sixth stage is assumed here.

When the CD is ejected by the push-out lever 72 to the position of the ejection end sensor 201 in step g5, the light from the LED 180 to be received by the ejection end sensor 201 is interrupted, and the ejection end sensor 201 is turned off. In Step g6, the stair motor 31 and the insertion/ejection motor 130 are positively rotated as a CD inserting operation for disk push-in by the push-in lever 140, and disk push-in operation is continued until the insertion end switch 124 is turned on in Step g7. In Step g8, the stair motor 31 is reversely rotated. The lock position SW 90 is once changed from OFF to ON in Step g9, and is stopped at a position for resuming the ON state. Then, as a stocker lifting operation in Step g10, the stocker motor 32 is positively rotated to raise the stocker 13. In Step g11, lifting of the stocker 13 to the position of the fifth stage is detected from an output of the stocker position sensor 114. In Step g12 after the lapse of a certain period of time t1, the stair motor 31 and the insertion/ejection motor 130 are reversely rotated, respectively, to conduct the CD ejection operation. The CD is assumed in this case not to be house in the fifth stage.

In Step g13, the insertion/ejection position SW 91 is turned on. As a result, it is detected that the rack 16 has reached the insertion/ejection position, and the stair motor 31 and the insertion/ejection motor 130 are once stopped. Subsequently, it is determined in Step g14 whether or not the CD 14 is held in the stocker of the second stage; it is determined in Step g15 whether or not the CD 14 is held in the first-stage stocker; and the operations are completed in Step g16, in the same manner as above.

Figure 64:
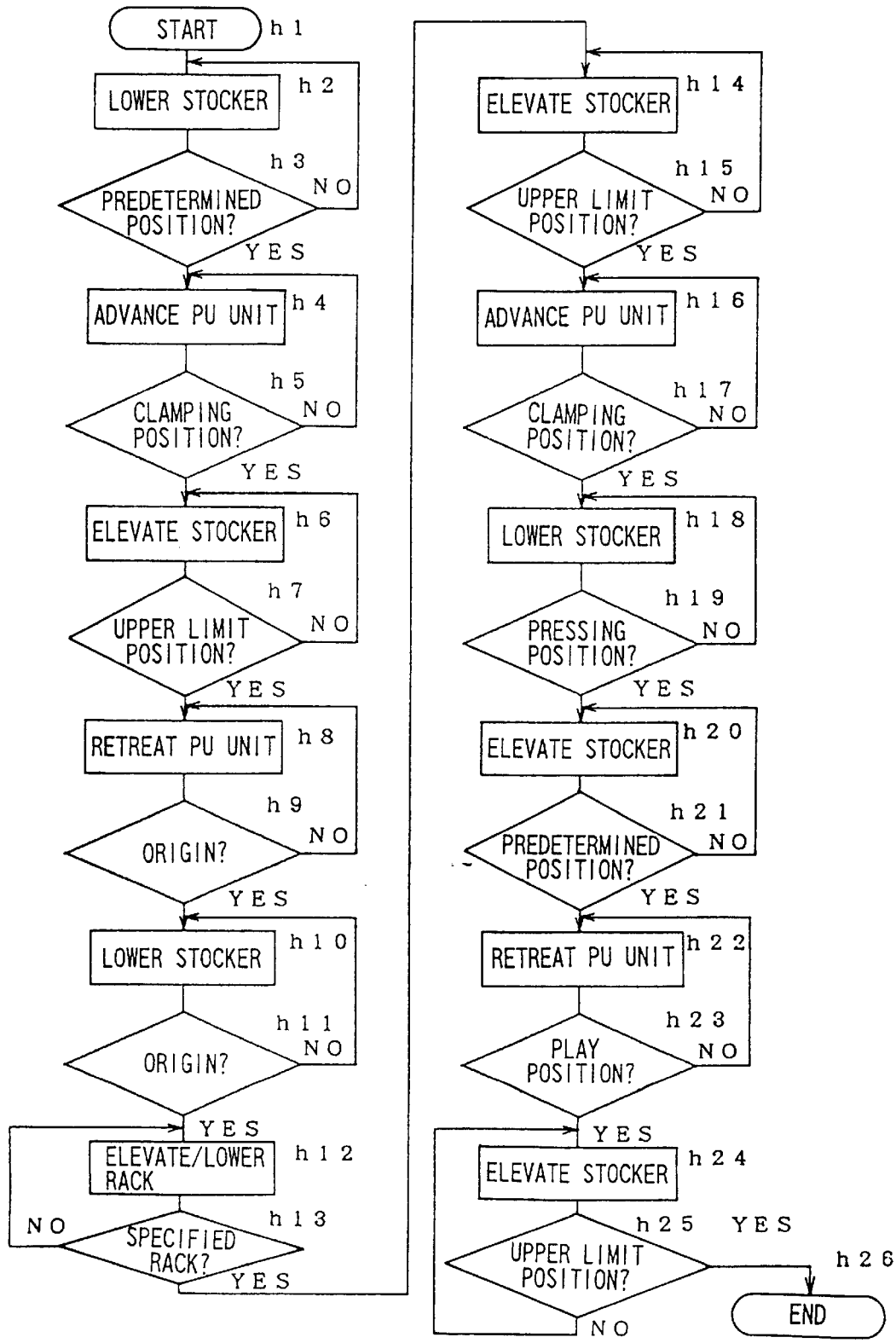
FIG. 64 is a flowchart illustrating the operations of the electric configuration shown in FIG. 50.
Figure 65:
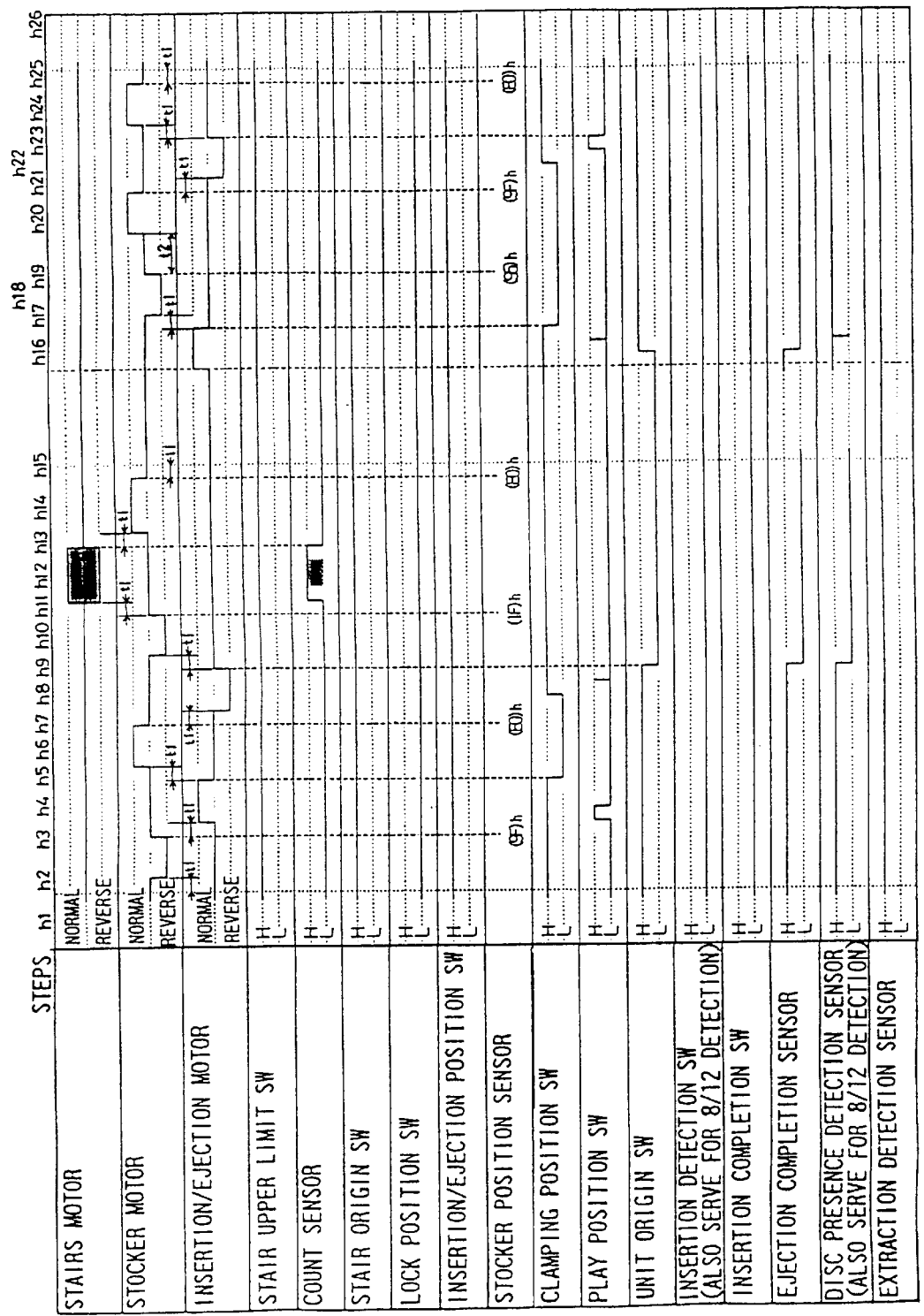
FIG. 65 is a time chart illustrating the operations of the electric configuration shown in FIG. 50.
Figure 66A:
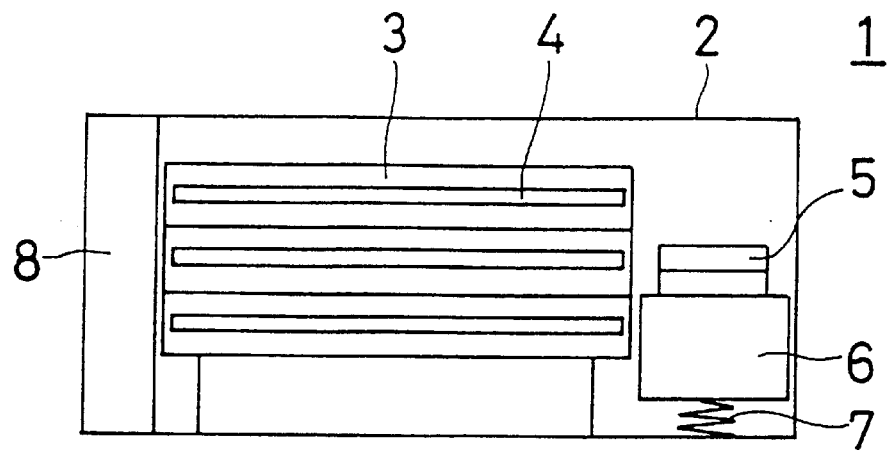
FIGS. 66A and 66B includes a plan view and a front view illustrating a schematic configuration of a conventional autochanger apparatus.
Figure 66B:
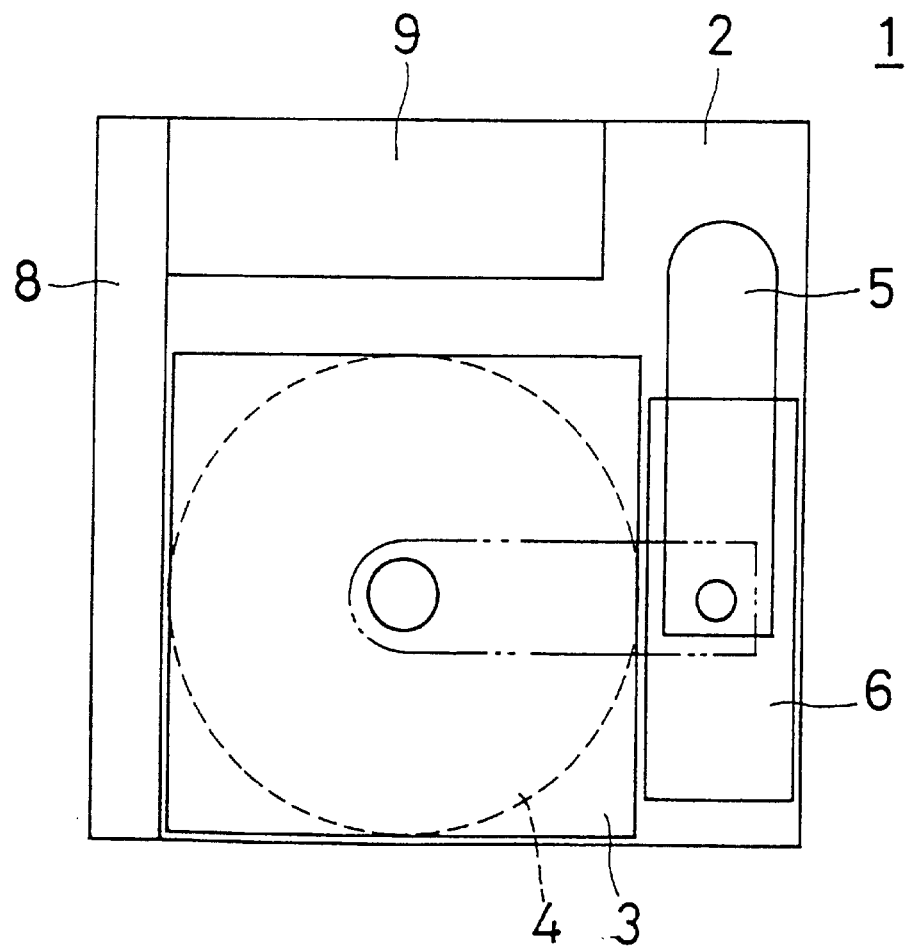

FIGS. 64 and 65 are a flowchart and a time chart, respectively, of the CD detecting operation in Step a14 shown in FIG. 51. Operations are started in Step h1, and in Step h2, the stocker motor 32 is reversely rotated to cause the stocker 13 to move downwardly. When the descent of the stocker 13 to a predetermined position is detected from an output of the stocker position sensor 114 in Step h3, the stocker motor 32 is stopped. After the lapse of a certain period of time t1 in Step 4, the insertion/ejection motor 130 is positively rotated, to return to a CD 14 attached to the PU unit 15 to the stocker 13. When the clamping position SW 203 is turned on in Step h5, the insertion/ejection motor 130 is stopped. After the lapse of a certain period of time t1 in Step h6, the stocker motor 32 is positively rotated, to carry out the clamping releasing operation for pulling out the CD 14 from the center shaft 191. When the stocker 13 is determined in Step h7 to have risen to the uppermost position from an output of the stocker position sensor, the stocker motor 32 is stopped. After the lapse of a certain period of time t1 in Step h8, the insertion/ejection motor 130 is reversely rotated to cause the PU unit 15 to retreat from the stocker 13 for unit ejection. When the unit origin SW 206 is turned on in Step h9, the insertion/ejection motor 130 is stopped. After the lapse of a certain period of time t1 in Step h10, the stocker motor 32 is reversely rotated, to perform stocker origin return by causing the stocker 13 as a whole to move downwardly. When the stocker 13 is determined in Step h11 to have gone down to the origin position from an output of the stocker position sensor 114, the stair motor 31 is rotated after the lapse of a certain period of time t1 in Step h12, and in Step h13, the rack 16 is stopped at a predetermined position from an output of the count sensor 232.

In Step h14, the stocker motor 32 is positively rotated after the lapse of a certain period of time t1 to cause the stocker 13 to go up in division. In Step h15, it is detected that the upper half of the divided stocker rises to the upper limit position from an output of the stocker position sensor 114. In Step h16, the insertion/ejection motor 130 is positively rotated to cause the PU unit 15 to advance into the stocker 13. When the clamping position SW 203 is turned on in Step h17, the insertion/ejection motor 130 is stopped. After the lapse of a certain period of time t1 in Step h18, the stocker motor 32 is reversely rotated. When descent to a pressing position is determined from an output of the stocker position sensor 114 in Step h19, the stocker motor 32 is stopped. After the lapse of a certain period of time t2 in Step h20, the stocker motor 32 is positively rotated to cause the upper half of the divided stocker 13 to go up again. This ascent position is determined in Step h21 from an output of the stocker position sensor 114. After the lapse of a certain period of time t1 in Step h22, the insertion/ejection motor 130 is reversely rotated to withdraw the CD 14 transferred to the PU unit 15 from the stocker 13 along with the retreat of the PU unit 15. When the PU unit 15 is determined to reach the PLAY position from an output of the PLAY position sensor 204, the insertion/ejection motor 130 is stopped in Step h23. Then, after the lapse of a certain period of time t1 in Step 24, the stocker motor 32 is positively rotated to cause the stocker 13 to move further up. When the stocker 13 is determined to reach the upper limit stocker standby position in Step h25, the operations are completed in Step h26.

In the foregoing operations, the certain period of time t1 is for example 100 msec, and t2 is 500 msec. In the embodiments presented above, the stocker member 100 and the first uppermost-stage stocker member 101 of the stocker 13 have substantially the same shape of the front portion as that of the CD 14. As a result, because the upper roller 25 and the lower roller 26 are not positively aligned, leading end of the inserted CD 14 is directed upward, thus permitting smooth guidance. By ensuring almost horizontal insertion of the CD 14, for example, by increasing the number of rollers of the transfer rollers 24, it is possible to omit the front side portion of the stocker member 100 or the uppermost-stage stocker member 101. It is needless to mention that the number of stages is not limited to six. Applicable disk-shaped recording carriers include, in addition to a CD-ROM for a personal computer, and also a laser disk (LD) and a mini-disk (MD).

The invention may be embodied in other specific forms without departing from the sprit or essential characteristics thereof. The present embodiments are therefore to be considered in all respects as illustrative and not restrictive, the scope of the invention is indicated by the appended claims rather than by the foregoing description and all changes which come within the meaning and the range of equivalency of the claims are therefore intended to be embraced therein.

What is claimed is:

1. A slot-in type reproduction/recording apparatus comprising:
   an enclosure provided with a slot through which naked recording carriers can be inserted into said enclosure or ejected from said enclosure;
   a housing assembly for housing a plurality of the recording carriers, said housing assembly being selectively dividable in order to create a space in which a selected one of the recording carriers can be accessed;
   transfer means, disposed in said enclosure, for individually transferring the recording carriers between said slot and said divisible housing assembly; and
   reproduction/recording means for performing reproduction/recording of the recording carriers, wherein said reproduction/recording means is movable into a space created by dividing said housing assembly so as to receive thereon a selected recording carrier from a position in which the selected recording carrier is fully inserted in said housing assembly.

2. The slot-in type reproduction/recording apparatus as claimed in claim 1, further comprising a first lifting means for moving said housing assembly upward and downward.

3. The slot-in type reproduction/recording apparatus as claimed in claim 2, further comprising a second lifting means for moving said reproduction/recording means upward and downward.

4. The slot-in type reproduction/recording apparatus as claimed in claim 1, wherein said reproduction/recording means is movable out of the space, created by dividing said housing assembly, to a position at which reproduction/recording of the selected recording carrier can be performed.

5. The slot-in type reproduction/recording apparatus as claimed in claim 1, further comprising control means for controlling said housing assembly, in an insertion or ejection operation, so that said housing assembly is moved as a single unit in an upward direction or a downward direction in order to align a housed position of one of the recording carriers in said housing assembly with said slot, and
   in a reproduction or recording operation, said control means divides said housing assembly at a specific location which corresponds to said housed position and moves said reproduction/recording means up or down in order to align the space created by dividing said housing assembly with the position of advance or withdrawal of said reproduction/recording means.

6. The slot-in type reproduction/recording apparatus as claimed in claim 1, wherein said housing assembly comprises a plurality of stacked housing members.

7. The slot-in type reproduction/recording apparatus as claimed in claim 1, further comprising:
   displacement means for advancing said reproduction/recording means into or withdrawing said reproduction/recording means from the space created by dividing said housing assembly;
   driving means for driving said transfer means; and
   transmission means for selectively transmitting a driving force of said driving means to said displacement means.

8. The slot-in type reproduction/recording apparatus as claimed in claim 1, wherein said housing assembly is selectively dividable independently of the recording carriers.

9. The slot-in type reproduction/recording apparatus as claimed in claim 1, wherein said housing assembly is adapted to house a plurality of naked recording disks.

10. The slot-in type reproduction/recording apparatus as claimed in claim 1, wherein said housing assembly is adapted to house a plurality of compact disks, or laser disks.

11. A slot-in reproduction/recording apparatus capable of housing a plurality of naked disc/shaped recording carriers in an enclosure, said slot-in type reproduction/recording apparatus comprising:
   divisible housing means having a holding section for holding the disk-shaped recording carriers;
   reproduction/recording means capable of advancing into and withdrawing from a space created by dividing said divisible housing means;
   attaching means, provided in said reproduction/recording means, for attaching the recording carriers; and
   control means for, during a reproduction/recording operation, advancing said reproduction/recording means into the space created by dividing said divisible housing means to receive and attach to said attaching means one of the recording carriers that is fully inserted in said divisible housing means, and thereafter withdrawing said reproduction/recording means in order to release the one recording carrier received from said holding section of said divisible housing means, and thereby controlling reproduction or recording operations of the one recording carrier.

12. The slot-in type reproduction/recording apparatus as claimed in claim 11, wherein upon completion of a reproduction/recording operation, said control means controls said reproduction/recording means to advance it into the space created by dividing said divisible housing means, and to expand a divided portion of said divisible housing means in a direction of division in order to detach the disc-shaped carrier attached to said attaching means of said reproduction/recording means.

13. The slot-in type reproduction/recording apparatus as claimed in claim 11, further comprising:

displacement means for advancing said reproduction/recording means into or withdrawing said reproduction/recording means from the space created by dividing said divisible housing means;

driving means for driving said transfer means; and transmission means for selectively transmitting a driving force of said driving means to said displacement means.

14. The slot-in type reproduction/recording apparatus as claimed in claim 11, wherein said divisible housing means can be selectively dividable independently of the naked disk-shaped recording carriers.

15. A slot-in type of reproduction/recording apparatus for permitting individual insertion or ejection of a plurality of naked disc-shaped recording carriers, said apparatus comprising:

an enclosure having a slot through which the recording carriers can be individually inserted and ejected;

divisible housing means having a holding section for holding the recording disk-shaped carriers;

transfer means for transferring the recording carriers between said slot and said divisible housing means, wherein said transfer means engages surfaces of the recording carriers only when the surfaces are located within said enclosure;

reproduction/recording means for performing a reproduction or recording operation of the disc-shaped recording carriers, said reproduction/recording means being capable of advancing into and withdrawing from a space created by dividing said divisible housing means, said reproduction/recording means including attaching means which is engagable with a center hole of a specified one of the recording carriers while the specified recording carrier is completely inserted in said housing means; and control means for aligning said transfer means with respect to said divisible housing means during insertion or election of one of the recording carriers.

16. The slot-in type reproduction/recording apparatus as claimed in claim 15, wherein upon completion of a reproduction/recording operation, said control means controls said reproduction/recording means to advance it into the space created by dividing said divisible housing means, and to expand a divided portion of said divisible housing means in a direction of division in order to detach the disc-shaped carrier attached to said attaching means of said reproduction/recording means.

17. The slot-in type reproduction/recording apparatus as claimed in claim 15, further comprising:

displacement means for advancing said reproduction/recording means into or withdrawing said reproduction/recording means from the space created by dividing said divisible housing means;

driving means for driving said displacement means; and transmission means for selectively transmitting a driving force of said driving means to said displacement means.

* * * * *